US012674735B2

(12) United States Patent
Wang et al.

(10) Patent No.: US 12,674,735 B2
(45) Date of Patent: Jul. 7, 2026

(54) METHODS FOR FLOW AND FLUID PROPERTIES MEASUREMENT USING INTRINSIC AND EXTRINSIC OPTICAL TRANSDUCERS

(71) Applicant: National Tsing Hua University, Hsinchu City (TW)

(72) Inventors: Wei-Chih Wang, Sammamish, WA (US); Fiona Marie Wang, Seattle, WA (US)

(73) Assignee: National Tsing Hua University, Hsinchu City (TW)

( * ) Notice: Subject to any disclaimer, the term of this patent is extended or adjusted under 35 U.S.C. 154(b) by 564 days.

(21) Appl. No.: 18/159,586

(22) Filed: Jan. 25, 2023

(65) Prior Publication Data

US 2024/0255406 A1    Aug. 1, 2024

(51) Int. Cl.
| | |
|---|---|
| *G01N 11/16* | (2006.01) |
| *G01F 1/76* | (2006.01) |
| *G01N 11/00* | (2006.01) |
| *G02B 6/132* | (2006.01) |
| *G02B 6/12* | (2006.01) |

(52) U.S. Cl.
CPC ............. *G01N 11/16* (2013.01); *G02B 6/132* (2013.01); *G01F 1/76* (2013.01); *G01N 2011/008* (2013.01); *G02B 2006/12104* (2013.01); *G02B 2006/12116* (2013.01)

(58) Field of Classification Search
CPC .. G01N 11/16; G01N 2011/008; G01N 11/00; G02B 6/132; G02B 2006/12104; G02B 2006/12116; G01F 1/76; G01F 1/661
See application file for complete search history.

(56) References Cited

PUBLICATIONS

Ju, Po-Yau, et al. "Microfluidic flow meter and viscometer utilizing flow-induced vibration on an optic fiber cantilever." 2011 16th International Solid-State Sensors, Actuators and Microsystems Conference. IEEE, 2011. (Year: 2011).*

* cited by examiner

*Primary Examiner* — Timothy P Graves
(74) *Attorney, Agent, or Firm* — HSML P.C.

(57) ABSTRACT

Provided is a method for measuring fluid's viscosity and mass flow, including the steps of immersing one end of an optical fiber into fluid, emitting a light beam by a light source, receiving the light beam by the optical fiber; and measuring the viscosity and the mass flow of the fluid in a sink based on a displacement of the one end of the optical fiber. The method further includes tapering the one end of the optical fiber and coating a surface of the one end of the optical fiber with a deposited gold thin film as a mirror. The light source is an unpolarized diode laser. Accordingly, the size of the measurement system setup is reduced by using ultra-small sensors. Moreover, the present disclosure also provides methods for fluid's viscosity and mass flow measurement by using intensity modulating sensors, elliptical core two-mode fiber-optic sensors and Fabry-Perot interferometer sensors.

34 Claims, 54 Drawing Sheets

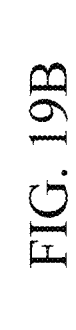
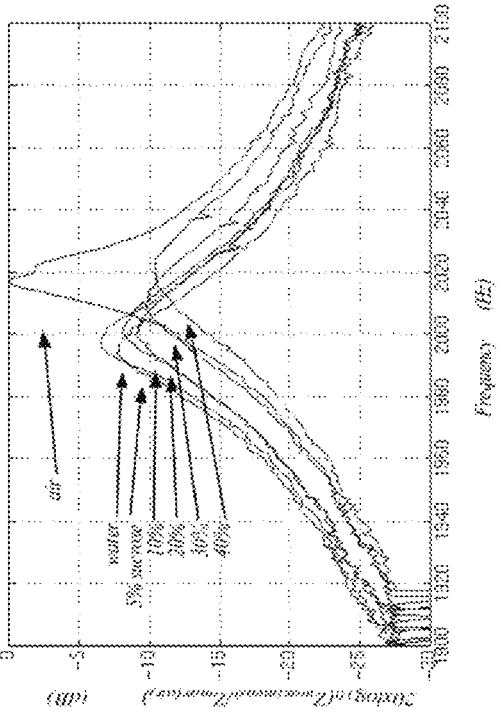
FIG. 19B
FIG. 19A

METHODS FOR FLOW AND FLUID PROPERTIES MEASUREMENT USING INTRINSIC AND EXTRINSIC OPTICAL TRANSDUCERS

BACKGROUND

The present disclosure relates to viscosity and mass flow measurement and, more specifically, to methods of measuring viscosity and mass flow using optical fibers or optical sensors.

The monitoring of fluid viscosity is a common analysis requirement in the process industry. Timely, accurate and cost effective monitoring is often hindered by the limits of viscosity sensor technology. Most commonly used viscosity sensors have changed little since their development in 40s and 50s. These viscometers, mostly mechanical devices, are often large and cumbersome to use. They are frequently confined to narrow viscosity ranges and specific fluid requirements. In recent years, acoustic wave devices employing piezoelectric crystal, electro-ceramic and piezo-electric-thin-film have received attention as fluid viscosity sensors. Although these devices have proven to be highly sensitive, they are often limited to measure the properties of the surrounding liquid rather than the bulk fluid. This is due to the fact that the wavelengths of the ultrasonic waves are short and cannot penetrate far into liquids. To date, most industrial liquid and gas viscosity measurements rely on instruments developed in the early 1940s and 50s. These viscometers, mostly mechanical devices, are often large and cumbersome to use, as well as being frequently confined to narrow viscosity ranges and specific fluids. In recent years, acoustic wave devices employing piezoelectric crystals, electroceramic and piezoelectric-thin-films have received attention as fluid viscosity sensors. Among them, a study used a bulk crystal oscillator to measure the viscosity of a liquid. It is showed that the viscosity of a liquid can be deduced from a relationship between the mechanical reso-nant frequency and the electrical resistance of the resonator. They found that a simple linear relationship exists between the electrical resistance of quartz and a liquid's viscosity. Bulk surface acoustic waves for sensing liquid viscosity have been used. The essential feature of Martin's device is the application of horizontally polarized shear waves and monitoring the attenuation of these surface waves due to the liquid's viscosity. The experiment was performed using viscous loss measurements for liquids with viscosities between 0.3 and 1500 cP. A liquid viscosity sensor using surface wave attenuation is demonstrated. The device uses flexural plates to send waves propagating along the mem-branes of a thin submerged layer of silicon-nitride. The report revealed that the device responds linearly over a wide viscosity range (from 0.9 cP (water) to 1060 cP (100% glycerol). Piezoelectric resonators have proven to be highly sensitive and mobile. Although these devices have proven to be highly sensitive, often they are limited to measure the properties of the surrounding liquid rather than the bulk fluid. This is because the wavelengths of the ultrasonic waves are short and cannot penetrate very far into liquids. However, the same level of sensitivity and mobility exhib-ited by the piezoelectric sensors can be achieved with a relatively simple and less expensive forward light scattering technique where the measurement of the viscosity of the bulk fluid is performed rather than the measurement of the viscosity of fluid immediately surrounding the device.

Optical techniques for viscosity measurement were not extensively explored until the recent development of an optical method utilizing a forward light scattering pattern as an indirect measurement of fluid viscosity. Fluid viscosity was derived from the damping of an immersed vibrating micro-pipette and an optic fiber. Experimental data revealed that the fluid viscosity can be deduced from a comparison between the measured vibration amplitude and the damping.

However, due to the size of the setup, the forward scattering approach proved to be impractical as an in inline industrial or laboratory viscosity/mass flow sensor. In order to address this problem and to design an ultra-small sensor, improved methods for measuring fluid's viscosity and mass flow are needed.

SUMMARY

The present disclosure provides a method for measuring fluid's viscosity and mass flow, which includes the steps of: immersing one end of an optical fiber into fluid; emitting a light beam by a light source; receiving the light beam by the optical fiber; and measuring the viscosity and the mass flow of the fluid in a sink based on the effect of a fluid on the oscillations of a fiber-optic probe immersed in the fluid.

In an embodiment of the present disclosure, the method for measuring fluid's viscosity and mass flow may further include the steps of: tapering the one end of the optical fiber; and coating the one end of the optical fiber with a deposited gold thin film as a mirror, wherein the light source is an unpolarized diode laser or a light emitting diode.

In an embodiment of the present disclosure, the method for measuring fluid's viscosity and mass flow may further include the steps of: coating the one end of the optical fiber with silver epoxy; reflecting the light beam when the light beam reaches a bottom of the one end of the optical fiber, wherein the light source is a polarized coherent light source (e.g. HeNe laser or diode laser), and the optical fiber is a single mode fiber.

In an embodiment of the present disclosure, the method for measuring fluid's viscosity and mass flow may further include the steps of: exciting two modes $LP_{01}$ and $LP_{11}$ in the optical fiber, wherein the light source is provided by a linearly polarized coherent light (e.g. He—Ne laser or diode laser), and the optical fiber is an elliptical core optical fiber optically excited to create an interferometer with its two $LP_{01}$ polarization modes.

In an embodiment of the present disclosure, the method for measuring fluid's viscosity and mass flow may further include the steps of: injecting the light beam into the optical fiber through a microscope objective; placing a polarizer positioned at a principle axis at a slight angle relative to a surface of the microscope objective; placing another polar-izer at the one end of the optical fiber oriented at a same polarization direction as the polarizer; and driving the opti-cal fiber by a piezoelectric transducer mounted near another end of the optical fiber, wherein the light source is an polarized coherent light (e.g. He—Ne laser or diode laser) and the optical fiber in a fiber-optic Fabry-Perot interferom-eter.

In an embodiment of the present disclosure, the method for measuring fluid's viscosity and mass flow may further include the steps of: providing a micro-fabricated cantilever waveguide; and coating a distal end of the micro-fabricated cantilever waveguide with a deposited gold thin film as a mirror, wherein the light source is either a polarized diode laser or an unpolarized diode laser or a light emitting diode.

BRIEF DESCRIPTION OF THE DRAWINGS

FIG. 19A is frequency response of viscosity measurement in various concentration of sucrose solution.

FIG. 19B is a corresponding plot of maximum vibration amplitude versus 1/sqrt(pp).

DETAILED DESCRIPTION

Figure 1:
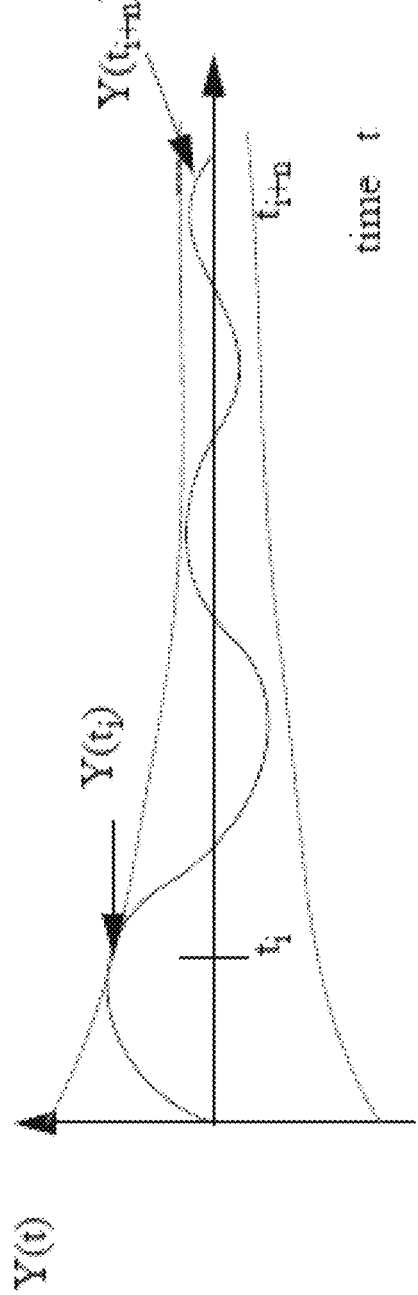
FIG. 1 is a typical time decay curve.

The development of a robust fluid sensor capable of real time process measurements of a wide range and low rate is provided. The fluid sensor is designed to overcome the difficulties of existing commercial viscosity and flow transducers in that it will be immuned to any external vibration, pressure or temperature and provides accurate and reliable fluid measurements. In the present disclosure, three fiber-optic based vibration sensors and a hybrid of fiber-optic and semiconductor microresonator are developed. The first sensor utilizes vibration-induced intensity modulation of forward light scattering of an optical fiber. The second sensor exploits vibration-induced intensity interference of an elliptical core two-mode fiber cavity. The third sensor utilizes the intensity modulation due to the vibration-induced phase change of a fiber-optic polarimetric sensor. The hybrid sensor uses an optically excited and interrogating silicon based microresonator. The last two fiber-optic sensors are embedded in a transversely vibrating aluminum beam to increase its mechanical strength and rigidity in high viscosity and flow measurement.

In brief, the fluid viscosity measurement is deduced from the fluid's frictional damping on the surface of the immersed vibrating fiber optic probe. This frictional damping, which becomes the dominant factor in the fluid damping under a smaller fiber's vibration in a still or slow moving fluid, is primarily a function of viscosity. Based on this viscous fluid damping model, a viscous imposed frequency response of the fiber's vibration is generated. As a result, the fluid viscosity can be deduced based on an equivalent damping coefficient or the maximum displacement derived from the frequency response.

The concept of flow rate and mass density measurement is similar to the viscosity measurement. By increasing the velocity of the flow or the vibration of the fiber, the viscous fluid damping is gradually replaced by a rising pressure drag. As a result, the displacement response of the vibrating fiber becomes inversely proportional to the fluid's mass density and the fluid's velocity. It has been shown that the mass flow rate can be deduced based on the measured maximum vibration amplitude, or based on the half-width frequency. Unlike the viscosity case, the changes in the magnitude of the peak displacement and the half-width frequency will be seen as a change in the velocity or mass density of the flow.

In the context of designing a sensor capable of achieving greater sensitivity, configuration and optimization of the sensor are thoroughly studied. One of the improvement was the excitation of the nonlinear vibration. By exciting the superharmonic or the higher order harmonic mechanical resonances in the sensor, the experimental results show an increase in the sensitivity of an order in magnitude (~20 dB) over the viscosity measurement between 1 to 6 cP have been observed in the forward light scattering sensor.

In the present application, 1) the basic sensor principles, 2) the mechanical and fluid analysis of the system, and 3) the viscosity and flow rate measurement of each sensor are provided.

Basic Concept of Viscosity and Flow Measurement

Linear Vibration Technique

In the past, optical techniques have not been explored extensively for viscosity measurements. Recently, however, an optical method utilizing forward light scattering pattern was used as an indirect measurement of the fluid viscosity. The fluid viscosity was derived from the fluid's damping action on the surface of the immersed vibrating probe (pipette). This frictional damping, which was shown to be the dominant factor in the fluid damping under a small pipette's vibration, is primarily a function of viscosity. This viscous fluid motion is often refer to as Stokes' (or laminar) flow condition. Based on this viscous fluid damping model, a viscous imposed frequency response of the pipette's vibration is generated. As a result, the fluid viscosity can be deduced based on an equivalent damping coefficient derived from the frequency response. The subsequent experimental results confirm the relationship between the damping coefficient and the viscosity of the fluid. There are many unresolved technical problems concerning the pipette as a viscosity sensor. One of the problems arises from the non-uniform tapering of the pipette. Ideally, this narrowing tip increases the sensitivity of receiving signal because of increasing deflection of the pipette as a result of decreasing stiffness. However, for the profile measurement (tapered from 1 mm to 0.5 am), a time-consuming procedure is required. This is further complicated by the extended calculation created by the tapered geometry. Fragility of the glass tip is another concern. Certain tolerance is needed if it is to be used outside of a laboratory setting. Initially, a uniform pipette (diameter~1 mm) was substituted, but the spacing of each peak from the resulting scattering light was too small to be detected by the optical system. To overcome these difficulties posed by the glass pipette, a more rugged material—optical fiber (~125 μm) is chosen. In this work, the pipette is replaced with an optical fiber. Operating the fiber under the laminar flow condition, different viscous fluids will be identified from the viscous damped vibration amplitudes of the fiber.

Figure 3:
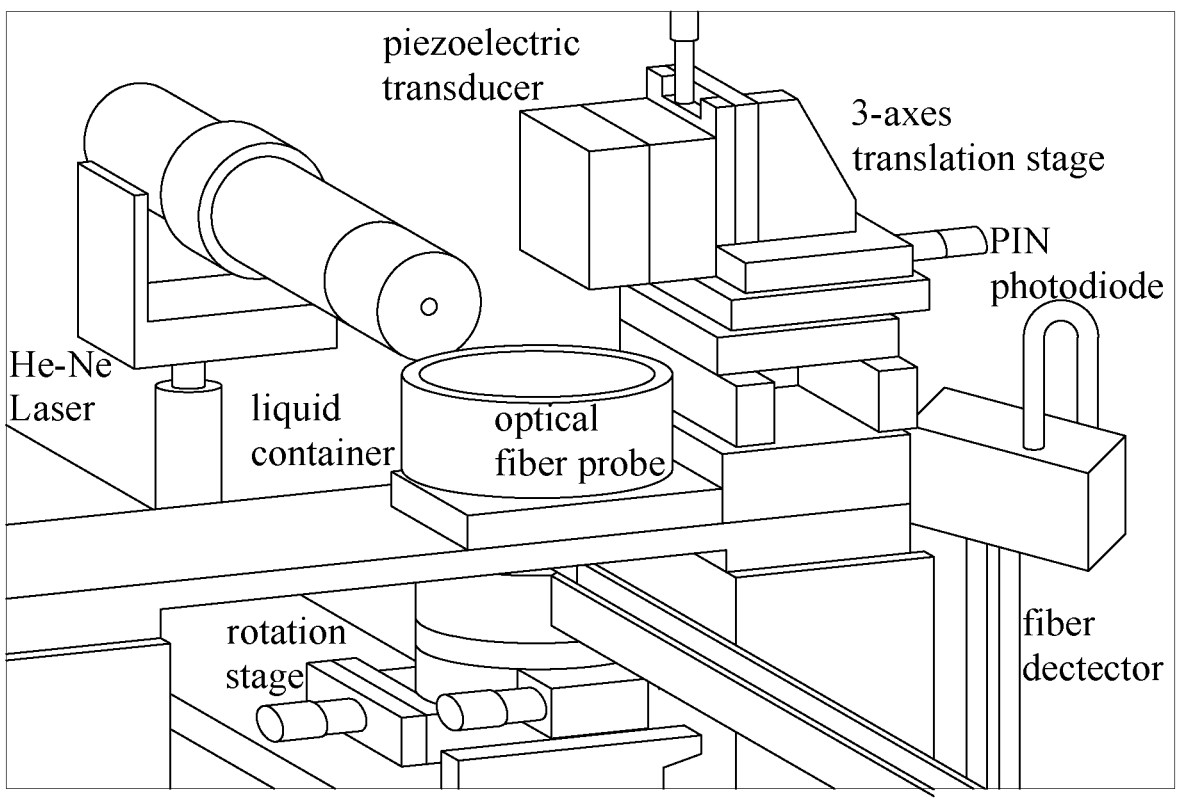
FIG. 3 shows apparatus used to measure liquid viscosity using forward scattering sensor.

As shown in FIG. 3, the fiber-optic viscosity sensor has shown advantages over the prior art viscometers in terms of reduced size and increased flexibility in the dynamic range of viscosity measurement (from air to 40% sucrose). It also requires a smaller amount of liquid (~200 ml) for the measurement, compared to the old capillary and rotational viscometers. Although the same characteristics can be achieved by the present piezoelectric resonator devices, in terms of theory and fabrication, the optical fiber technique is simpler in comparison with the existing piezoelectric sensors. In the following sections, several different optical approaches to create this fiber-optic sensor for viscosity and flow sensing are described. The same concept can be applied to MOEMS sensors with only difference in using micro-fabricated waveguide structure instead of fiber. The MOEMS device also fully integrated with MEMS actuators and can eventually combine with driving circuits and detection circuits on the same chip using CMOS fabrication technology.

Theory on the Fluid Model

When the vibrating fiber is embedded in a viscous flow fluid, both the amplitude and frequency of vibration are highly dependent on the viscosity of the fluid. If the fiber and its surrounding fluid are modeled as a liner, single degree of freedom system with viscous damping, the motion of the vibrating fiber can be described by a simple linear equation as mx+Cx+kx=f(t), where f(t) represents the excitation force from the piezoelectric driver, x is the displacement of the vibrating fiber, k is the stiffness of the fiber, m is the total mass per unit length, and C is the damping coefficient of the fiber. There are two contributing sources to the damping coefficient. One is from the structure $C_S$, and the other is from the surrounding $C_f$. Since the structural damping is relatively small compared to the fluid damping, it is often ignored in the damping calculation. However, if needed the structural damping can be easily determined experimentally.

To determine the fluid damping $C_f$, the drag created by the fluid on the surface of the fiber is first examined. The magnitude of the drag force created by viscosity is given by $$|F_{drag}| = \frac{1}{2}\rho U_{rel}^2 DC_D \quad (1)$$

where $\rho$ is the mass density of fluid, D is the diameter of the cross section of the flow, $C_D$ is the drag coefficient (functions of geometry of the cross section, Reynold's number and relative velocity), and $U_{rel}$ is the relative velocity of fluid with respect to the fiber. Since the fiber is in a still fluid and vibrates in one direction, $U_{rel}=\partial X/\partial t$, where $X(z,t)=x(t)\psi(z)$ is the displacement at z (length position) in the x direction of a continuous structure operating in a single direction, x(t) is set equal to as $A_x \sin \omega_n t$, and where $\psi(z)$ is the mode shape $\sin(n\pi z/L)$.

Under the laminar flow condition, the fluid drag coefficient becomes $C_D=24/R_e$ where Reynold's number $R_e=(XD\rho)/\mu$. This yields a fluid damping $C_f$ as follows.

$$C_f = 12\mu \quad (2)$$

where the fluid damping becomes a function of the viscosity $\mu$. However, the constant in the equation could vary depending on the surface roughness of the fiber and the damping characteristic of the fluid. This constant can be determined experimentally.

Vibration Amplitude $x_{max}$

Based on the solution for the fluid damping coefficient, $C_f=12\mu$ and the linear system with viscous damping model described earlier in the theory, $mx+(C_S+C_f)x+kx=f(t)$, the peak vibration amplitude of the fiber evaluates to:

$$x_{max} = \frac{f(t)}{(Cs + 12\mu)\omega_o} \quad (3)$$

This equation suggests that for a constant driving force f(t), the viscosity $\mu$ can be deduced from the peak displacement of the fiber, measurement experimentally, if $C_S$ is known or $C_S \ll 12\mu$.

Equivalent Damping Coefficient $\xi$

Fluid viscosity $\mu$ can also be derived from the equivalent damping coefficient of the linear system. Since the fluid damper is modeled as an ideal viscous damper, and equivalent damping coefficient is defined in terms of a viscous damper that ideally dissipates the same energy as the actual fluid model. For a vibration in the x direction, the equivalent viscous damping coefficient is given as:

$$\xi_x = \frac{\int_0^L \int_0^T F_{drag}\dot{x}(t)\psi(z)dtdz}{2\pi\int_0^L m(z)(\dot{x}_{max}(t))^2\psi^2(z)dz} \quad (4)$$

where the numerator is the fluid damping energy and the denominator is the total energy in the structure that is equal to the maximum kinetic energy, in which m is the total mass per unit length (including the mass of the entrained fluid), L is the total immersed length, and T is the period of oscillation.

The damping coefficient $\xi_x$ is calculated by substituting the drag force created by the fluid into the above equation, and using $C_D=24/R_e$ and Reynold's number $R_e=(U_{rel}D\rho/\mu$, where Urel=X and $R_e<1$ (cylinder structure under Stoke's flow condition). Combined with the vibration amplitude x(t,z) and the mode shape $\psi(z)$, the equivalent viscous damping coefficient $\xi_x$ evaluates to be $6\mu/(m\omega_n)$.

Since only a portion of the fiber is covered by the sample liquid and the rest is exposed to air, the total equivalent damping coefficient cannot be derived directly using a single $\xi_x$ equation. Instead, the total equivalent damping coefficient is derived analytically using two fluid models based on two equivalent viscous dampers. The calculation is performed using ANSYS. Based on the frequency response generated from the simulation and from the experiment, the total equivalent damping coefficient for the simulation and the experiment is derived. For a case of light damping, $\xi<0.1$, the equivalent damping coefficient measured in terms of bandwidth $\Delta\omega$ and the resonant frequency $\omega_n$ is $\xi=\Delta\omega/2\Delta\omega$, where fluid viscosity is directly proportional to the equivalent damping coefficient $\xi$.

Damping is still fluid with no mean flow (if mean flow is greater than oscillating flow), the fluid drag is $$F_{fluid\,damp} = \frac{1}{2}\rho|U_{rel}|U_{rel}DC_d \quad (5)$$

The result of the motion of the structure becomes $$(m + m_{entrained})\ddot{x} + C_s\dot{x} + kx = \frac{1}{2}\rho|U_{rel}|U_{rel}DC_d = \frac{1}{2}\rho|\dot{x}|\dot{x}DC_d \quad (6)$$

If the structural motion is harmonic with amplitude of $A_x$, $x(t) = A_x \sin(\omega t)$, the damping force from the above equation is expanded in Fourier series $$|\dot{x}|\dot{x} = A_x^2 \omega^2 |\cos \omega t| \cos \omega r \approx \frac{8}{3\pi} A_x^2 \omega^2 \cos \omega r = \frac{8}{3\pi} \omega A_x \dot{x} \quad (7)$$

Substituting this result into the above equation as well as rearranging and giving $$(m + m_{entrained})\ddot{x} + 2m\omega_o \left( \xi_s + \frac{2\rho C_d D^2 \omega A_x}{3\pi m \omega_o D} \right) \dot{x} + kx = 0 \quad (8)$$

For small-amplitude vibration in a viscous fluid, the fluid doesn't separate and the drag coefficient for a circular cylinder of diameter D at low Reynolds number (vibration amplitude is much less than one diameter or <<0.3 diameter length) is given by an equation derived by Stokes in 1843, and the drag coefficient $$C_d = f \frac{D}{\dot{x}_{max}} \left( \frac{3\pi^2}{2} \right) \left( \frac{\mu}{\rho \omega f D^2} \right)^{1/2} \quad (9)$$

where frequency is set to natural frequency $$f = \frac{\omega_o}{2\pi}$$

and the velocity amplitude is $x_{max} = \omega_o A_x$. The damping coefficient $C_f$ then evaluated to $$C_f = \left( 4\pi f D^2 \mu \rho \pi^2 \right)^{1/2} \quad (10)$$

Measure Technique for Viscosity Measurement

Volume Control

To combat the problem dealing with the disappearing signal, the volume of the fiber in immersed in fluid is decreased.

Vibration Control

The vibration amplitude can be increased as long as the vibration is within the limit of the $R_e$<1. A lot of high viscosity can be measured in this way.

Knowing how Much is Immersed in the Liquid (Detect the Height of the Immersed Fiber)

Based on the damping coefficient or vibration amplitude, the immersed depth can be measured.

Measuring Techniques

There are two general ways to measure damping, time response and frequency response. In this case, both techniques will be used to calculate the equivalent viscous damping from the simulation and the experiment.

Logarithmic Decrement Method (Technique for Gas Viscosity Sensing)

For the time response method, a technique called logarithmic decrement method is sued. The technique measures the equivalent viscous damping based on the motion of a single degree of freedom in an oscillatory system with viscous damping that is excited by an impulse input. Its response takes the form of a time decay $$Y(t) = A_o e^{-\xi \omega_n t} \sin\left[ \omega_n \left( 1 - \xi^2 \right)^{1/2} t + \phi \right] \quad (17)$$

where $A_o$ is the initial displacement, $\omega_n$ is the natural frequency (undamped), $\xi$ is the equivalent viscous damping factor, and $\phi$ is the initial phase shift equal to 0.

By knowing two peaks, $Y(t_i)$ and $Y(t_{i+n})$ in the time decay that are n cycles apart, and the assumption of $\xi$<0.1:

$$Y(t_i)/Y(t_{i+n}) = e^{-2\pi \xi n} \quad (18)$$

Accordingly, as shown in FIG. 1, the equivalent damping factor is then given by $$\xi = \frac{1}{2\pi n} \ln(Y(t_i(Y(t_{i+n}))) \quad (19)$$

Bandwidth Method (Prefer for Liquid Viscosity Sensing)

Figure 2:
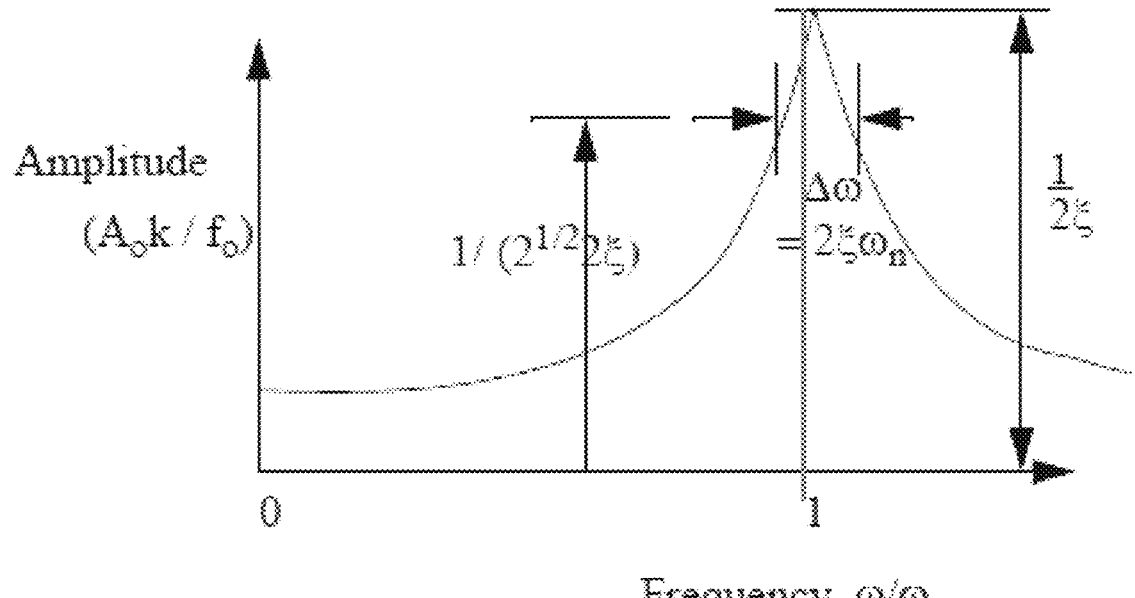
FIG. 2 is a typical frequency response curve.

For the frequency response method, referring to FIG. 2, a technique called the bandwidth method, based on the same linear system analysis, is sued to measure the equivalent viscous damping factor. In this case, a response is shown below as a function of frequency.

$$\frac{A_o k}{f_o} = \frac{\omega_n^2}{\left[ \left( \omega_n^2 - \omega^2 \right) + 4\xi^2 \omega_n^2 \omega^2 \right]^{1/2}} \quad (20)$$

The peak value of this response function is found by taking the derivative of the amplitude with respect to excitation frequency to zero. The resultant peak is given as:

$$\frac{A_p k}{f_o} = \frac{1}{2\xi \left( 1 - \xi^2 \right)^{1/2}} \quad (21)$$

For a case of light damping $\xi$<0.1, $$\frac{A_p k}{f_o} = \frac{1}{\left( 2\xi \omega/\omega_n \right)^{-1}} \quad (22)$$

Two frequencies $\omega_1$ and $\omega_2$, defined as the half power bandwidth $\Delta w$ of the response curve, are found by multiplying the first equation by $2^{1/2}$ and setting it equal to the peak value, third equation. After solving the roots and using substitution, the band with is found to be $$\Delta \omega - \omega_2 - \omega_1 = 2\xi \omega_n \quad (23)$$

The equivalent damping factor $\xi_x$ is then measured in terms of two frequencies $\omega_1$ and $\omega_2$ and the resonant frequency $\omega_n$.

$$\xi = \frac{\Delta \omega}{2\omega_n} = \frac{(\omega_2 - \omega_1)}{2\omega_n} \quad (24)$$

Nonlinear Vibration Viscosity Measurement Technique
Liquid Viscosity Sensing Using Nonlinear Vibration of a
Fiberoptic Sensor The nonlinear dynamic motion of a vibrating optical fiber viscosity sensor through representative cases of primary and super-harmonic resonance is provided. The results show that a nonlinear effect drastically improves the sensitivity of the viscosity measurement by nearly an order of magnitude from the previously developed linear system. Experimental results and several applications of the viscosity sensor are also provided.

Optical techniques for viscosity measurement were not extensively explored until the recent development of utilizing a forward light scattering pattern as an indirect measurement of fluid viscosity in the present disclosure. The concept behind the fluid viscosity measurement is derived from the fluid's frictional damping on the surface of an immersed vibrating optical fiber (or micro pipette) probe. This frictional damping (viscous drag) becomes the dominant factor in the fluid damping for a small fiber's vibration in a still fluid, instead of pressure drag associated with larger motions. Based on this viscous fluid damping model, a viscous, damped frequency response of the fiber's vibration is generated. As a result, a fluid's viscosity can be deduced by an equivalent damping coefficient or the maximum displacement derived from a frequency response. Experimental data revealed that fluid viscosity can be deduced from a comparison between the measured vibration amplitude and damping. A wide range of liquid viscosities (0.1 to 1200 cP) were measured, demonstrating a relatively high sensitivity (0.1 cP).

The present disclosure explores a viscosity measuring technique which makes use of nonlinear effects with a vibrating optical fiber resonator. The use of a nonlinear vibration phenomenon deviates from previous practices, which use only linear dynamics. Significantly higher sensitivity and a much improved signal to noise ratio in the viscosity measurements were found when compared to those of previous linear resonators. By exciting the system to superharmonic resonances, the input and output frequencies become completely separated; thus, this nonlinear technique offers the additional advantage of preventing unwanted ambient vibration from interfering with the output signal. Although a few observations of nonlinear behavior have been reported in the work on vibrating tungsten wire resonators, and in the work on micromachined silicon resonators, no one has exploited nonlinear effects as a way to measure material properties. In this work, the amplitude of a resonator is tuned to activate superharmonic vibration and the response is monitored to determine the viscosity of fluids.

Viscosity sensors based on mechanical resonance, such as piezoelectric resonators, semiconductor resonators, vibrating wire resonators and previously developed optical-fiber based resonators have gained popularity due to their simplicity of design and operation. They detect viscosity by submerging an oscillating probe in the fluid of interest. Viscosity is measured by using the inversely proportional relationship between the vibration amplitude of the probe and the viscosity of the fluid. In practice, the vibration amplitudes are always kept sufficiently small to avoid nonlinear vibration effects. In the present disclosure, however, nonlinear vibration is intentionally excited to improve the sensitivity of viscosity measurements.

In this nonlinear system, the resonator structure is excited so the change of tension inside the fiber during a vibration cycle becomes significant. This is accomplished by creating a relatively large vibration amplitude and subjecting the fiber (clamped at both ends) to a relatively small tension. The resulting nonlinear restoring forces on the fiber yield a vibration response which is more sensitive to the viscosity of a fluid. This nonlinear approach to viscosity measurement is based on the response of a secondary resonant excitation. In the case of superharmonic excitation, the excitation frequency is set at one third of the primary response frequency. In the case of primary response, harmonics of higher order are generated. Both excitations are limited to the stationary case, where the input amplitude, frequencies, and phase angle are all independent of time.

Sensor Principle

System Design

To measure a fluid's viscosity, a technique was derived from the method described in the present disclosure with a diagram of the experimental system shown in FIG. 3. The system consists of a 10 mW He—Ne linearly polarized laser and a single mode fiber (2.75 m diameter core and 125 m diameter cladding). One end of the fiber is anchored to the bottom of a reservoir containing a liquid for testing, and the other end is attached to a piezoelectric transducer. The light from the laser is aimed normal to the single mode fiber and results in a light pattern scattering from the fiber. The displacement of the fiber is measured by the motion of the light intensity variations created by forward light scattering from the fiber. A small light detector (PIN diode, pigtailed to a photodetector) is placed where a strong change of brightness occurs in the scattering pattern. A linear relationship has been found experimentally between a relatively small displacement (<1 mm) and the corresponding intensity variation from the scattering pattern. This provides a simple method for measuring the vibration amplitude of the fiber. The viscosity of the fluid is deduced from the frequency response of the vibrating fiber. The top end of the optical fiber is vibrated by a piezoelectric transducer. The light intensity from the photodectector is collected by using an automated data acquisition system. The frequency response of the fiber is generated by a sinusoidal input sweep, allowing the viscosity of the fluid to be estimated using the peak amplitude of the frequency response.

Numerical Model

Linear System

The fiber in FIG. 3 can be modeled as a uniform circular rod clamped at both ends along the x direction. Consider a small transverse vibration in the w direction excited from a piezo driver; the equation of motion for such system can be expressed as a linear second-order differential equation with constant coefficients, $$(\rho A + C_a \rho_l A)\frac{d^2 w}{dt^2} + C_s \frac{d}{dt}\left(\frac{\partial^4 w}{\partial x^4}\right) + \frac{\partial^2}{\partial x^2}\left(EI \frac{\partial^2 w}{\partial x^2}\right) - F_x \frac{\partial^2 w}{\partial x^2} = \tag{25}$$

$$f(w, t) - F_{drag}$$

where f(w, t) is the excitation force from the piezo driver, w is the displacement of the fiber, EI is the bending stiffness, A is the mass of the fiber per unit length, $C_a \rho_l A$ is the added mass per unit length due to the surrounding fluid, $F_x$, is the tensile force applied along the fiber's axis, $C_s$ is the structural damping coefficient due to string velocity, and $F_{drag}$ is the drag force due to the fluid.

Since the fiber length is relatively long compared to the diameter of the fiber, the stiffness is dominated by $F_x$ because $EI < F_x$ and equation (25) can simplify to a string equation, $$(\rho A + C_a \rho_l A)\frac{d^2 w}{dt^2} - F_x \frac{\partial^2 w}{\partial x^2} = f(w, t) - F_{drag} \tag{26}$$

where $C_s$ is relatively small compared to the fluid damping caused by drag force ($F_{drag}$). If one restricts the relative motion of the fiber to be small and the fluid to Stoke's flow, the drag force is a function of drag coefficient ($C_f$) and transverse vibrating velocity ($\dot{w}$) and the fluid damping coefficient is approximated by $C_f=(4\pi^3 f D^2 \mu \rho_l)^{1/2}$, where $\rho_l$ is the mass density of fluid, D is the diameter of the fiber, f is the driving frequency (Hz) and $\mu$ is the dynamic fluid viscosity.

After introducing the fluid damping caused by the drag force and the assumption $k \sim F_x$, equation (26) can be further simplified as a linear, nonhomogeneous second-order differential equation in the form $$m\ddot{w} + B\dot{w} = kw = f(w, t) \text{ or} \tag{27a}$$

$$\ddot{w} + \beta\dot{w} + \omega_n^2 w = p\cos\omega t \tag{27b}$$

with $m=\rho A+C_a\rho_l A$, $B=(C_s+C_f)$, $\beta=B/m$, $\omega^2=k/m$, and a sinusoidal driving function, $f(w, t)/m=p \cos \omega t$, where p Is the excitation amplitude. If, as a first order approximation, one assumes that the fiber vibrates close to its first linear mode, $$(x, t) = A_o\sin\left(\frac{\pi x}{l}\right)\sin(\omega t).$$

A simple relationship relating the viscosity and the fiber's peak response is easily developed to determine the viscosity from the measured vibration data. It is worth noting that the fluid damping then becomes proportional to the square root of the viscosity m for a given fluid. Based on this fluid damping coefficient and neglecting the structural damping, the peak vibration amplitude $A_o$ of a partially submerged fiber is written as $$A_o = \frac{\rho}{\beta\omega_n} \tag{28}$$

This suggests that in a linear system with a constant driving force of amplitude p, the viscosity $\mu$ is deduced from the peak displacement of the fiber, provided the mass density of the fluid and the temperature are known. The structural damping is conveniently ignored by calibrating the sensor in air before each viscosity measurement.

Nonlinear System

It is known that a linearized analysis of a vibrating structure assumes that the minimum (rest position) tension and the displacements are of such magnitude that the relative change in tension during vibration is small. In the present disclosure, however, a fiber resonator is excited in such a way that the tension variation during a vibration cycle becomes significant. This is accomplished by forcing the fiber to resonate at a relatively large vibration amplitude (greater than the diameter of the fiber=125 μm) and with relatively little tension in the fiber (just enough to avoid desultory motion). The equation of motion for forced vibrations of a damped nonlinear fiber system can then be written as:

$$\ddot{w} + \beta\dot{w} + \left(\omega_n^2 w \pm \alpha q(w)\right) = p\cos(\omega t) \tag{29}$$

where $\alpha$ is a small factor, and q(w) is a nonlinear function of w. For a system in which the load displacement curve is symmetric with respect to the origin, the nonlinear function is assumed to have the form $$q(w) = \sum_{i=1}^{n} \alpha_i w^{2i+1} \tag{30}$$

where i is an integer greater than or equal to 1.

If the system is made to deviate slightly from linearity, only the first term of this expression is kept and can be written as $\varepsilon w^3$, where $\varepsilon$ is a small parameter. The equation of motion, with the assumption of linear viscous damping, can then be written as $$\ddot{w} + \beta\dot{w} + \left(\omega_n^2 w \pm \varepsilon w^3\right) = p\cos(\omega t) \tag{31}$$

where $\varepsilon w^3$ is the nonlinear term. Selecting a positive sign represents stiffening of the system and negative sign represents softening of the system. Equations with this form are often called Duffing's equations and are the basis of our nonlinear system model. The optical fiber acts like a stiffening system around its natural frequency due to increased axial tension from flexing and the positive sign is kept.

Superharmonic Resonances

In the superharmonic resonance experiment, viscosity measurements are obtained using a driving frequency near $\omega=\omega_n/3$, as suggested by the cubic term in equation (31). The response is observed about $\omega_n$, the linear resonant frequency. Following the derivation in Appendix A, the resulting equation of motion for this superharmonic case (substituting $\omega=\omega_n/3$ into A9) is:

$$\frac{3}{9}A_a\omega_n^2 + \frac{3}{4}\varepsilon A_o^3 = \sqrt{p^2 - \frac{(\beta\omega_n A_o)^2}{9}} \tag{32}$$

where the damping coefficient $\beta=B/m$ and $B=C_f=(4\pi_3 f D^2 \mu \rho_l)^{1/2}$ as before and $A_o$ is the vibration amplitude.

Equation (32) may be seen as representing the intersection of the cubic function of $A_o$ and the linear function of $A_o$. Collection of these intersection points generates the response spectrum for the nonlinear system.

The objective of nonlinear excitation is to see the effects of the viscous damping on vibration amplitude at resonance. One can see the increasing effect of damping by comparing the above equation and the linear equation. By setting the frequency around the first resonance frequency in equation A9, i.e. $\omega \sim \omega_v$, it simplifies to the form $$(\frac{3}{4}\varepsilon A_0^3)^2 = p^2 - (\beta(\omega_n A_o))^2 \text{ or} \tag{33a}$$

15

-continued $$C_1\beta^2A_o^2 + C_2A_o^6 = p^2 \text{ where} \tag{33b}$$

$$C_1 = \omega_n^2 \text{ and } C_2 = \left(\frac{3}{4}\varepsilon\right)^2$$

If the nonlinear term vanishes, $\varepsilon=0$, then amplitude can be found as a function of $\beta$:

$$A_o = \frac{p}{\beta\omega_n} \tag{34}$$

At small damping, $A_o$ for the nonlinear case changes more rapidly for a given change in $\beta$. The overall magnitude of $A_o$ is also smaller for a given $\beta$. Based on this finding, it is apparent that the superharmonic resonance is more sensitive to damping when the damping is relatively small. If the damping becomes larger, the third order $$A_o^6$$

becomes less significant, and the equation (33b) also reduces to the linear response equation (34). This causes the non-linear system to behave like a linear system. This finding was verified by experimental results; where damping increases, the hysteresis disappears and the frequency response curve looks more symmetrical.

Higher Order Harmonic Resonances

For the case of nonlinear forced vibration, the resulting equation of motion appears as, $$A_o(\omega_n^2 - \omega^2) + \frac{3}{4}\varepsilon A_o^3 = \sqrt{p^2 - (\beta(\omega A_o))} \tag{35}$$

It is important to clarify the difference between the maximum amplitude and the resonance amplitude since the maximum amplitude no longer occurs at the resonance frequency. The resonance amplitude can be found by simultaneously setting the damping and forcing term of (11) to zero which gives the undamped amplitude equation $$A_o(\omega_n^2 - \omega^2) + \frac{3}{4}\varepsilon A_o^3 = p.$$

This allows one to set the left side of (11) equal to zero and to solve for the resonance amplitude $A_0$ which is the same as equation (34):

$$A_o = \frac{p}{\beta\omega_n} \tag{36}$$

Figure 4:
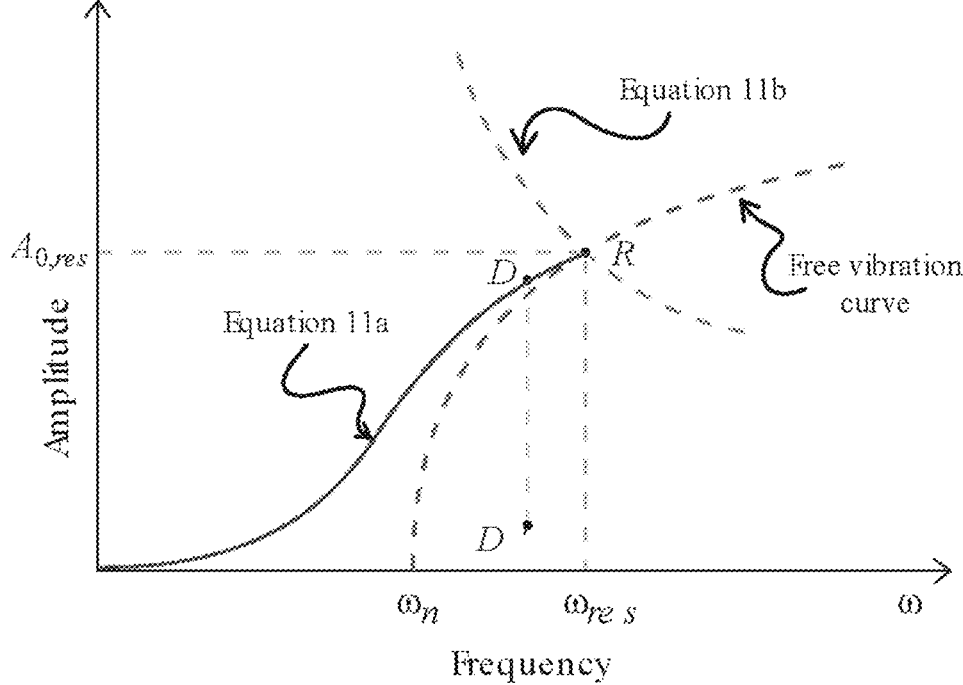
FIG. 4 shows typical nonlinear response spectra in the case of a hardening stiffness.

Once again the resonance amplitude appears to be proportional to $1/\sqrt{\rho_1\mu}$ as in the linear model of the primary response case. Since the maximum point may not actually be attained (because of the hysteresis that occurs as indicated from point D to D' in FIG. 4), this rules out the possibility of true resonances. The damped vibration amplitude is therefore measured at the point where the jump occurs and also at the point where maximum amplitude occurs. Each technique is analyzed in the following discussion and different measuring schemes will be derived from each technique.

If the viscosity is measured based on the maximum amplitude, the maximum amplitude can be obtained by differentiation of (11) with respect to $\omega$. The resulting maximum displacement appears as $$A_o = \sqrt{\frac{p^2}{(\beta^2\omega^2 + \frac{\beta^4}{4})}} \tag{37}$$

Based on the above equation, it is clear why the maximum amplitude is more affected by damping $\beta$ in the nonlinear system than in the linear system. Although the maximum vibration amplitude of both systems decreases linearly with increasing frequency, the additional constant $\beta_4/4$ in the nonlinear system will offset the amplitude even more. This is especially true in the case of soft structures vibrating in a highly viscous fluid. This effect was verified by experimentation.

In the experiment, the first and the third resonances were examined using superharmonic and primary resonance excitations. From the frequency responses measurements, the peak amplitude of vibration versus the inverse square root of the density and viscosity and the frequency shifts versus the inverse square root of the density and viscosity were derived (FIGS. 8A-8C and 9A-9B). These results were compared and a table was generated summarizing the damping measurements using each technique (see Table 1).

Table 1 shows six different schemes using superharmonic and primary resonance responses for viscosity measurement.

TABLE 1

| | input frequency/output frequency | | | | | |
| | $f_1/f_1$ | $f_{1/3}/f_1$ low tension | $f_{1/3}/f_1$ hi tension | $f_1/f_3$ | $(f_3/f_3)_{linear}$ | $(f_1/f_1)_{nonlinear}$ |
| --- | --- | --- | --- | --- | --- | --- |
| sensitivity in dB (air to 40% concentration) | 10.4 | 17.5 | 14.3 | 22.0 | 27.8 | 15.0 |
| sensitivity in dB (water to 40% concentration) | 4.0 | 10 | 5.0 | 15 | 7.5 | 7.0 |

Figure 5:
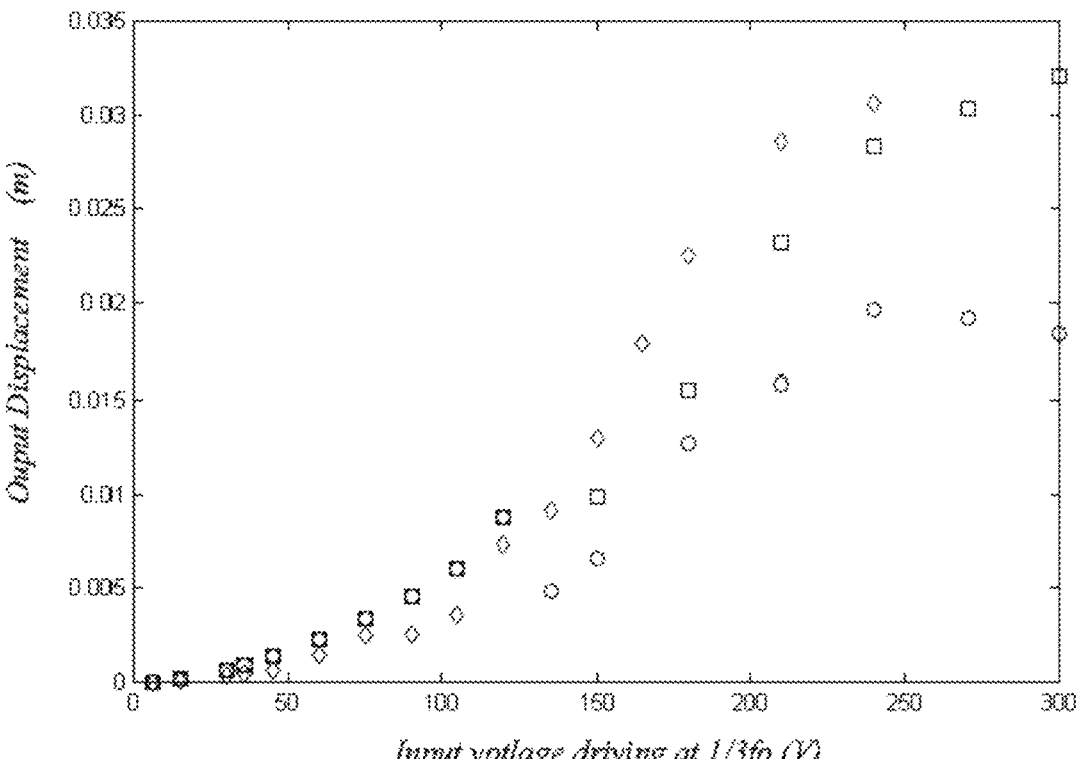
FIG. 5 shows plate piezoelectric transducer electrical to mechanical coupling characteristic curve (the signals are taken at (square) 50, (diamond) 600 and (circle) 1800 Hz after power amplification of 30 times).
Figure 6:
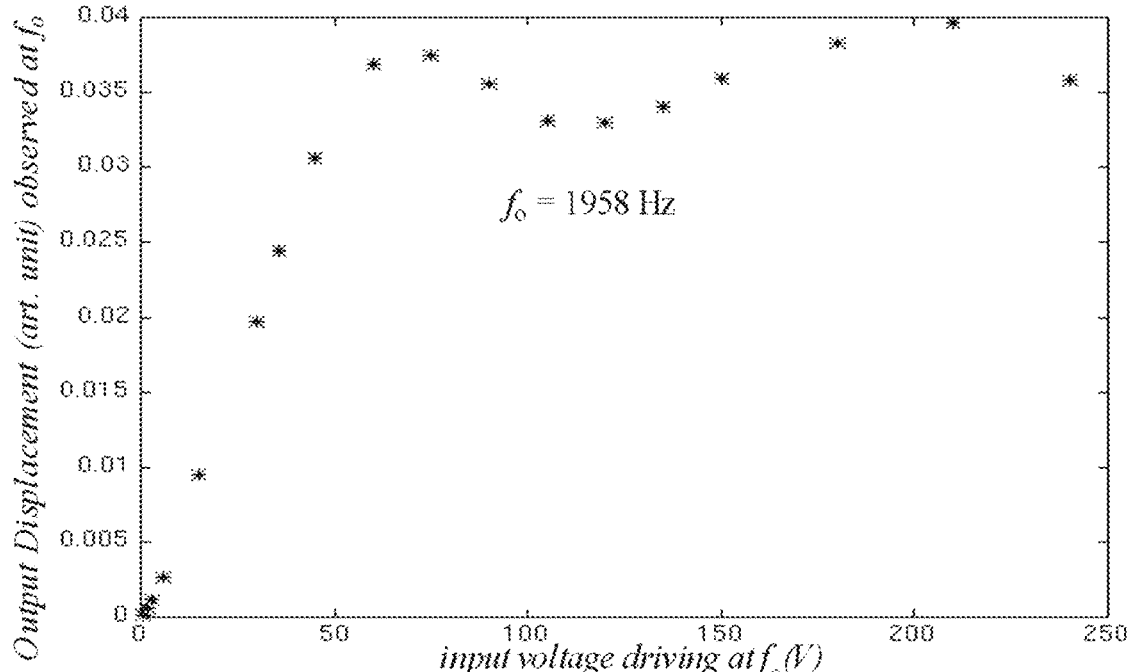
FIG. 6 shows fiber displacement versus input voltage to piezoelectric transducer observed at 1958 Hz.
Figure 7:
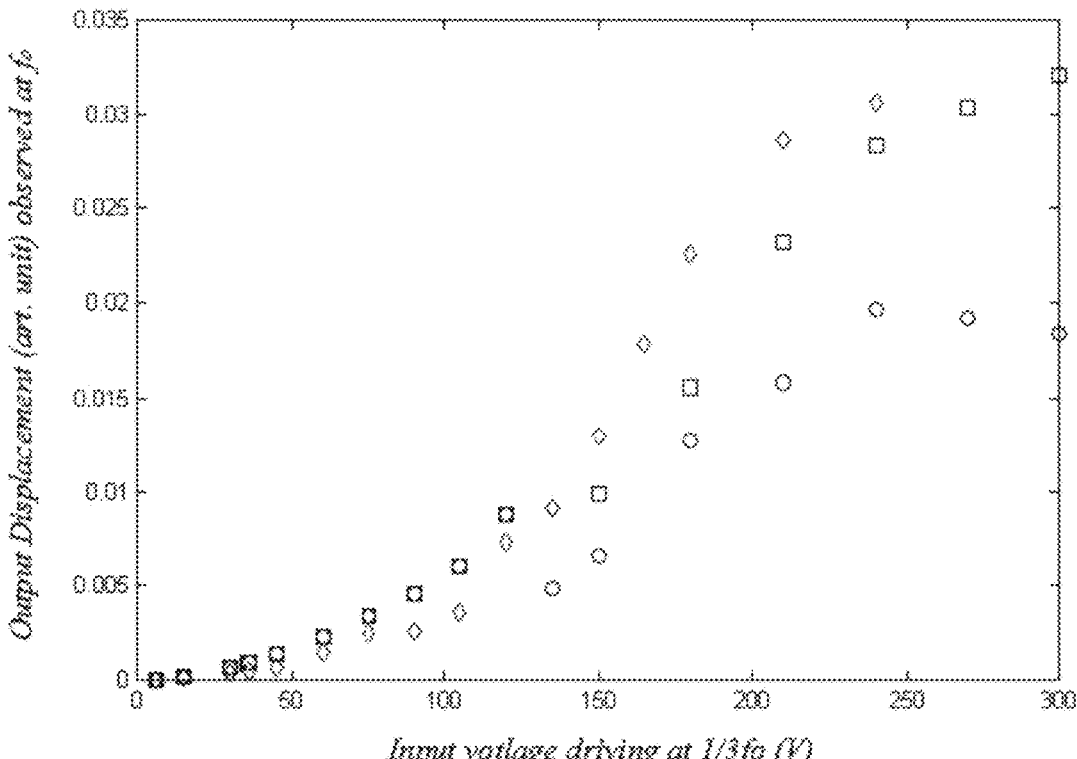
FIG. 7 shows fiber displacement versus input voltage to piezoelectric transducer driving at ⅓$f_o$, where $f_o$=(square) 610 Hz, (diamond) 920 Hz, and (circle) 1958 H.

Before exciting the fiber into a nonlinear vibration region, the supporting components in the system are carefully checked to ensure they will not affect the nonlinear vibration of the fiber. One such component is the piezoelectric transducer driver. The electrical-mechanical coupling needs to remain linear for the frequencies at which the experiment is conducted. Three different frequencies (50, 600, and 1800 Hz) were selected for the investigation (FIG. 5). In each case, the displacement of the transducer versus input voltage remains linear until it reaches the power amplifier's threshold voltage of +5V (+150V after amplification). For the fiber displacement versus input voltage to the transducer, the linearity remains until the system reaches the amplifier's threshold voltage of +50V (with amplification) for the case of a first harmonic main response (see results in FIG. 6). When the driving frequency is $\frac{1}{3}$ of the linear resonance frequency, as in the case of the superharmonic excitation, the relationship is nonlinear at any input voltage (see FIG. 7). A discontinuity is observed near the input voltage of 150 V due to a change in the power amplification from linear amplification to nonlinear amplification.

A series of sinusoidal steady-state input waveforms were applied to the piezoelectric transducer to improve the consistency of the output's hysteresis response ("jump") such that it occurs at the same frequency every time. If the input was chirped, the jump is very likely to occur at a higher frequency because the region is unstable and the transient noise could easily cause the peak to move to higher frequencies. In addition, the chirp input does not give the fiber enough time to react to the instantaneous vibration input frequency and thus there is a time lag before the response curve jumps down.

Several studies were conducted on the optical set-up to verify that the increase in the damping was due to the switch from the linear to nonlinear vibration and not due to the optical system.

One study investigated the calibration of the location where the laser beam is incident on the fiber. This location determines the magnitude of each harmonic response, and thus it is important to properly position and align the laser to receive the desired harmonic resonances. The nodes of each harmonic were avoided since all harmonics needed to be detected. Based on the results of the study, the experimental references were set at 60% and 57% of the fiber's length as measured from the bottom of the fluid reservoir. The data for the superharmonic resonance experiments were collected at 60% of the fiber's length, while the data for the linear and nonlinear primary resonances were measured at 57% of the length. The latter case should give a larger amplitude for odd modes up to the 6th mode over the former case. However, the results show otherwise. This proves that the location where the laser is incident did not play a part in the amplitude increase.

Another study was conducted to see the changes in the reference scattering pattern when the laser is moved to a different location along the fiber. However, despite the laser's different location, the two reference scattering patterns had the same intensity (off by less than 0.5%). This was expected because the deviation of the fiber's diameter based on the manufacturer specifications is around 1%.

With the system verification studies completed, the primary experiment was conducted as follows: the damping on the peak vibration amplitude of the fiber probe was measured while immersed in different sucrose-water concentrations (0 to 40%) (Table 2). Temperature changes that modified the sucrose's viscosity and mass density were tracked but no adjustments were included in the calculations because the values of viscosity and mass density for sucrose water mixtures at different temperatures were not published in any current literature. In addition, the temperature variation stayed within ±1 degree C., so the effect was assumed to be not significant. However, if this slight variation is significant, it might explain some deviations in the results discussed below.

Table 2 shows mass density and viscosity of sucrose solution, volume=200 ml, 20° C.

TABLE 2

| | Mass density $(g/cm^3)^+$ | Viscosity $(pa\ s)^+$ |
|---|---|---|
| Air | $1.21 \times 10^{-3}$ | $1.8 \times 10^{-3}$ |
| Water | .998 | .001 |
| 5% Sucrose solution | 1.0158 | .00114 |
| 10% Sucrose solution | 1.0360 | .00133 |

TABLE 2-continued

| | Mass density $(g/cm^3)^+$ | Viscosity $(pa\ s)^+$ |
|---|---|---|
| 20% Sucrose solution | 1.0788 | .00194 |
| 30% Sucrose solution | 1.1247 | .00318 |
| 40% Sucrose solution | 1.1741 | .00615 |

Superharmonic Resonances

First, the effect of damping caused by superharmonic excitation comparing the results with the linear case is investigated. In addition, the effect of tension on the damping measurement is also studied. Two different tensions were used in the superharmonic tests. In one test, the applied tension was the same as the linear case; in the other test, the tension was ⅛th of the original tension. It can be seen that using both smaller tension and nonlinear effects causes the damping sensitivity to increase in the measurements.

Ideally, the tension on the fiber should be reduced to zero to emphasize the vibration-induced nonlinear effect and thus maximize the increase of the nonlinear damping effect. However, further investigation found that a small amount of tension was required to stabilize the system. The system was found to drift slowly to a steady state amplitude and a resonant frequency (~600 to 700 Hz) when the fiber was not subjected to tension. The resonant frequency initially rose slowly due to a slow build-up in the internal stresses caused by large vibration. It can be seen that by applying approximately ⅛th of the original tension, the drift can be eliminated. As a result, a constant resonance frequency of $f_o$=720 Hz and a constant baseline intensity was obtained.

The corresponding normalized vibration amplitudes of the fiber sensor were generated near its natural frequency as a function of viscosity. For the linear case, the first harmonic response was found by careful observation (see FIG. 8A). For the nonlinear case, the first harmonic is observed but the driving frequencies were then set at ⅓ of the observed frequencies. Two different tensions were applied during the superharmonic experiments, with one experiment performed at the original tension as in the linear case (see FIG. 8B) and the other done at ⅛th of the original tension (see FIG. 8C). Responses from all three excitations appear stable, with an overall noise level less than 0.2 dB. The frequency drift is less than 3 Hz and the frequency resolution is at 0.25 Hz.

Based on the frequency responses, the normalized peak amplitude in all three responses decreases with increasing concentration. It was found that superharmonic excitation increased viscosity measurement sensitivity. For the high tension case, the gain improved by about 4.0 dB over the same samples tested, a 40% overall sensitivity improvement. When the tension was reduced to ⅛th, the viscosity sensitivity increased by 7.5 dB, a 70% overall sensitivity improvement. In terms of gain per unit of viscosity, it increased from 1.7 dB/cp to 2.9 dB/cP (Table 1). For liquid viscosity measurements between 1 cp to 6 cp, the improvement is even more drastic. The sensitivity to viscosity has improved by as much as 100% in the lower-tension superharmonic case (Table 1).

When converting the normalized peak response into the actual amplitude of vibration (see FIG. 9A), the correlation between the amplitude of vibration, the inverse square root of fluid viscosity and the mass density in the system shows good linearity and agrees with the linear relationship predicted by theory. For the case of superharmonic excitation, the curve displays a nonlinear relation between the peak vibration amplitude and the inverse square root of fluid viscosity and mass density for both higher and lower tensions. Both curves appear to have transition point(s) that correspond to a change of direction for the resonant frequency shift due to increased stiffness in the system (see FIG. 9B). For superharmonic excitation at higher tensions, the curve appears to have a slope change for sucrose concentrations greater than 10%. The curve for superharmonic excitation with lower tension remains nonlinear throughout and shows two slope changes: one at 10% concentration and another at 30%. The curve for sucrose concentrations greater than 30% appears to have the same slope as concentrations less than 10%.

Based on the experiment results, it appears that both superharmonic excitation systems with original and ⅛th the original tension were more sensitive to the damping because of the third order term $A_o{}^3$ in the nonlinear equation, where $A_o$ changes more rapidly for a given change in $\beta$. It also appears that the initial tension applied to the fiber affects the gain for viscosity damping measurement. The increase in damping for the case of lower tension is due to the fact that a system with a smaller tension can vibrate more freely than with larger tension. This reduction in the system's rigidity allows larger displacements to occur when the system is excited with oscillations of the same magnitude. Since the damping force is a function of velocity, damping increases when velocity becomes larger. This creates more damping in the system, as seen in the low tension superharmonic experiments.

Figure 9A:
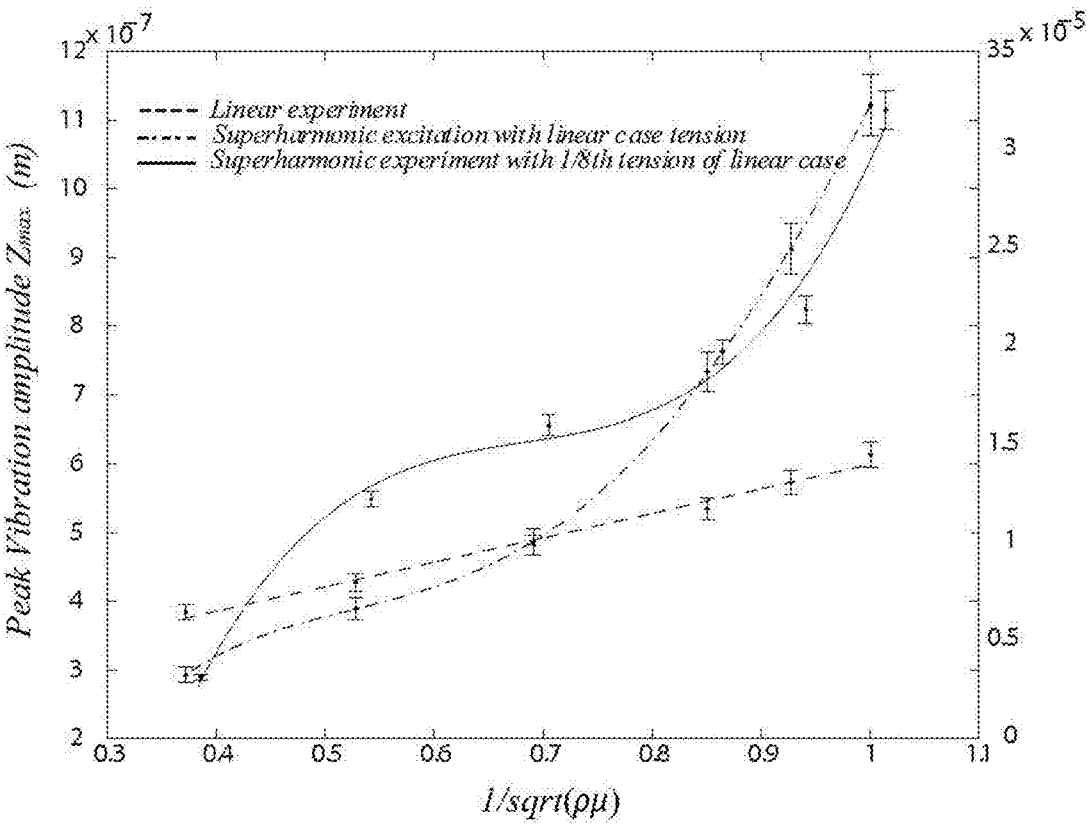
FIGS. 9A and 9B show peak vibration amplitude versus 1/sqrt(pp) (see FIG. 9A) and frequency shift versus 1/sqrt (pp) for linear and superharmonic excitations (see FIG. 9B), respectively; the plot in (a) consists of two vertical axes: axis on the left is for the linear (dash) and superharmonic excitation with original tension (dashdotted), and axis on the right is for the superharmonic excitation with ⅛ original tension (solid).
Figure 9B:
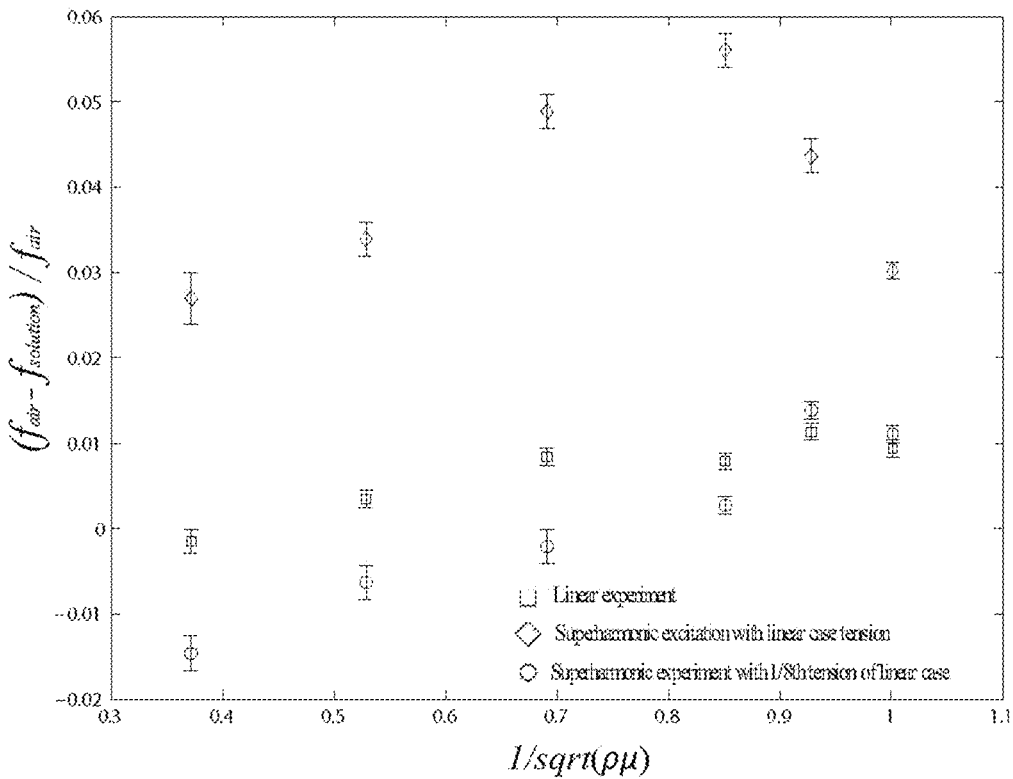

An upward shift in the system's natural frequency with increasing sucrose concentration was observed for both superharmonic and linear systems above 10% concentration (see FIG. 9B). The lower tension superharmonic experiment exhibited a similar pattern of frequency shift to the linear case. However, the amount of frequency shift was greater than in the linear case, and the peak resonant frequencies went above the natural resonant frequency in air when the sucrose concentrations were greater than 20%. The case of superharmonic excitation with the same tension as the original linear case exhibits the same degree of frequency shift as in the linear case. The frequencies also show the same parabolic curve as the linear case when concentration increased. However, the resonant frequencies for concentrations greater than 20% never went above the resonant frequency in air, as occurred in the linear and lower tension superharmonic cases.

Figure 8A:
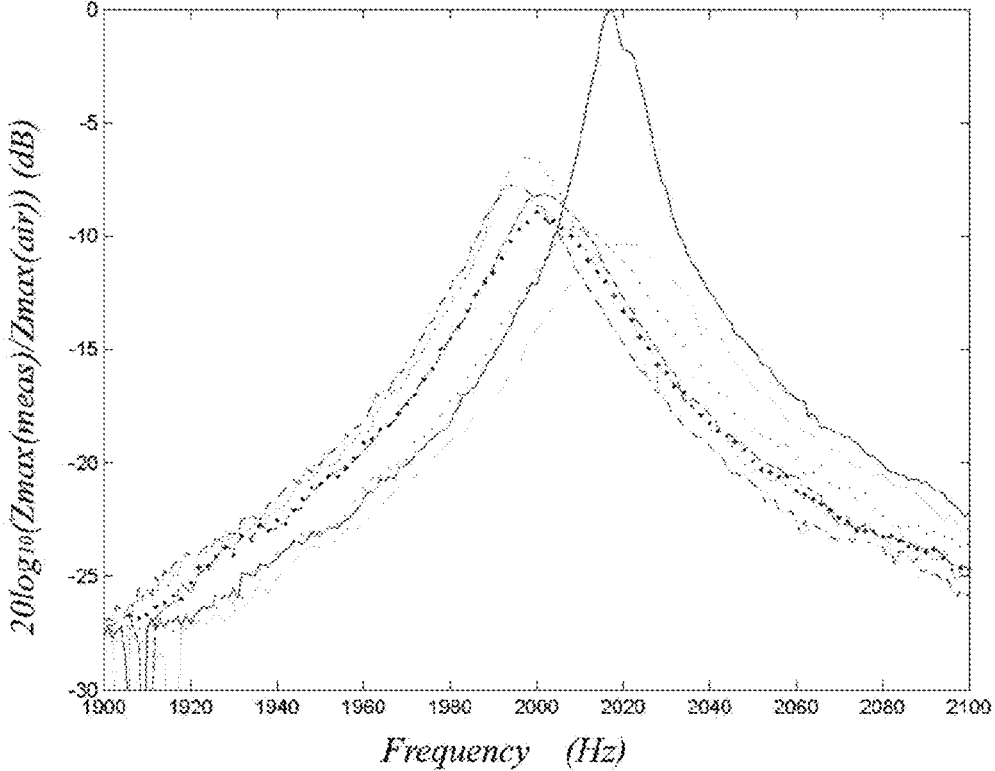
FIGS. 8A, 8B and 8C show experimental results of the vibrational amplitude of the fiber-optic probe near its resonant frequency as a function of viscosity: in a linear system ($f_{observed}$~2000 Hz) (see FIG. 8A), superharmonic excitation ($f_{observed}$~2000 Hz) (see FIG. 8B), and superharmonic excitation with ⅛ of original tension ($f_{observed}$~720 Hz) (see FIG. 8C) [excitation frequencies for (b) and (c) are ⅓ of response frequencies (1st harmonic), and fluid sample are air (dark solid), deionized water (dotted), 5% (dashdotted), 10% (dashed), 20% (point), 30% (light point), 40% (light solid) sucrose solutions].
Figure 8B:
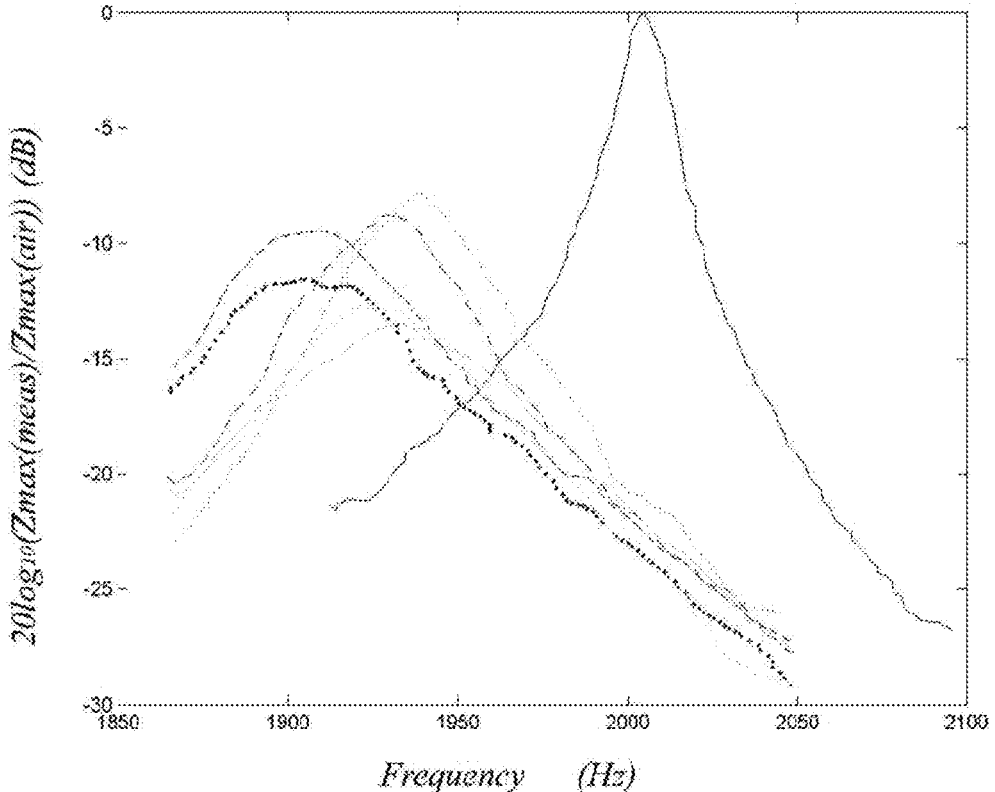
Figure 8C:
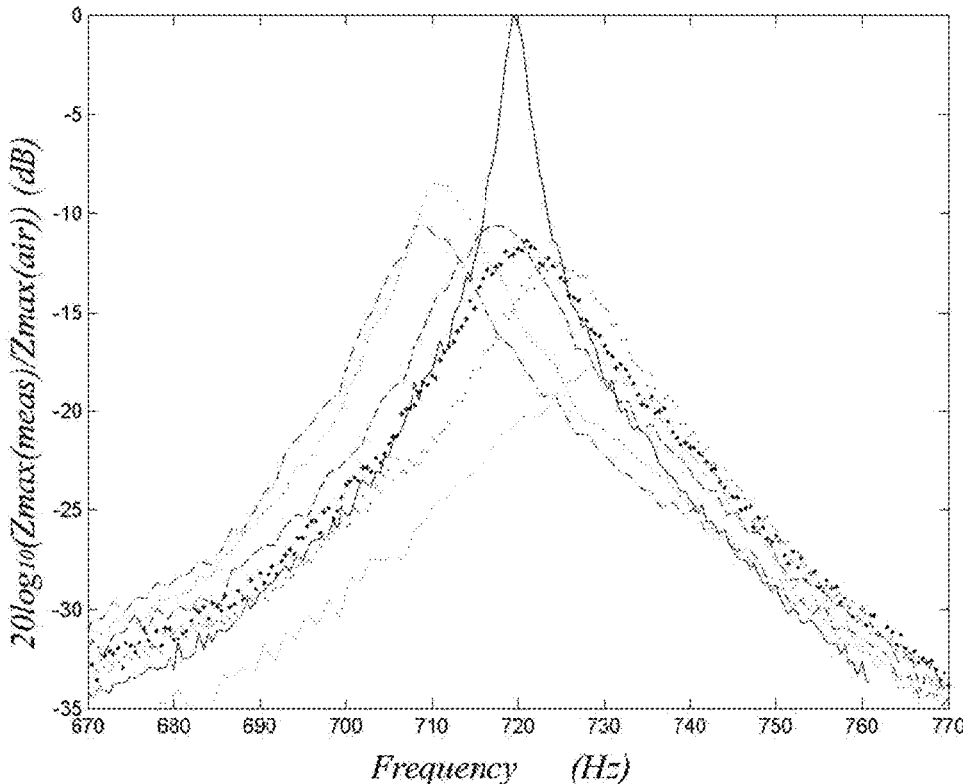

The lower tension superharmonic experiment (see FIG. 8C) exhibited a similar pattern of shift as in the linear case (see FIG. 8A). The percentage of frequency shift in the superharmonic case was actually greater than in the linear case. It is still uncertain what causes the frequency to go up when the concentration increases. One hypothesis is that the frequency increase in the linear case might be due to the linearity of the system being gradually overcome by damping from the increasing viscosity, thus shortening the effective length of the fiber and increasing the resonance frequency. For low tension superharmonic excitation, it can be seen that the resonance frequencies were above the natural frequency in air when the sucrose solutions were greater than 10%. It is likely that the low tension superharmonic case is more susceptible to viscous damping simply because the system has a larger vibration velocity with ⅛th of the tension of the linear case. Thus, there is a stronger increase of the overall damping effect on the immersed portion of the fiber. The degree of the shift is less when there is more tension in the system because $A_o$ is a lot smaller and the system is stiffer. This could explain why the original tension superharmonic case frequencies never went above the natural frequency in air.

Higher Order Harmonic Resonances

Figure 10A:
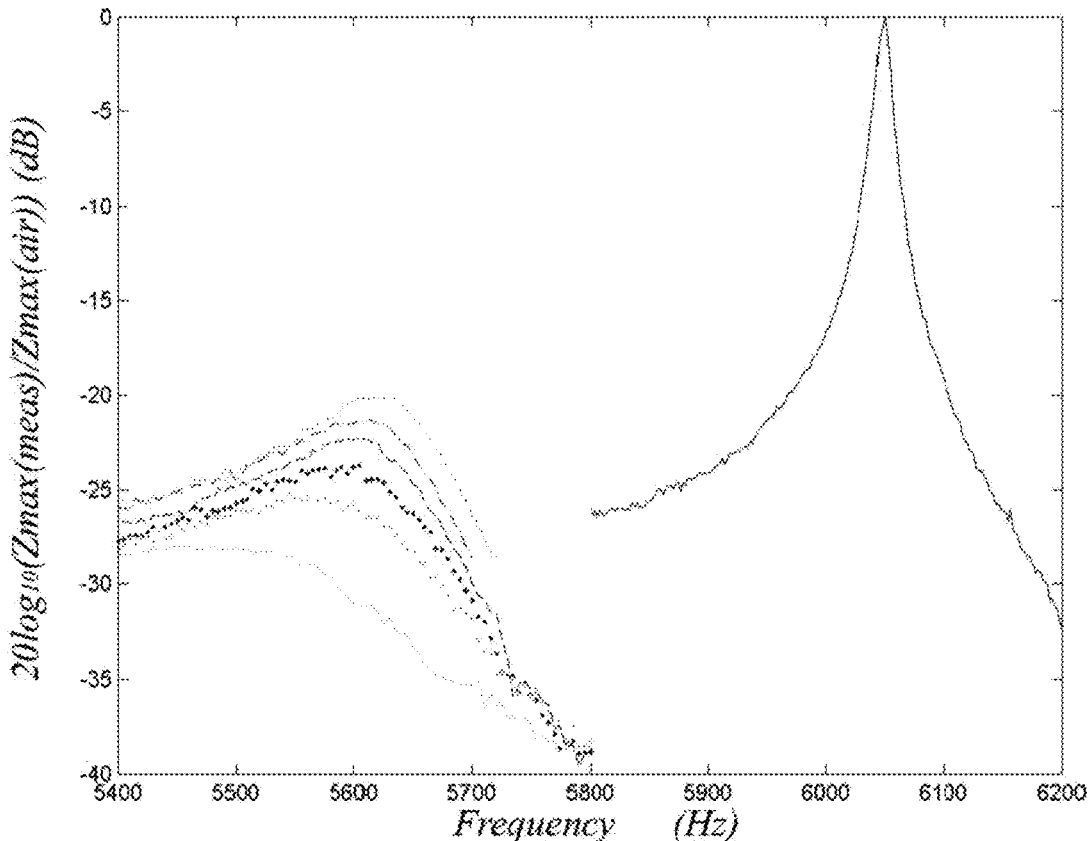
FIGS. 10A, 10B and 10C show viscosity experiment: Linear primary resonances driving near its third harmonic frequency ($f_{observed}$~5800 Hz) (see FIG. 10A), superharmonic excitation observed at 3rd harmonic resonance ($f_{excitation}$~2000 Hz, $f_{observed}$~5800 Hz) (see FIG. 10B), and nonlinear primary resonances ($f_{observed}$~5800 Hz) (see FIG. 10C), respectively; fluid samples are air (dark solid), deionized water (dotted), 5% (dashdotted), 10% (dashed), 20% (point), 30% (light point), 40% (light solid) sucrose solutions; and due to hysteresis, plot curves in FIG. 10c were plotted with points and legends are replaced with labels as shown in the figure.
Figure 10B:
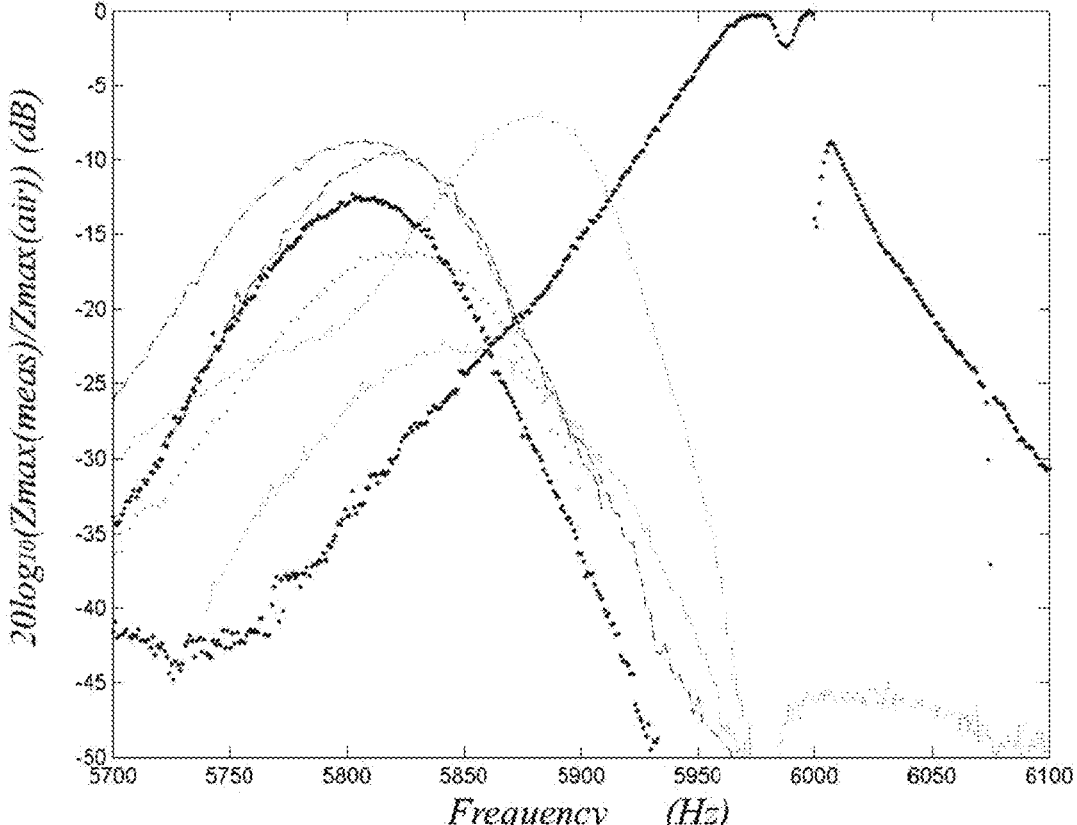
Figure 10C:
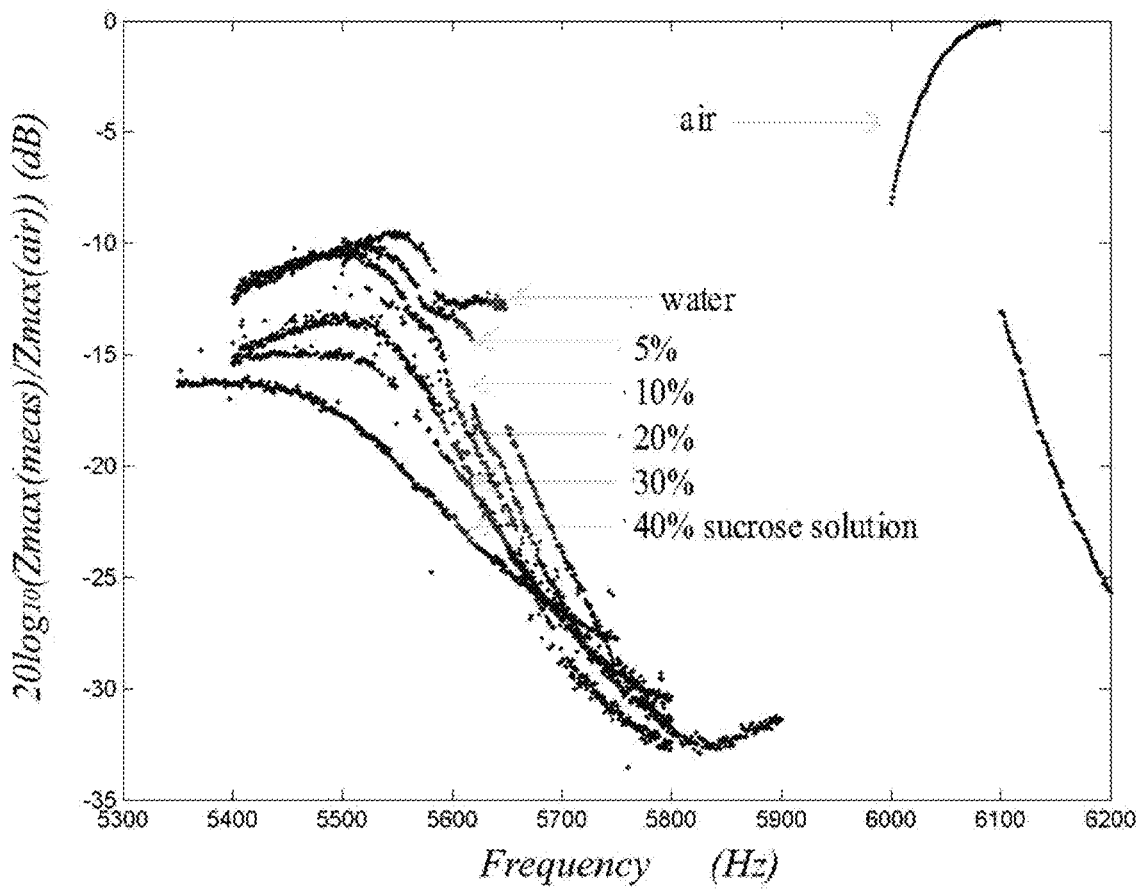

The techniques used in this experiment were: 1. observe the frequency responses of the third harmonic in a linear system (see FIG. 10A); 2. excite the system into a nonlinear region using different driving (~2 kHz) and response frequencies (~6 kHz) (see FIG. 10B); 3. excite the system into a nonlinear region using the same frequency for both driving and response (~6 kHz) (see FIG. 10C). The overall signals are less stable where noise levels fluctuated around 0.4 dB. The frequency drift is also high (+10 Hz) partly because the frequency resolution is lower at this frequency (2 Hz).

Based on the results, it can be found that the vibration amplitude in both linear and nonlinear primary resonance of higher order harmonics were even more susceptible to damping. For the nonlinear third harmonic response, a 5 dB increase or 50% improvement was observed in the air to 40% sucrose concentration measurement (see Table 1). For the third harmonic driven at the first harmonic frequency, the improvement was 120%. The most improved was in the linear third harmonic response, where the increase was 178%. For the liquid viscosity measurement between 1 cp to 6 cp, both linear and nonlinear third harmonic responses showed a 3 to 11 dB increase compared with the linear first harmonic response. Among them, the third harmonic driven at the first harmonic frequency shows the most improvement among all the higher order harmonic cases. For liquid viscosity measurement, the gain per unit of viscosity for the superharmonic case is highest among all cases at 3 dB/cp.

Figure 11A:
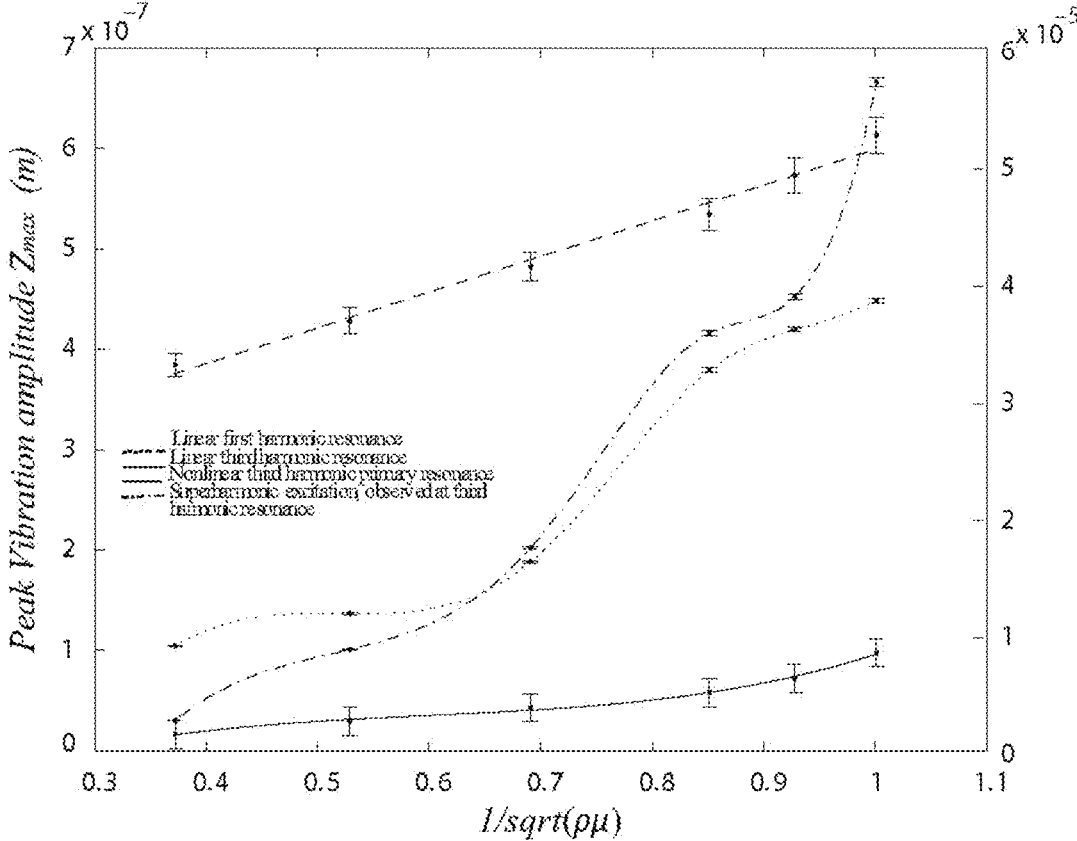
FIGS. 11A and 11B show peak vibration amplitude versus 1/sqrt(pp) (see FIG. 11A) and frequency shift versus 1/sqrt (pp) (see FIG. 11B); The plot in (a) consists of two vertical axes: axis on the left is for the linear first harmonic resonance (dash) and third harmonic resonance (solid), axis on the right is for nonlinear third harmonic primary resonance (dotted) and superharmonic excitation observed at third harmonic (dashdotted); errors are smaller than the size of symbols used for data points in the plots; and errors are smaller than the size of symbols used for data points in the plots.

When the normalized intensity is converted to vibration amplitude, it can be found that the linear third harmonic resonance has the lowest magnitude among the four we compared (see FIG. 11A). This is expected since it is harder to generate high vibration amplitudes at higher order resonances. It is also due to the fact that the same input was given for all the linear system tests. Therefore, it is expected that the third harmonic will have lower peak vibration amplitude than the first harmonic. Both the nonlinear and superharmonic cases exhibited larger vibration amplitudes (two orders higher) than the linear cases. This make sense because the displacement input for the nonlinear and superharmonic cases is about 150 times higher than the input for the linear first harmonic response. For the superharmonic and nonlinear third harmonic resonances, the peak vibration amplitude versus $1/\sqrt{\rho_1 \mu}$ are nonlinear. Both curves also have two transitions points, one occurring around 10% sucrose concentration, and the other at 30% concentration.

From the nonlinear third harmonic response, an interesting transition of the system can be observed when it gradually changed from nonlinear to linear due to the increased damping. This is seen by the disappearance of the hysteresis in the response curve after the concentration fell below 10% (see FIG. 10C). Although the curve still appears nonlinear, the effect is probably reduced by damping. This gradual change from nonlinear response to linear response due to damping is also observed in the superharmonic excitation (see FIG. 10B) where the jumps disappeared after water was used as the solution.

The experimental results confirm that the higher order harmonic responses are more susceptible to damping. Based on equations (10) and (12), it can be known that excitation of higher order harmonics does indeed increase the damping in both linear and nonlinear systems. Since the constant $\beta^4/4$ in the nonlinear system is relatively small compared to the $\beta^2\omega^2$, the linear response equation can be substituted for the nonlinear response. Based on $A_o=2p/(\omega\beta)$, one can expect that the third harmonic resonance amplitude will undergo a larger change than the first harmonic resonance because the frequency is three times larger. As expected, an increase in damping for both the linear and nonlinear third harmonic response can be observed (as shown in FIG. 11A). Based on the curve, the amplitude of the vibration appears higher for the lower frequencies. This confirmed the findings where the linear main response is riding above the primary resonance of the third harmonic. It can also be found the rate of change in vibration amplitude versus $1/\sqrt{\rho_1\mu}$ is very close to the nonlinear primary resonance and the linear third harmonic main response. This justifies the assumption that the $\beta^4/4$ term in the nonlinear system cannot contribute any significant amount of damping to the nonlinear system.

Figure 11B:
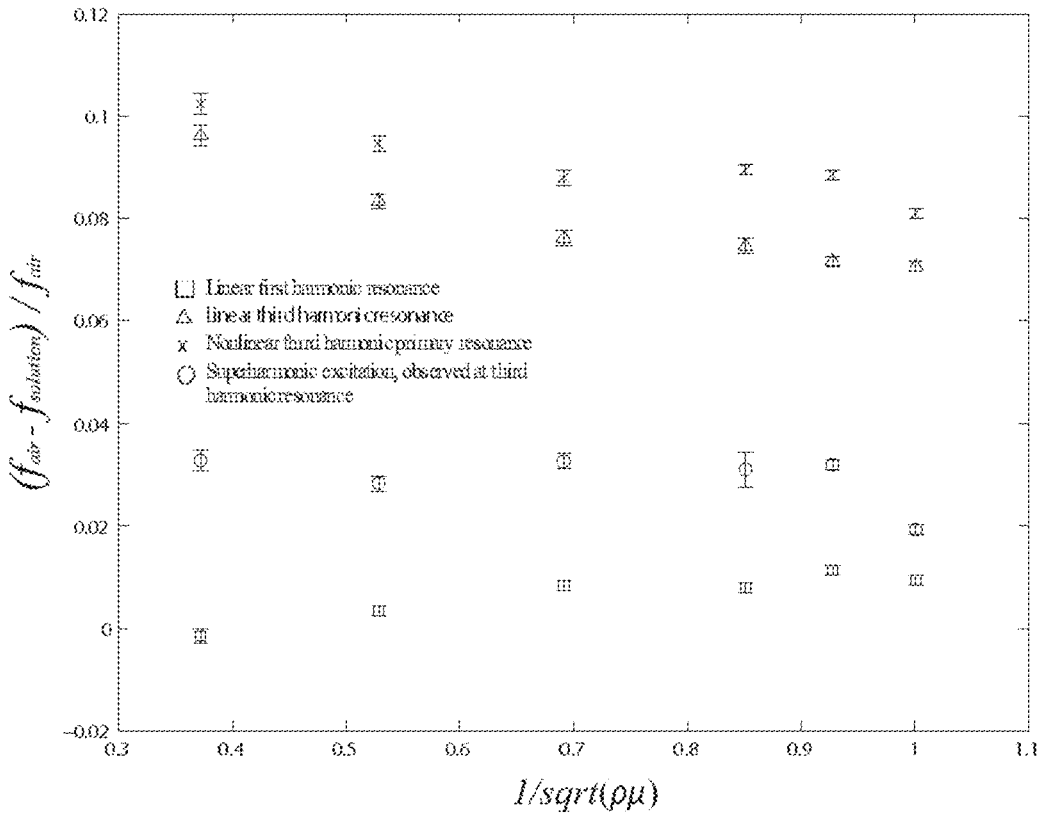

The change in the direction of the frequency shift due to increases in viscosity did not appear in either the nonlinear or the linear third harmonic response (see FIG. 11B). This was very different from the results we got from the linear first harmonic and the superharmonic excitation where a change in direction of the resonant frequency occurred, actually increasing with higher sucrose concentrations. The patterns of the frequency shift for both third harmonic responses are very similar. However, the magnitude of the frequency shift is slightly larger for the nonlinear case. This is expected since the resonance frequency (defined as the frequency with the maximum amplitude) for a hardening nonlinear system occurs at higher frequencies than a linear case. Again, the pattern of frequency shift patterns observed in the linear and superharmonic resonances also appears in the superharmonic excitation of the third harmonic (FIG. 10B).

Among all the measuring techniques discussed, the superharmonic excitation at the third harmonic gives the best results for viscosity measurements of liquids (water to 40% sucrose concentration). It shows the best sensitivity (3 dB/cp) and the biggest vibration amplitude change with respect to the changing viscosity (see Table 1). The reason for this could be from the increase in the sensitivity of higher order harmonics plus the effect of the superharmonic excitation.

Forcing a fiber resonator to oscillate in a nonlinear regime improves the sensitivity of the viscosity measurement by nearly an order magnitude from developed linear systems has been shown. Using different detection schemes either in superharmonic resonance or primary resonance, sensitivity level improvements ranged from 1 dB/cP to 11/6 dB/cP (Table 1). As shown in a previous successfully tested linear case where viscosity was as high as 12500 cP (such as for silicone oil), the increase in sensitivity and magnitude of the vibration of the nonlinear system should allow for an even greater dynamic range of viscosity measurements. Its increased dynamic range also should allow accurate measurements of the viscosity of gaseous materials. As previous tests have shown, the technique also can be used to measure fluid mass density and mass flow with no modification in the setup. The most desirable advantage of this technique over other techniques is that the maximum viscosity that can be measured depends solely on the input voltage to the piezoelectric transducer.

It is our goal in the near future is to develop an empirical formula to describe the corresponding immersion depth for each system. It is believed that studying the effects of partial immersion will provide some additional information for mass and viscosity measurements. It is our hope that eventually this information will help develop ways for monitoring fluids where the viscosity, depth, and fluid flow that are not well characterized.

According to the present disclosure, the embodiments of fiber optic sensors for viscosity and mas flow measurement are described in detail as follows.

First Embodiment

Forward Light Scattering Technique

Figure 12:
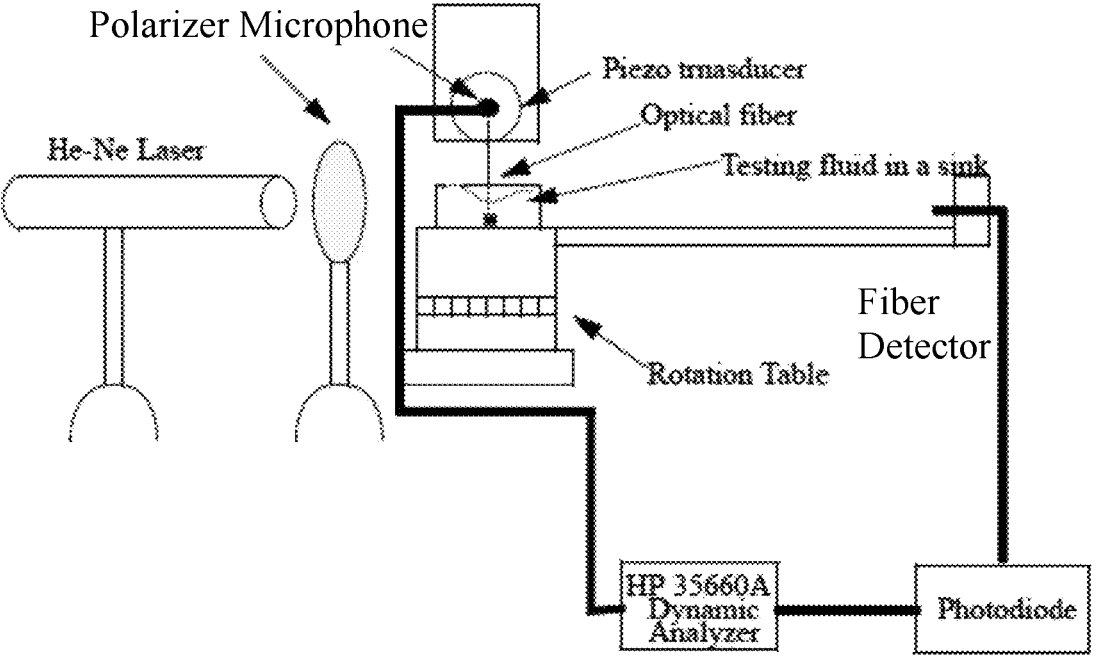
FIG. 12 shows a setup of the forward scattering intensity sensor.
Figure 13:
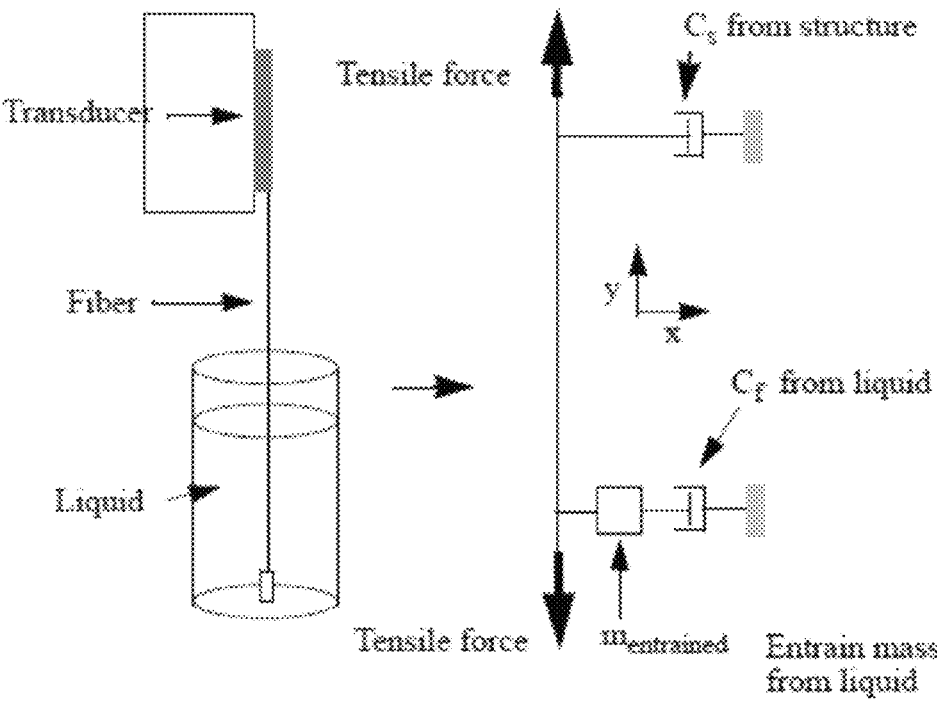
FIG. 13 shows the viscosity measurement using the forward scattering intensity sensor.
Figure 14:
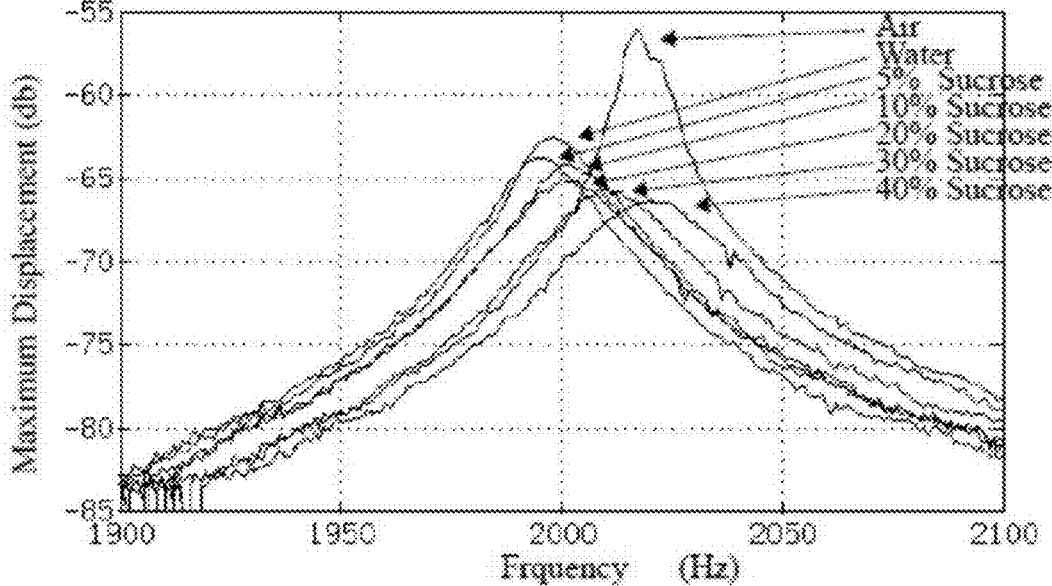
FIG. 14 shows that the liquids in viscosity measurement were, distill water, 5%, 10%, 20%, 30%, and 40% Sucrose solutions; the corresponding viscosity values are 1 cP to 6.15 cP; all experiments were performed at 25° C.; and the device uses the air case as the calibration basis for each measurement.
Figure 15:
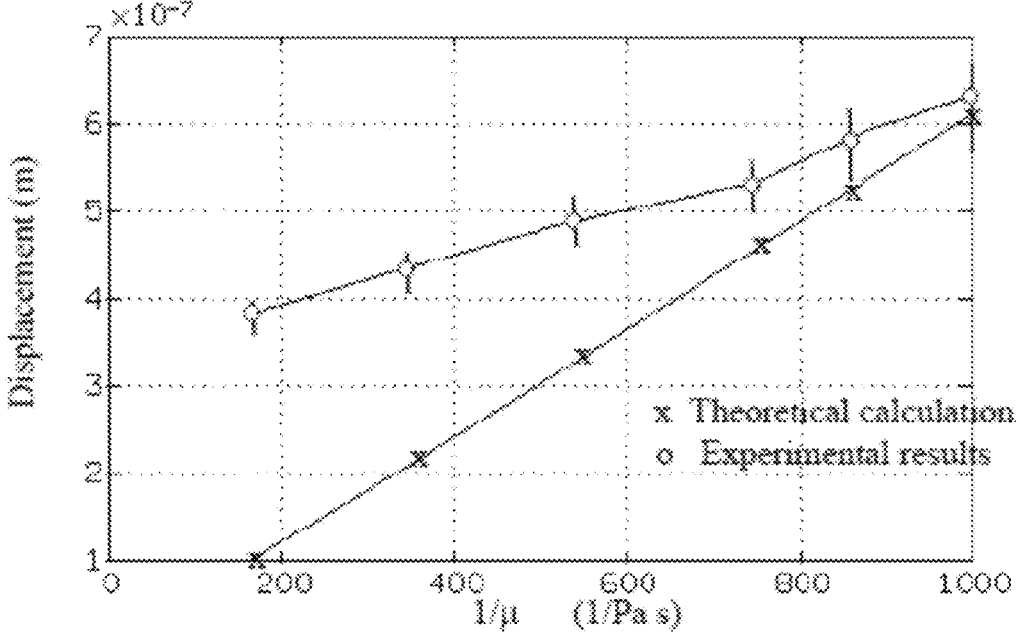
FIG. 15 shows the theoretical calculation and experimental results using the forward scattering intensity sensor.

As shown in FIGS. 3, 12 and 13, the forward scattering intensity sensor is set up, and the viscosity measurement using the forward scattering intensity sensor is shown in FIGS. 14 and 15. In the present disclosure, the technique includes the steps of immersing one end of an optical fiber into fluid; emitting a light beam by a light source; receiving the light beam by the optical fiber; and measuring the viscosity and the mass flow of the fluid in a sink based on a displacement of the one end of the optical fiber.

Velocity and Mass Flow Rate Measurement (for Low Viscosity and High Velocity Gas or Liquid or as Long as the Flow is Non-Viscous and Non-Turbulent, $R_e \sim 10^3$, where $C_d$~Constant)

Some of the fluid properties are examined in motion. First, how the aerodynamic damping of a vibrating fiber could be used to measure mass flow of an incident fluid is described. Earlier, it is shown that damping in the system is largely caused by the fluid drag. By stepping up the velocity of the flow or the vibration of the fiber, another damping that is larger than the drag force and becomes the primary damping of the system is excited. This damping force, so called inertial force, is primary a function of fluid's mass density and fluid's velocity. The basic concept of this device is to incorporate from what we have been studying which is to detect the fluid's velocity through the fiber's peak vibration and half width. Unlike the viscosity case, the changes in the magnitude and the half width will be seen by the changes in the velocity of the flow.

According to the model mx+Cx+kx=f(t), the damping primary comes from the surrounding fluid $C_f$. The fluid damping $C_f$, unlike the viscous case where primary damping comes from the drag created by the fluid acting on the surface of the fiber, is not primary a function of the fluid's mass flow. In brief, the magnitude of the drag force created by the fluid is given by $$|F_{drag}| = \frac{1}{2}\rho U_{rel}^2 D C_D \qquad (11)$$

where $\rho$ is the mass density of fluid, D is the diameter of the cross section of the flow, $C_D$ is the drag coefficient (functions of geometry of the cross section, Reynold's number and relative velocity), and $U_{rel}$ is the relative velocity of fluid with respect to the fiber. Since the fiber is in a moving fluid and vibrates in one direction, $U_{rel}=\partial X/\partial t-V$, where $X(x,t)=x(t)\psi(z)$ is the displacement at z (length position) in the x direction of a continuous structure operating in a single direction, x(t) is the vibration amplitude of the fiber defined as $A_x \sin \omega_n t$, and where $\psi(z)=\sin(n\pi z/L)$ and V is the rate of the fluid flow. This leads to a new equation for the drag:

$$|F_{drag}| = \frac{1}{2}\rho U_{rel}^2 D C_D = \frac{1}{2}\rho D C_D\left(2V^2 - V\dot{X} + 2\dot{X}^2\right) \qquad (12)$$

Assuming that the incident flow is substantially non-turbulent and that vibrations in V are slow compare to the vibration frequency (1-5 kHz), the first term represents a slowly varying force producing a displacement of the vibrator to a new steady-state position about which vibrational motion occurs. For a liner system, and provided the displaced is not large, this would not affect the resonance frequency or amplitude of vibration. The first term is therefore neglected in analyzing the vibrational motion. The last term drops off because the vibration of the fiber is relatively small compare to the rate of the flow. So that leaves us only the second term.

The above equation is substituted for the fluid damping $C_f$ in the equation of motion $mx+(C_S+C_f)x+kx=f(t)$, the following equation is obtained:

$$mx + (C_z + C_D D\rho V)x + kx = f(t) \qquad (13)$$

and if flow is viscous, $$x_{max} = \frac{f(t)}{(C_z + 12\mu)\omega_o} \qquad (14)$$

The amplitude of vibration becomes sorely a function of viscosity. On the other hand, if flow is non-viscous, $C_D$=constant, and $$x_{max} = \frac{f(t)}{(C_z + C_D D\rho V)\omega_o} \qquad (15)$$

Both equations show that the amplitude of vibration are independent of mass density of the fiber, but depend on the mass density of the fluid when the fluid flow enters the non-viscous region. Based on this equation, the velocity of a same material or identify the composition of a mix concentration is measured based on the mass density which is corresponding to the vibration amplitude of the fiber.

The damping coefficient $\xi_x$ is also used to measure the fluid velocity and mass density. The $\xi_x$ is calculated by substituting the new drag force created by the fluid into the equation shown in the earlier viscosity measurement section, and using $C_D$=constant and $U_{rel}$=V for structure under a non-viscous flow condition. Combined with the vibration amplitude x(t,z) and the mod shape $\psi(z)$, the equivalent viscous damping coefficient $\xi_x$ evaluates to be:

$$\xi_x = \frac{1}{2}\left(\rho\frac{D^2}{m}\right)\left(\frac{U_{rel}}{\omega_n D}\right)C_D \qquad (16)$$

Figure 16:
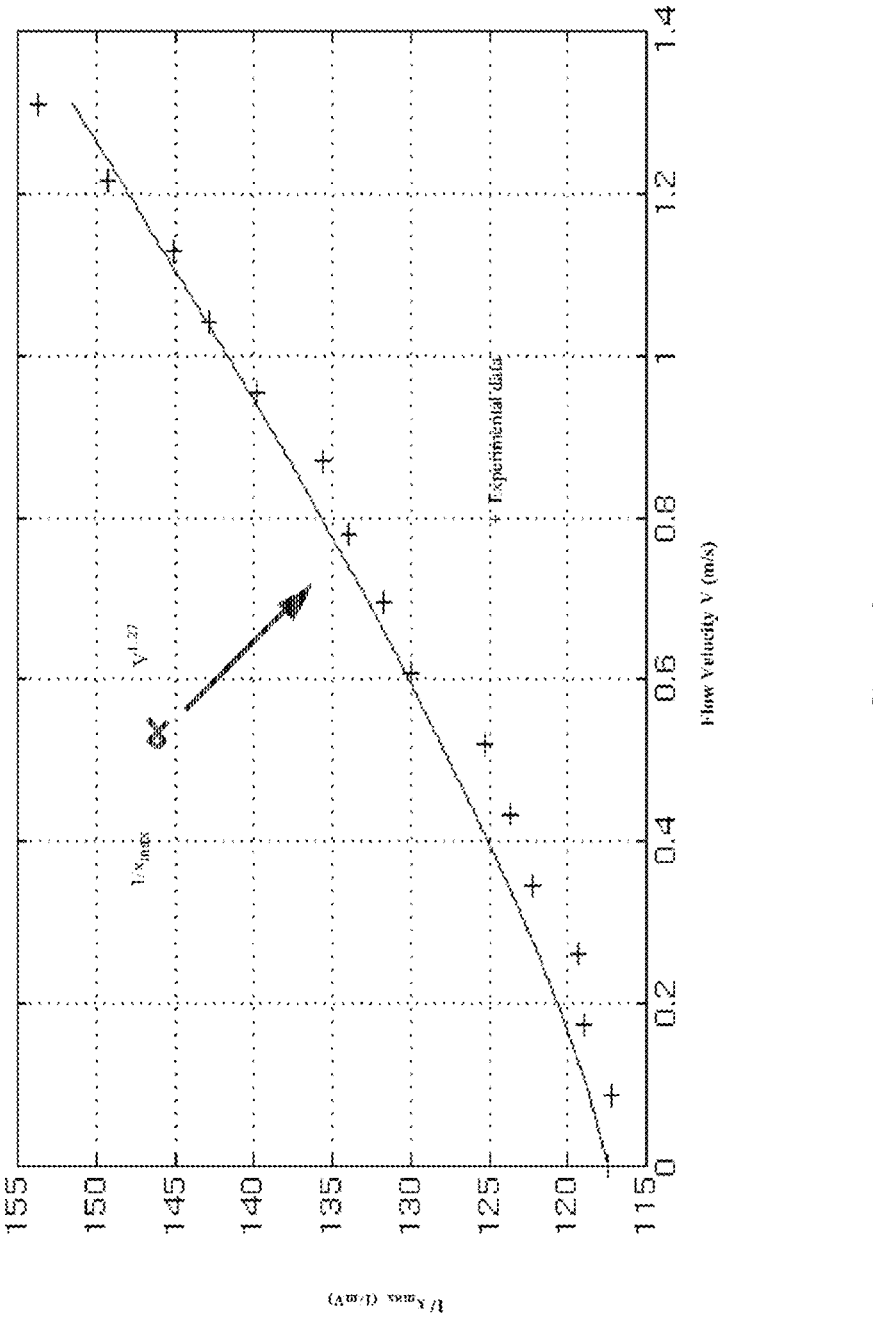
FIG. 16 is the flow measurement before reaching the vortex induced vibration region.
Figure 17:
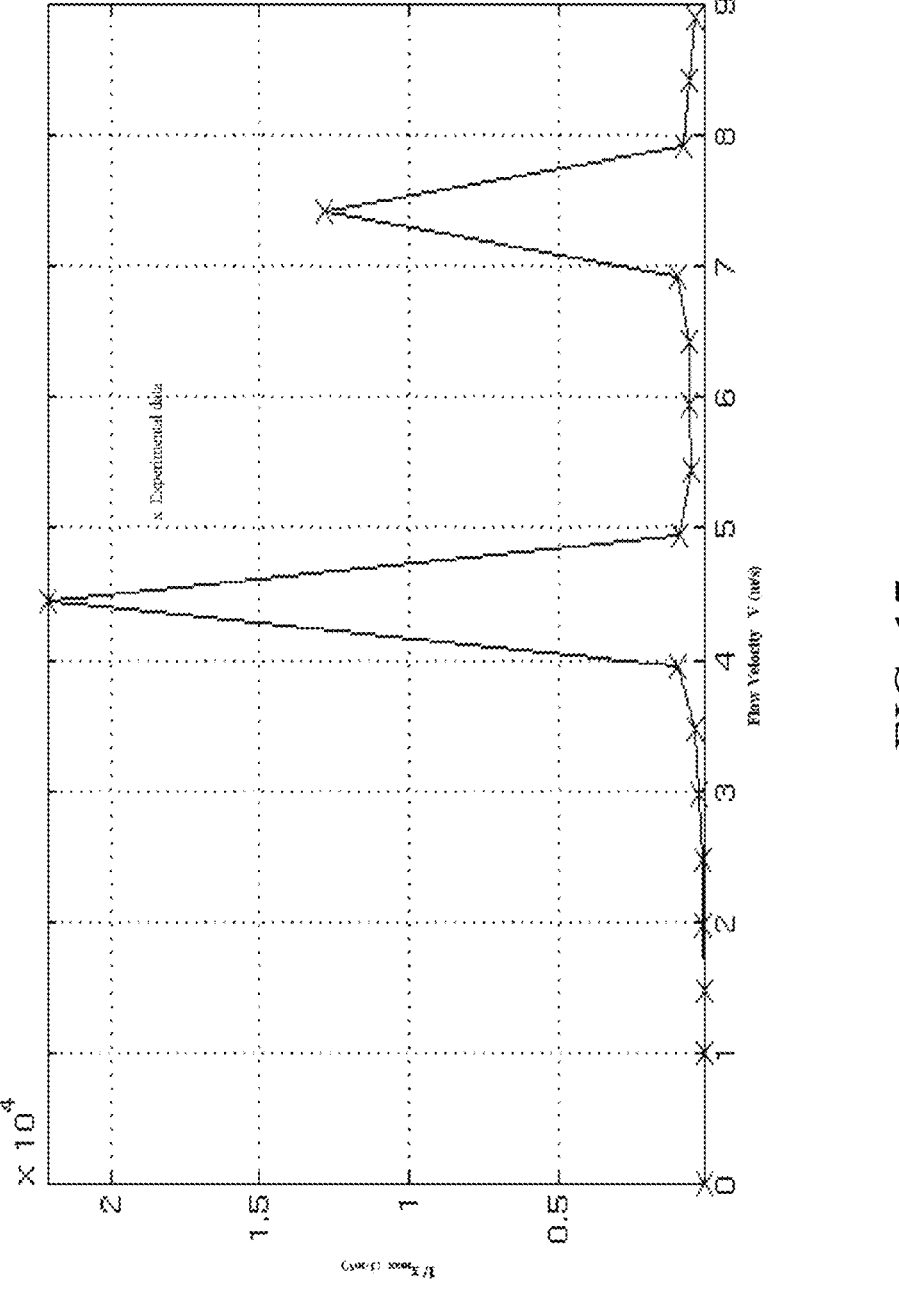
FIG. 17 is the flow measurement around the vortex induced vibration region where reduction of fiber vibration due to the vortex induced vibration in a perpendicular direction of the original fiber vibration.

Like in the vibration amplitude case, the damping coefficient varies with the fluid mass density and the fluid velocity. Assuming entrained mass does not change with different vibration, both mass density and velocity varies linearly with the damping coefficient. FIG. 16 shows the flow measurement before reaching the vortex induced vibration region. FIG. 17 is the flow measurement around the vortex induced vibration region where reduction of fiber vibration due to the vortex induced vibration in a perpendicular direction of the original fiber vibration.

Second Embodiment

Polarimetric Sensor

In the first embodiment, a viscosity and mass flow measurement is described based on a fiber-optic polarimetric sensor. The integrated polarimetric sensor has a very compact optical design that will enable users to adapt this system to existing equipment with little or no difficulty. The polarimetric sensor will be designed to measure fluid viscosity and mass flow rate in either gas or liquid phase. The device is novel in that the viscosity and flow rate are measured by monitoring the magnitude of the frequency shift in the optical output signal, so that a very precise measurement can be made. This measurement technique is also notable in that it enables design of sensors that rivals existing mechanical viscometers or silicon and piezoelectric-based fluid sensors in both smallness and durability. The sensor concept utilizes the relative change in the optical path length between the two orthogonally polarized modes. The earlier two-mode sensor can be modified for the single-mode polarimetric technique. Single-mode operation occurs when only one spatial mode ($LP_{01}$ or $LP_{11}$) is excited at an elliptical-core fiber's input. Here, however, a single-mode Hi-Bi optical fiber was utilized in the classic polarimetric configuration. The technique is attractive, as polarimetric sensors are considerably easier to construct than their better-known interferometric-sensor counterparts yet they maintain almost the same sensitivity (2 order magnitude lower). The twin mode propagation also provides a higher immunity than the ordinary interferometers to environmental and laser phase noise which is essential in measuring temperature depended viscosity parameter. The potential biomedical applications of the device include measurements of apparent viscosity of blood in real time and the viscosity of blood plasma, and biological and pharmaceutical fluids. Industrial applications include automotive control and monitoring systems, plastic processing, ink manufacturing, biodiesel processing, industrial process control, and environmental analysis for the measurements of gas and liquid viscosity from 0.01 to $10^4$ cP, and mass flow rates of 0.1 to $10^3$ m/s. The technique which utilizes forward light scattering from a vibrating optical fiber for viscosity and mass flow rate measurements is shown in FIGS. 3. 12, and 18A.

Figures 18A, 18B:
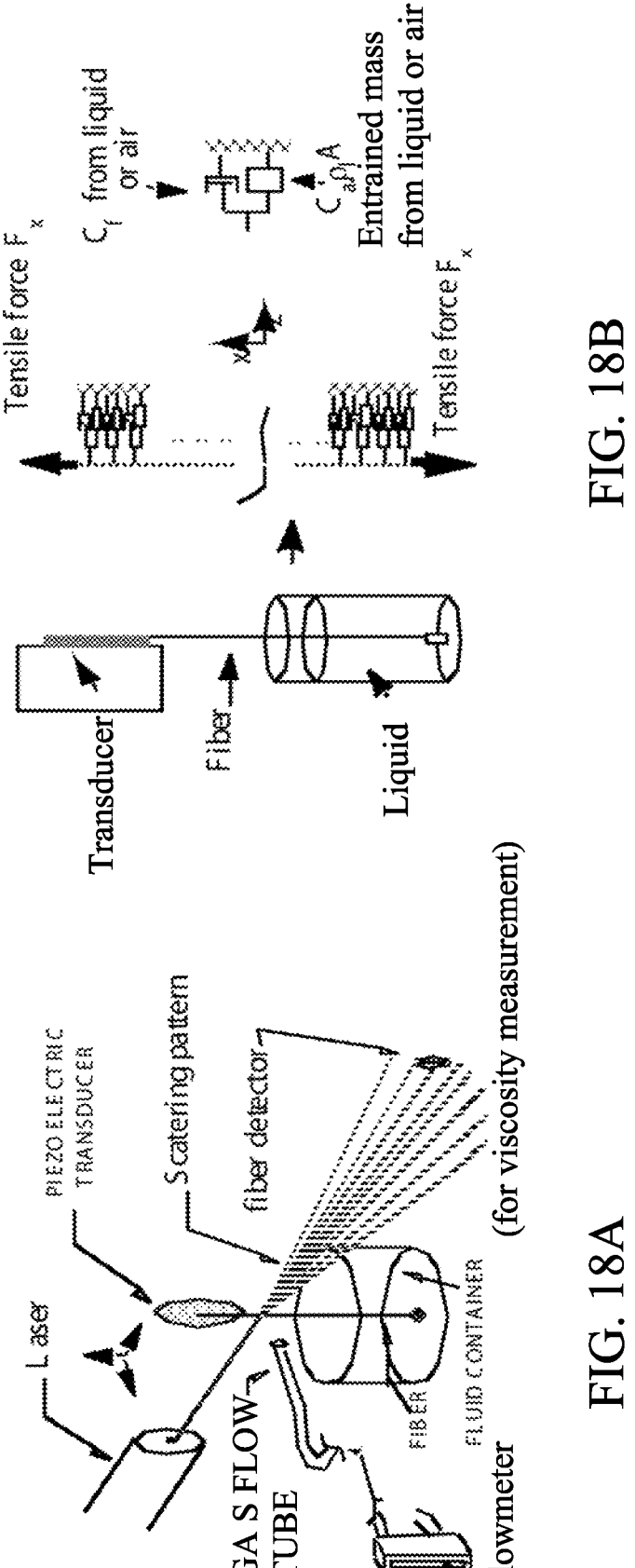
FIG. 18A is a schematic diagram of an optical setup for the forward light scattering viscosity measurement.
FIG. 18B is a schematic diagram of a mechanical model of the fluid viscosity sensor.

FIG. 18A is a schematic diagram of an optical setup for the forward light scattering viscosity measurement, and FIG. 18B is a schematic diagram of a mechanical model of the fluid viscosity sensor. The fiber-optic polarimetric viscosity sensor has several added advantages over mechanical viscometers, or silicon and piezoelectric-based fluid sensors. The forward light scattering fluid sensor, the preliminary version of the viscosity sensor, has demonstrated the capability to measure viscosity ranging from the gas to liquid phase (using the exact same configuration). The sensor has been shown to have a dynamic range which spans from 0.01 to $10^4$ cP, based on the forward light scattering measurement. The sensitivity (defined as cP/peak frequency response in dB) was determined to be 0.7%. The sensitivity of the polarimetric sensor will be significantly improved by using an optical design that will result in a more stable signal output. The small size of the sensor (1 mm long, tip taper down to 3 μm) will enable implementation of this device into mucin layer for cancer detection based on viscosity measurement. The sensor will be able to obtain the fluid's mass density, temperature and flow measurement along with viscosity simultaneously.

Viscosity Measurement

The optical waveguide and its surrounding fluid are modeled as a linear, single degree of freedom system with viscous damping. The displacement of the cantilever is described by $m\ddot{x}+(C_S+C_f)\dot{x}+kx=F$, where F is the excitation force from the piezoelectric driver, x is the cantilever's displacement at the location where Bragg grating is located, k is the stiffness of the cantilever, m is the mass of the cantilever and the entrained mass of the surrounding fluid, and $C_S$ and $C_f$ are the damping coefficients of the supporting structure and surrounding fluid, respectively. It is convenient to use air as a calibration fluid for each measurement, since it removes the necessity of measuring the exact value of the structural damping of the cantilever. To get a simple relation between the viscosity and the sensor's frequency response, the system must be calibrated using laminar flow conditions. A laminar fluid damping coefficient can be approximated by $C_f=(4\pi f D 2\mu\rho_l)^{1/2}$, where $\mu$ and $\rho_l$ are the viscosity and density of the fluid, respectively. D, and f are the effective diameter, frequency of vibration of the waveguide. It is worth noting that the fluid damping is proportional to the square root of the viscosity. Based on this fluid damping coefficient, and neglecting the structural damping, the peak vibration amplitude of the waveguide becomes $x_{max}=(F\cdot(1-\cos(\pi h/l))/\pi/((4\pi f D 2\mu\rho_l)^{0.5}\ \omega_o$, where $\omega_o$ is the resonant angular frequency of the waveguide, and F is a constant driving force amplitude. This suggests that viscosity can be deduced from the peak displacement of the waveguide, provided the mass density of the fluid and the temperature are known. A set of experimental and simulation results (see FIGS. 8A and 8B) taken from the forward light scattering fiber sensor, show an example of how the fiber's peak vibration amplitude could be used in measuring the fluid viscosity. Based on the results, the fiber's peak amplitude of vibration is linearly proportional to the inverse of the square root of fluid viscosity. The samples used for the viscosity measurement are distilled water, and 5%, 10%, 20%, 30%, and 40% sucrose solutions (see FIG. 19A). The corresponding viscosity is 1 to 6.15 Cp (see FIG. 19B). This same method is used to measure viscosity in the polarimetric sensor.

The general equation for the displacement of the waveguide sensor is given by $m\ddot{x}+(C_S+C_f)\dot{x}+kx=F$. In the viscous case (low flow rate), the damping is dominated by the frictional drag. At higher flow rates the damping will be dominated by pressure drag, in the wake of the structure. In this case the fluid damping will be a function of the fluid's mass density velocity. The magnitude of the drag force created by the fluid is given by $F_{drag}\ \frac{1}{2}\pi U^2_{rel}DC_D$, where $C_D$ is the drag coefficient (which is a function of geometry of the cross section, Reynold's number, and relative velocity), and $U_{rel}$ is the relative velocity of fluid with respect to the fiber. Since the fiber is in a moving fluid and vibrates in one direction, the equation $U_{rel}=\partial X/\partial t-V$ is obtained, where V is the rate of the fluid flow, and $X(z, t)$ $x_{max}$ $\sin(\omega_o t)\sin(n\pi z/L)$. This leads to a new equation for the drag which is given by $F_{drag}=\frac{1}{2}\rho D C_D(2V^2-V\dot{X}+2\dot{X}^2)$. This equation assumes that the incident flow is substantially non-turbulent, and that variations in V are slow compared to the vibration frequency (1-5 kHz). The $V^2$ term represents a slowly varying force producing a displacement of the fiber to a new steady-state position, about which vibrational motion occurs. For a linear system in which the displacement is not too large, this would not affect the resonant frequency and amplitude of vibration. The $V^2$ term is therefore neglected in analyzing the vibration motion. The last term drops off because the vibration of the fiber is relatively small compared to the rate of the flow. This leaves us with only the term. For viscous flow, substituting the above equation for the fluid damping $C_f$, in the equation of motion results in. $x_{max}=F/((C_S+(4fD^2\mu\rho\pi^3)^{0.5})\omega_o$. The amplitude of vibration becomes a function of viscosity. On the other hand, if the flow is in the non-viscous region ($2000<R_e<30000$), $C_D$=constant, and $x_{max}=F/(C_S+C_D D\rho V)\omega_o$. Both equations show that the amplitude of vibration is independent of the mass density of the fiber, and dependent on the mass density of the fluid, especially when fluid flow enters the non-viscous region ($2000<Re<30000$).

Sensor Principle

The concept of a polarimetric sensor is relatively simple. The sensor utilizes the relative change in the optical path length between the two orthogonally polarized modes. The earlier two-mode sensor can be modified for the single-mode polarimetric technique. Single-mode operation occurs when only one spatial mode ($LP_{01}$ or $LP_{11}$) is excited at an elliptical-core fiber's input. Here, however, a single-mode Hi-Bi optical fiber was utilized in the classic polarimetric configuration. The technique is attractive, as polarimetric sensors are considerably easier to construct than their better-known interferometric-sensor counterparts yet they maintain almost the same sensitivity (2 order magnitude lower). The twin mode propagation also provides a higher immunity than the ordinary interferometers to environmental and laser phase noise which is essential in measuring temperature depended viscosity parameter.

Using the mechanical model derived for the fiber, a liquid's viscosity can be deduced from damping characteristics of the vibrating fiber-optic probe that is immersed in liquid. For the current technique, the amplitude of vibration is obtained from by monitoring the shift in polarization of the reflected signal with the changes in the birefringence of the fiber-optic probe. In this case, the strain is induced by the load on the fiber-optic probe near the base where fiber is attached to the piezoelectric transducer. The birefringence resulting from an applied strain field change is given as $\Delta B$, where $\Delta B$ is a function of difference in the photoelastic effect (stress induced index change) between the two polarization eigenmodes and geometric change. Based on the above expression, the phase change due to the temperature or strain modulation can be expressed as $$\delta\phi = \frac{2\pi\delta l\Delta B}{\lambda} \tag{25}$$

where $\lambda$ is wavelength of the input light source, $\delta l$ is sensing length, and the resulted output intensity is given as $$I = \frac{1}{2}[1 + |\gamma|COS(\delta\phi)] \tag{26}$$

Figure 20:
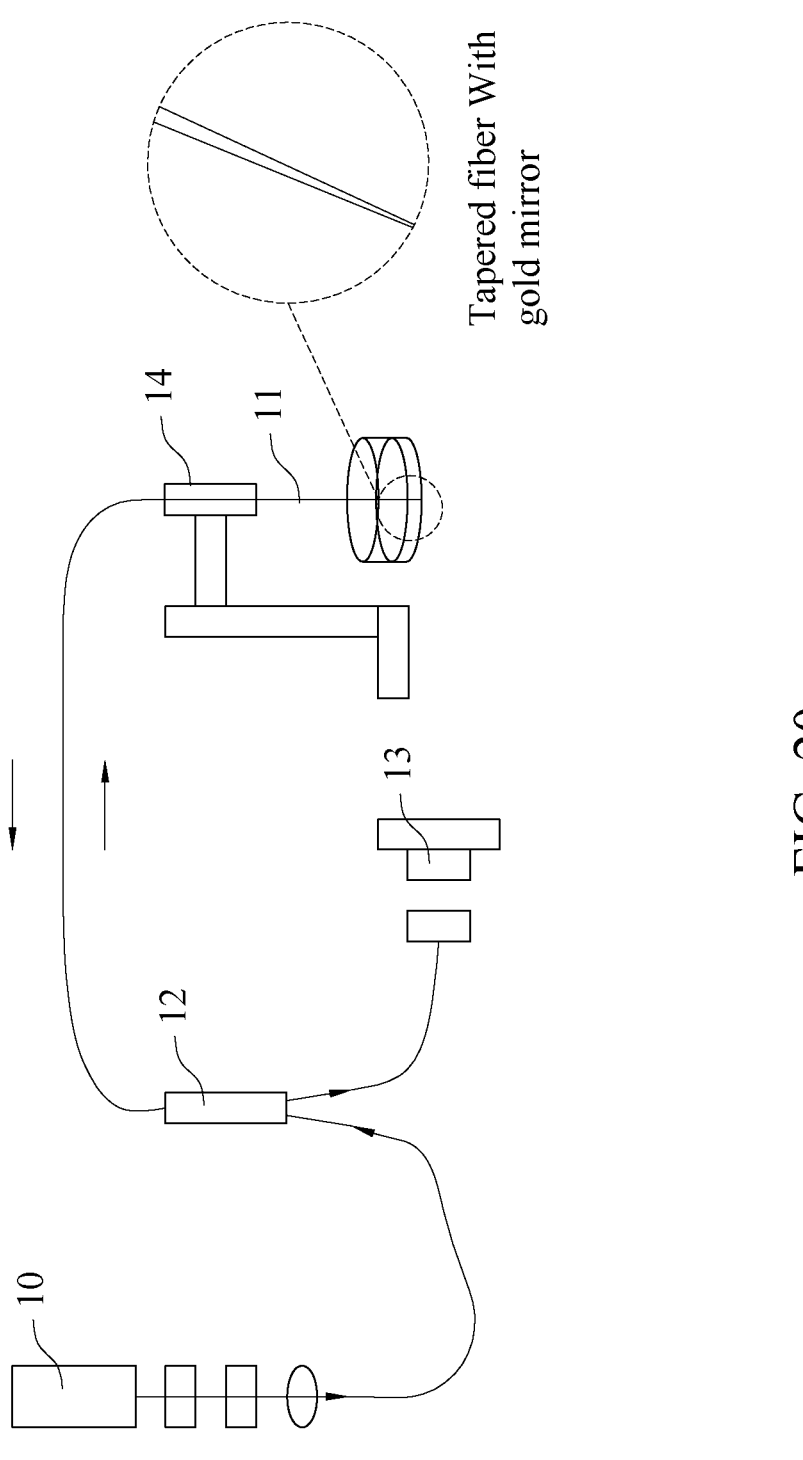
FIG. 20 is a schematic diagram of a polarimetric sensor setup in accordance with an embodiment of the present disclosure.

The polarimetric sensor setup is shown in FIG. 20. Light from an unpolarized diode laser 10 emitting at 633 nm is launched into the input end of the fiber 11 through a linear polarizer and lens. The polarizer is used to rotate the plane of polarization of the input light beam at 45° or 135° with respect to the principal axes of the input fiber of a 2×1 fiber coupler 12. Hence, two orthogonal eigen axes are excited equally. The output from the fiber coupler 12 is connected to another optical fiber 13 used as the photodetector. The tip of the sensing fiber 11 is tapered to ~3 μm and its surface coated with a deposited gold thin film as mirror, where the mirror provides the reflection of the signal to the detector. The displacement of the fiber is measured based on the intensity variation created by the strain-induced birefringence effect of the vibrating fiber. Using this relationship, the viscosity of the fluid is deduced from the frequency response of the vibrating fiber. The frequency excitation is accomplished by setting the fiber in periodic motion with a piezoelectric transducer 14. Each frequency excitation of the fiber is generated by a sinusoidal input sweep at constant amplitude driven by the piezoelectric transducer (sweep with the range of frequency nears the resonance of the sensing fiber). The viscosity of the fluid is estimated by using the bandwidth and the peak response of the mechanical response of the fiber. Based on the bandwidth and the first resonant frequency, an equivalent damping coefficient of the fluid is calculated and the corresponding viscosity of the fluid is estimated. Furthermore, the viscosity of the fluid can be deduced based on the maximum amplitude of the spectrum.

Figure 21B:
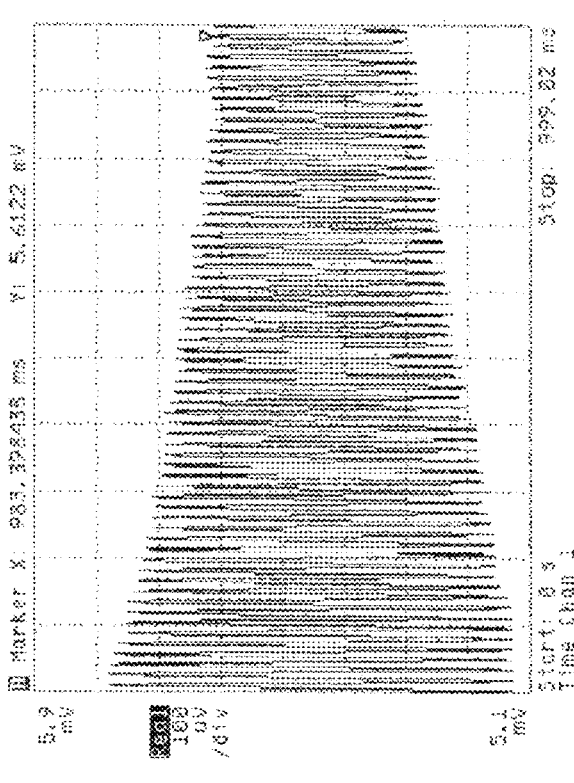
FIG. 21B is time decrement recording of the air damping on the cantilever.
Figure 21B:
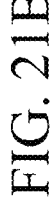
Figure 21A:
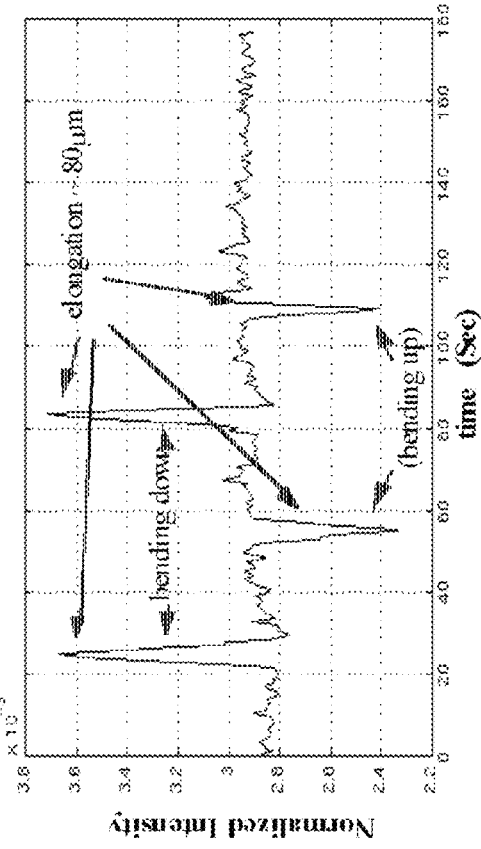
FIG. 21A is static response of a deflection on the cantilever.

An example of the static load response of the output intensity due to a deflection of a polarimetric sensor is shown in FIGS. 21A and 21B. In the experiment, the largest elongation on the fiber was roughly 80 μm based on the measured maximum deflection of the aluminum cantilever (see FIG. 21A). The dynamic response of the embedded polarimetric sensor for air damping measurement using time decrement method shows system was sensitive enough to measure the gas phase viscosity (see FIG. 21B).

Third Embodiment

Intensity Modulating Sensor

Intensity modulation of the fiber provides a unique property which can be utilized to measure the displacement of the fiber structure, because the bending and non-bending fiber creates a variance of light intensity which provides the information on how much bending the fiber is subjected to.

Figure 22:
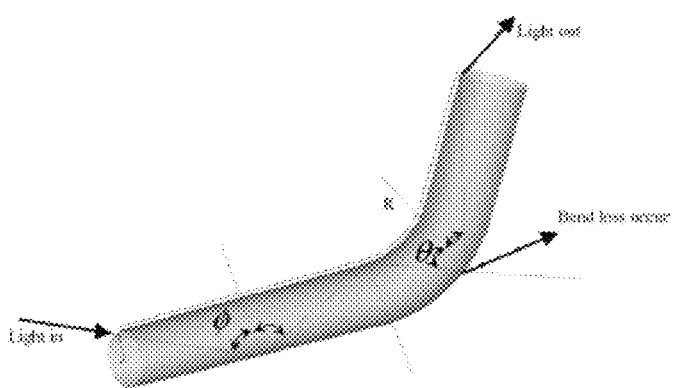
FIG. 22 shows the angle $\phi$ of incidence in the straight region of the optical fiber and the angle $\theta$ of incidence in the bent region of the optical fiber.

The principle of intensity modulation theory is that by increasing the incident angle of light beam at core-cladding interface (see FIG. 22), the light beam traveling closed to the bend region will likely escape into the cladding region due to the bending. The relation between the bending radius and the light loss can be formulated as follows $$\alpha = C_1 \exp(-C_2 R) \tag{27}$$

where $C_1$ and $C_2$ are constants that depend on the dimensions of the fiber and on the shape of the modal fields, and R is the radius of curvature of the fiber during bending.

For the experiment, in order to find the relationship between the displacement and the amplitude of the light intensity variance, a photograph of the vibrating probe was first taken and the displacement of the probe was then measured by image analysis software (Imaging Processing and Analysis in Java, image J, National Institutes of Health, MA). A linear relationship has been found between the displacement and light intensity variance. The provide a simple way to convert the light intensity variance to displacement. By fitting the experiment result, the relationship satisfies the following equation.

$$D = 0.216L + 0.026 \tag{28}$$

where D is the displacement, and L is the light intensity variance.

Figure 23:
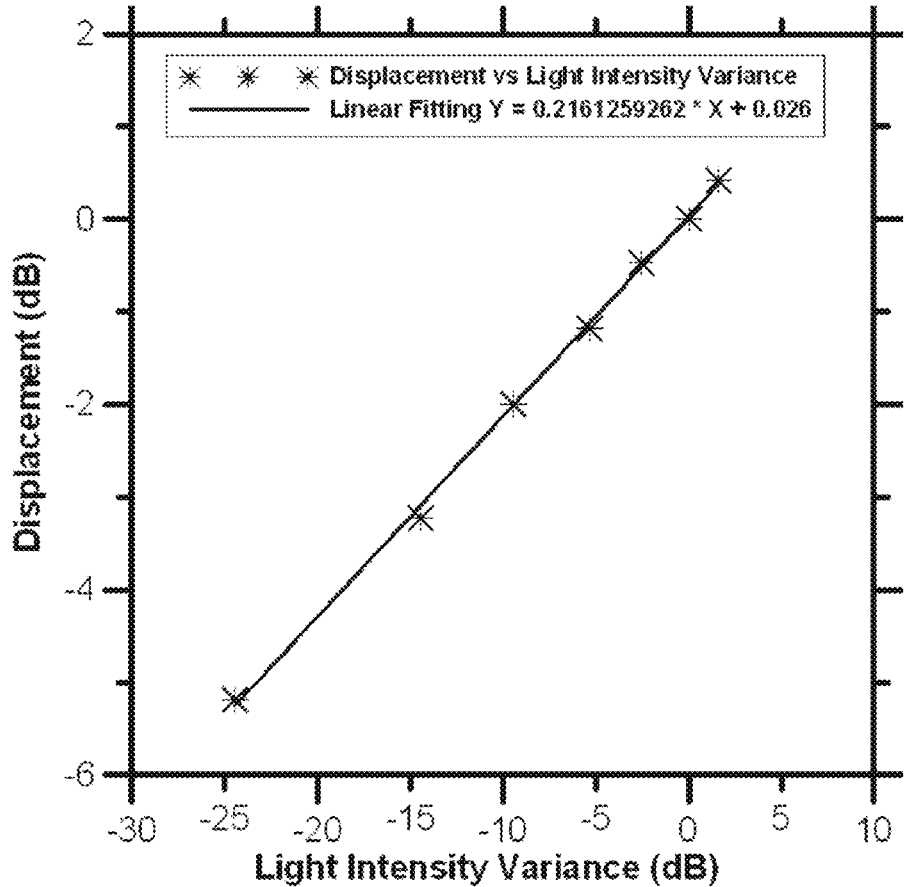
FIG. 23 shows the linear relationship between amplitude of displacement and the amplitude of the light intensity variance.
Figure 24:
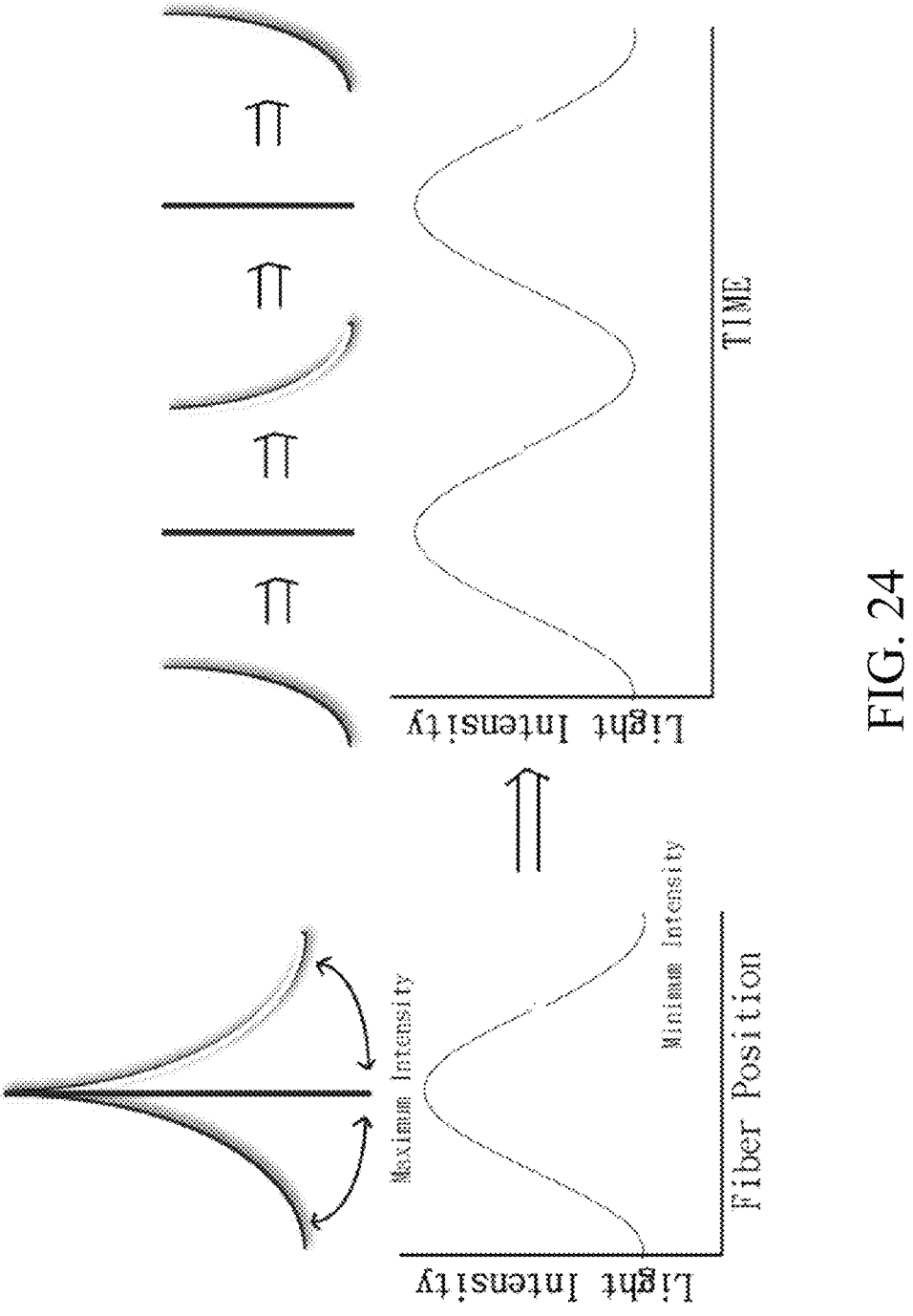
FIG. 24 is a schematic diagram of light intensity having a maximum value when the optical fiber is not bent but reaching a minimum value when the optical fiber is bent the most (each time the probe completes a cycle).

FIG. 23 shows the linear relationship between amplitude of displacement and the amplitude of the light intensity of displacement and the amplitude of the light intensity variance. An important phenomenon in measuring the displacement of the probe is that each time a probe has traveled a cycle as shown in FIG. 24, the light intensity varied twice. In this case, the output frequency will be twice the input frequency of the piezoelectric strip.

Experiment Configuration

Figure 25:
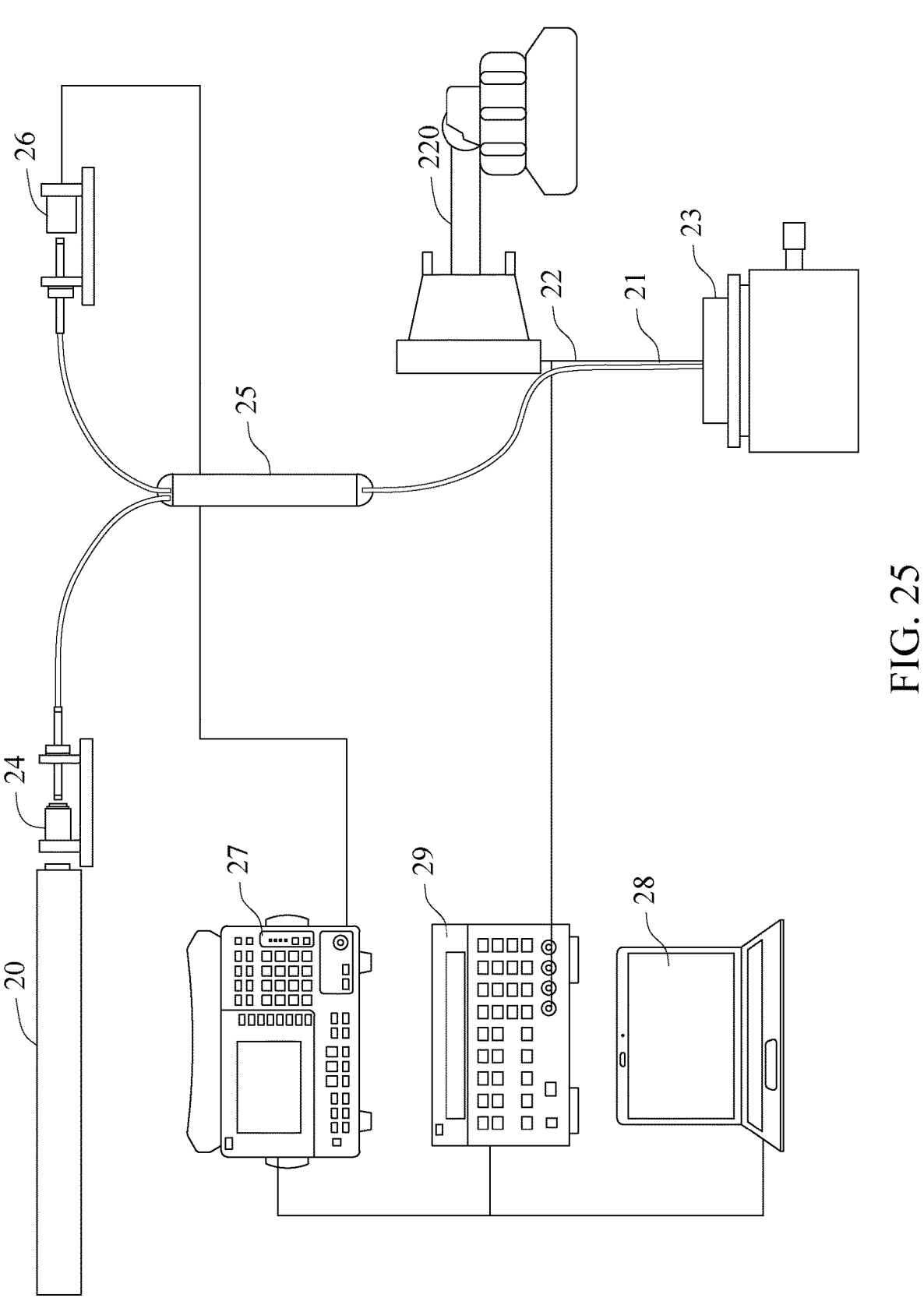
FIG. 25 is a schematic diagram of an intensity modulating sensor setup in accordance with an embodiment of the present disclosure.

FIG. 25 depicts a schematic diagram of an intensity modulating sensor setup in accordance with an embodiment of the present disclosure. The measuring system consists of a 50 mW He—Ne laser 20 (50 mW at λ=632.8 nm, Melles Griot Corp., MA.) and a single mode fiber 21 (Corning SMF-28). The diameter of the core is 2.75 μm and the cladding diameter is 125 μm). The fix end of the probe (i.e, the single mode fiber 21) is anchored to the piezoelectric transducer 22 and the free end is immersed in fluid in a reservoir 23. The light from the laser is first coupled by the coupler 24 into the fiber and then guided through the input of a 2 by 1 optical coupler 25 (JDS Uniphase Corp., UK) to the free end. In order to strengthen the light intensity for detection, the free end is coated with silver epoxy (Micro-Circuits Company, New Buffalo, Michigan) so that the guided light will mostly be reflected when it reaches the bottom of the free end. The reflected light will then be guided to the output and the light intensity is estimated by the light-to-voltage optical sensor 26 (OPT301, Burr-Brown). The output voltage is analyzed by a dynamic signal analyzer 27 (3561A, Hewlett-Packard) which converts the time domain data to frequency domain by performing an FFT (Fast Fourier Transform). The frequency domain data is then collected by a computer 28 through the GPIB interface (GPIB-USB-HS, National instrumental, TX).

The dimensions of the piezoelectric transducer 22 are 49 by 1.8 mm (APC international Ltd.). The fiber 21 is first attached to the free end of the piezoelectric strip and the other end of the piezoelectric strip is then fixed by a mechanical clamp 220. The input voltage for piezoelectric strip is provided by function generator 29 (8904A, Hewlett-Packard) that is set to provide a sinusoidal output.

The probe, or free end of the fiber 21, is first tested by sweeping the frequency from 0~1200 Hz to find the natural resonance frequency of the probe. The result can be observed and recorded with the dynamic signal analyzer. The natural frequencies measured are the combination of piezoelectric strip and the fiber, therefore, in order to separate the natural frequency of the probe and the piezoelectric strip, the displacement of the piezoelectric strip is first measured by laser vibrometer (Polytec OFV302 and OFV2600H-KU, Germany) and then the corresponding natural frequency of the fiber may be determined. The first and second resonances of the piezoelectric strip were determined to be at 110 HZ and 610 HZ respectively.

Probe Length

The length of the probe is an important parameter in measuring the displacement. Long length probe will bring the frequency response to a lower region and result in measuring more noise from the environment and surrounding structure. On the other hand, short length probe requires high driving frequency which will increase the drag force acting on the probe when immersed in the fluid which reduces the displacement of the probe. The reduction of the displacement will in a corresponding decrease in the variation of the intensity modulation signal. As a result, a compromise between increasing the sensitivity of probe and avoiding the resonance of the surrounding structure and high fluid drag force must be satisfied.

Since the resonance of the piezoelectric transducer has been determined, the measured frequency response of probe in air for various lengths and the corresponding natural frequency of the probe can be found. When testing the probe, the driving voltage is maintained at 21V. The frequency responses of various lengths are then compared to determine the optimum length which has the most obvious signal.

Once the length is determined, the probe is further tested in deionized water. The reason is that the damping increases a lot from air to water and it is possible that the vibration of the probe will be dampened out. For example, the short probe has to be driven at high frequency in order to operate the probe at the resonant region. After the probe is immersed in the water, the originally small displacement of the probe and high drag force of the water will damped out the vibration of the probe. The optimum frequency range and fiber length were determined to be between 300 to 500 Hz and 1.5 centimeters respectively.

The viscosity is tested under two kinds of conditions: (1) water with different immersion length and (2) fluid with different viscosity and mass density. The immersion depth of the fiber in the fluid must be taken into concern as it significantly affects the dampening of vibration in the surrounding fluid. Even with a change of a few microns, the frequency response can be significantly altered. From FIG. 26A, the length changed between each test is 125 μm. By altering the immersion depth from 125 to 250 microns, the signal was decreased by 10 dB. However, the light intensity change from 250 um to 375 um drops about 5 dB. The light intensity drop from 375 μm to 500 μm is even smaller. From this result, the conclusion can be drawn that the dampening changes significantly for shallow immersion depths. This is reasonable because the damping between air and water varied tremendously so that the probe is very sensitive to water dampening in a shallow immersion region. The error may be minimized by using shorter fiber with higher stiffness or using fiber with streamlined shape which can reduce the drag force in the fluid.

Figures 26A, 26B:
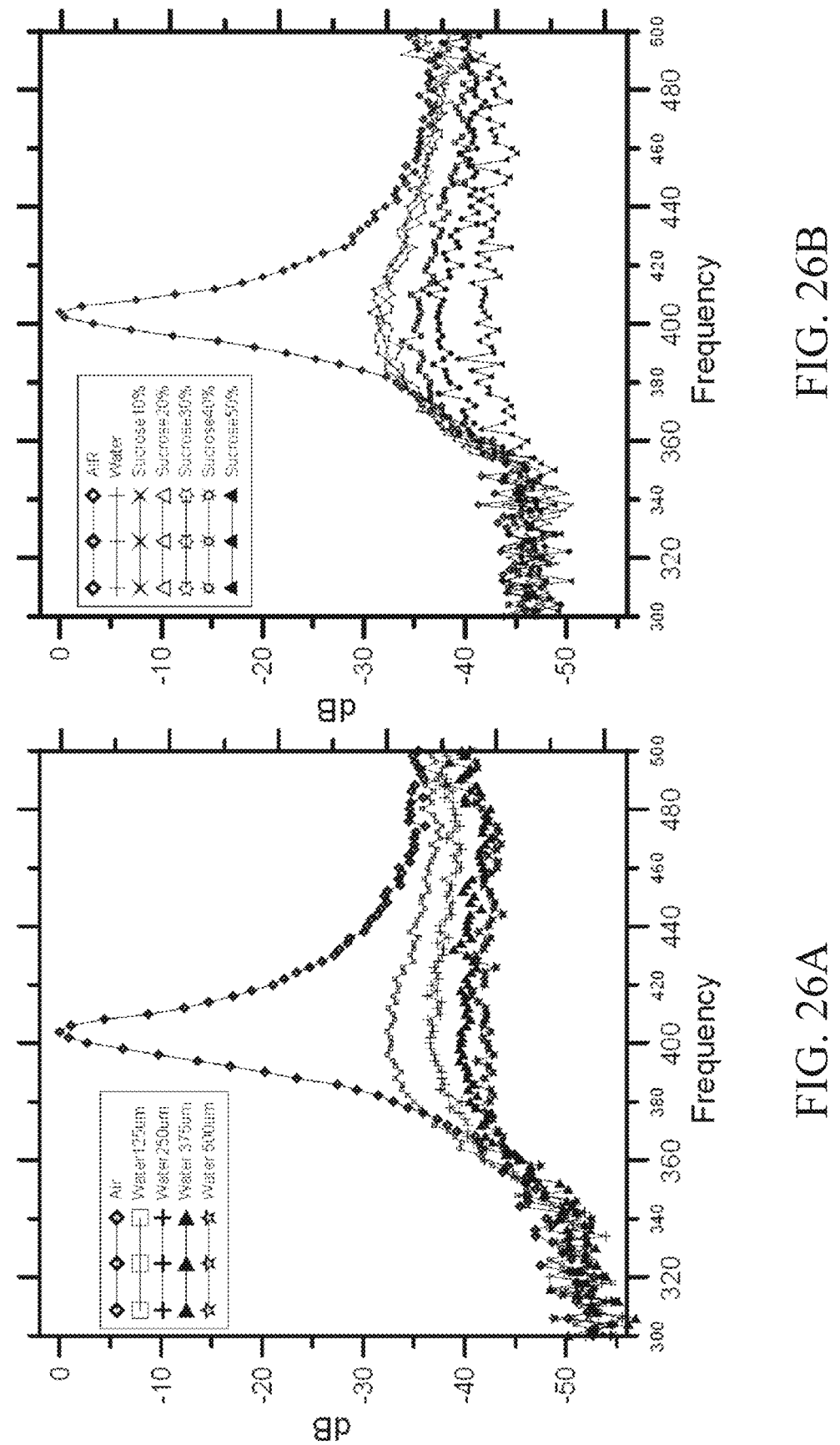
FIG. 26A is frequency response of the fiber immersed in water with different depths from 125 to 500 microns.
FIG. 26B is frequency response of the fiber immersed in water and sucrose with concentrations from 10% to 50%.
Figure 27:
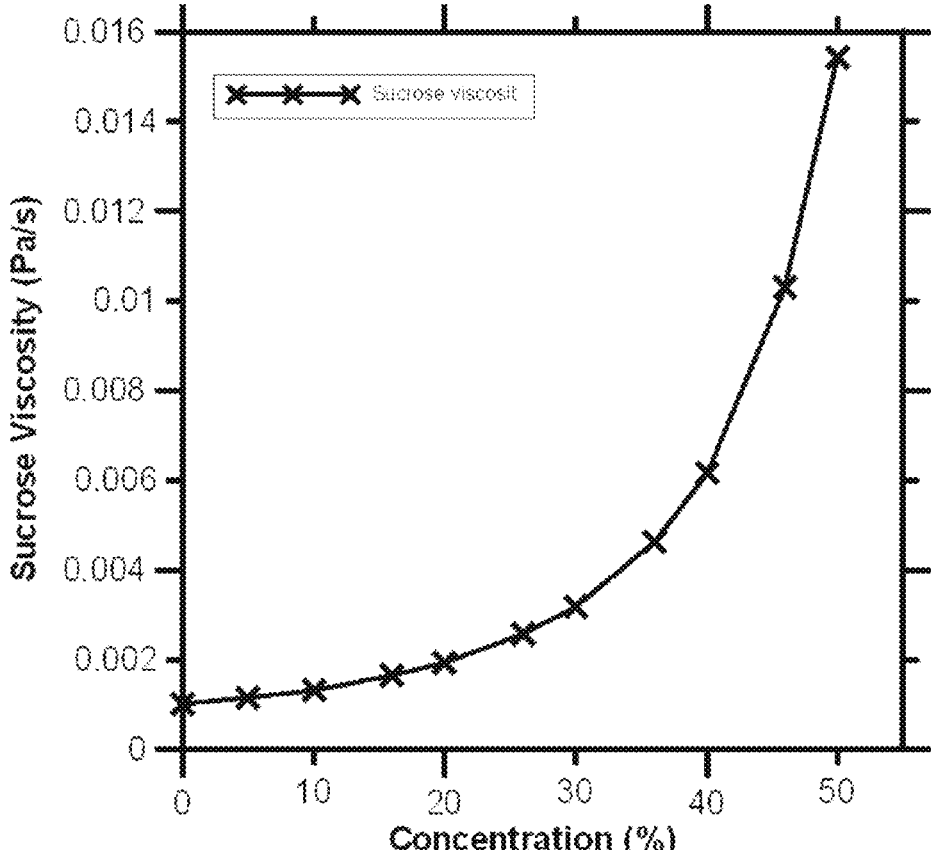
FIG. 27 shows that viscosity of the sucrose increase exponentially with respect to concentration.
Figure 28:
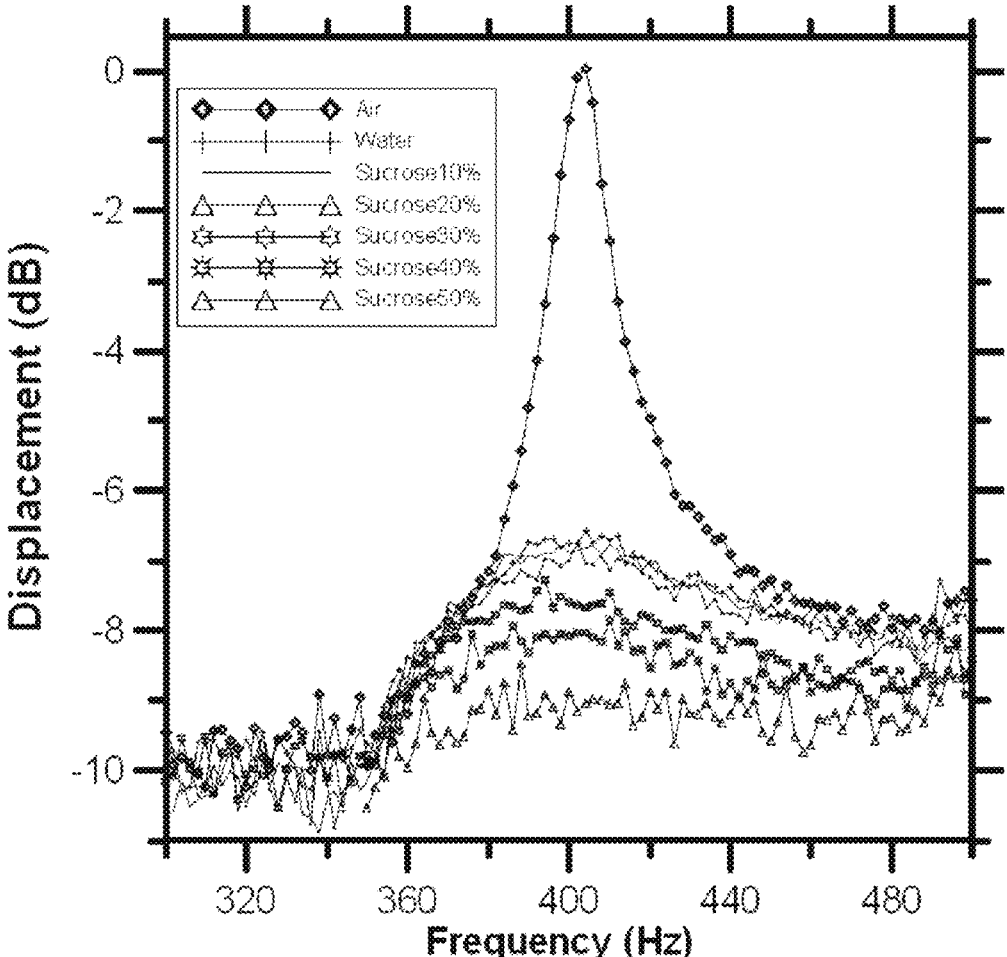
FIG. 28 shows that displacement of the probe is normalized in respect to the 21V at 400 Hz drive signal.

For frequency response of the probe with different fluid as shown in FIG. 26B, the difference between water, sucrose 10% and sucrose 20% is small. However, the differences between sucrose 30%, sucrose 40% and sucrose 50% are much large. The standard chemistry hand book confirms that the viscosity of a sucrose solution increases exponentially with concentration; this supports the data obtained in this experiment and depicted in FIG. 27. From the aforesaid equations, the light intensity is converted into the displacement of the probe as shown in FIG. 28.

Fourth Embodiment

Elliptical Core Two-Mode Fiber-Optic Sensor

Figure 41:
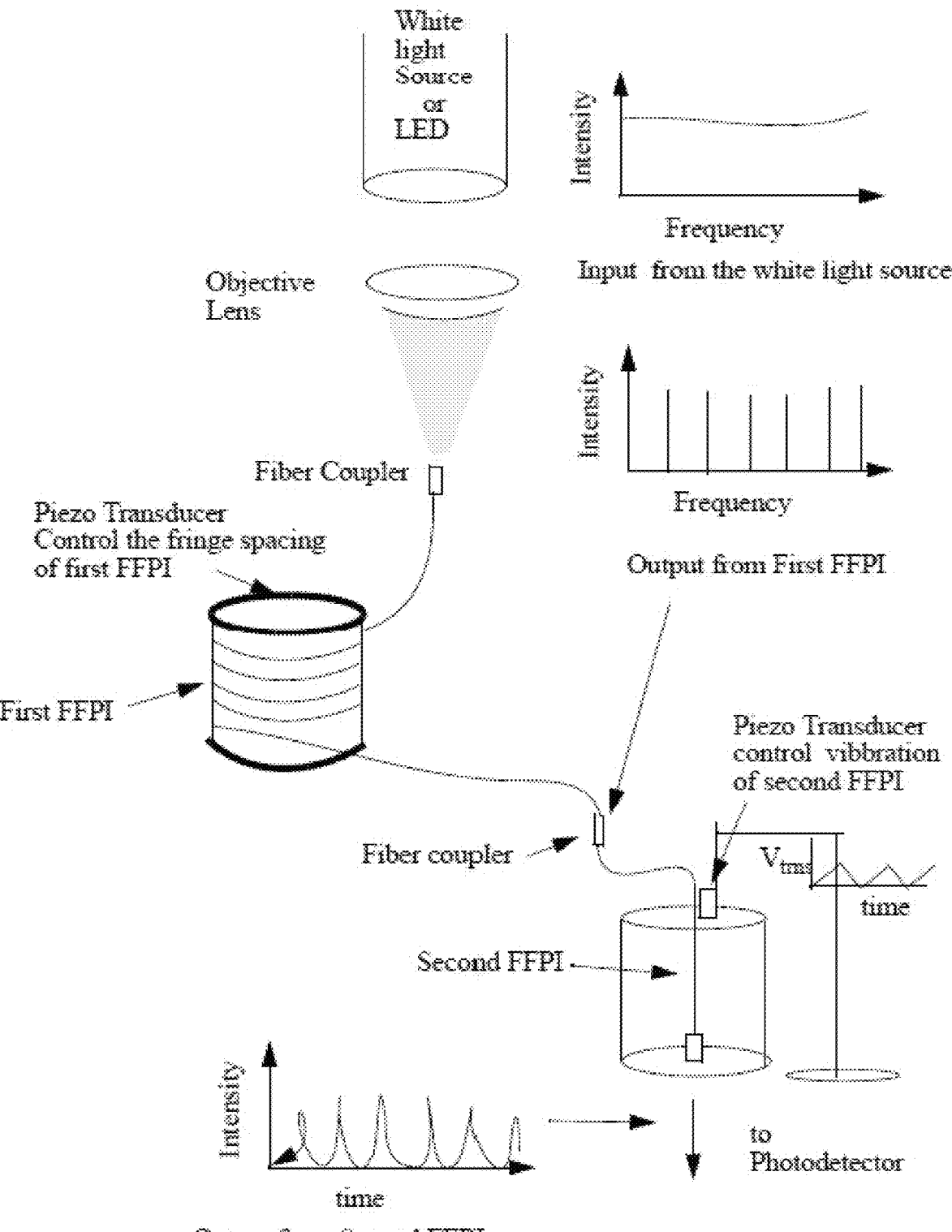
FIG. 41 is a schematic diagram of the Fabry-Perot interferometer sensor setup including two FFPIs in series.

Due to the size of the setup, the forward scattering approach was impractical as an in-line industrial viscosity/mass flow sensor. To resolve this problem, several intrinsic fiber-optic vibration sensors were examined. One of the prior art designs involves using a fiber-optic Fabry-Perot interferometer (FFPI) (as shown in FIG. 41). The sensor features a compact intrinsic optical design and nanometer range sensitivity to the vibration measurement. However, the initial experimental results have shown that the vibration measurement suffers from stability problems in the presence of ambient temperature fluctuation and background noise. The temperature problem was found to be caused by the fact that the silica core fiber interferometer was more sensitive to the temperature change than the mechanical perturbation. Based on the experiment, the phase shift for a 1° C. temperature change was roughly 50 times the response of a 1 μm elongation for an unjacketed bow-tie fiber. Therefore, a temperature-compensated fiber-optic interferometric sensor became necessary. One of the designs was to launch two orthogonally polarized light beam into the FFPI so that the temperature effect can be compensated at the output. However, a simpler solution has been found using an elliptical core two mode interferometric fiber-optic sensor and a bow-tie fiber-optic polarimetric sensor. Despite growing interest in the fiber-optic interferometers, little work has been done with these techniques to exploit their potential sensor application on fluid properties such as mass density, flow rate or fluid viscosity. The primary goal is to explore one of these areas, namely, the measurement of fluid viscosity for its potential application in the in-line industrial viscosity/mass flow sensor.

The third embodiment of the present disclosure presents the fluid viscosity measurement using an elliptical core two-mode fiber sensor. Similar to the FFPI sensor (as shown in FIG. 41), the elliptical core two-mode fiber sensor is composed of a single fiber and requires few components for the optical setup. The sensor therefore offers a great potential for practical application as a commercial sensor. Unlike the FFPI sensor, the two-mode interferometer requires no mirror deposition and therefore has a simpler manufacturing procedure. The elliptical core two-mode fiber sensor used here for the viscosity measurement operates on the principle of differential phase modulation between the $LP_{01}$, $$LP_{11}^{even}$$

modes in two-mode elliptical-core fiber. This type of interferometer is compact and sensitive because it is immune from environmental effects such as temperature. The two-mode design also allows the operator to measure two parameters, such as temperature and bending, simultaneously, which is essential in developing a smart viscosity sensor. Although the accuracy of the sensor is far less than that of the FFPI sensor, it is more than sufficient for most process control situations.

Strain Sensing

In the weakly guiding approximation, single-mode circular core fiber can support two orthogonal polarizations of the $LP_{01}$-mode as well as the four degenerate $LP_{11}$-mode when operated just below the single-mode cutoff wavelength. Two-lobe patterns can be obtained in the far field at the output of the fiber, and the oscillation of the power distribution between the lobes can be used to sense strain or vibration. However, environmental conditions can also introduce differential phase shifts between the almost degenerated four eigen modes, leading to an instability of the second-order mode pattern. This limits the practical implementation of such sensors.

The use of optical fibers with highly elliptical cores has been shown to remedy this situation. Since the circular symmetry of the fiber has been eliminated, only two second-order modes, the $$LP_{11}^{even}$$

modes, are guided by the elliptical-core fibers just below the single-mode cutoff wavelength. The intensity distribution of the second-order modes is stable, and practical operation of a sensor system is possible since there is a considerable range of the optical spectrum over which the $$LP_{11}^{odd}$$

modes are unguided.

Figure 29:
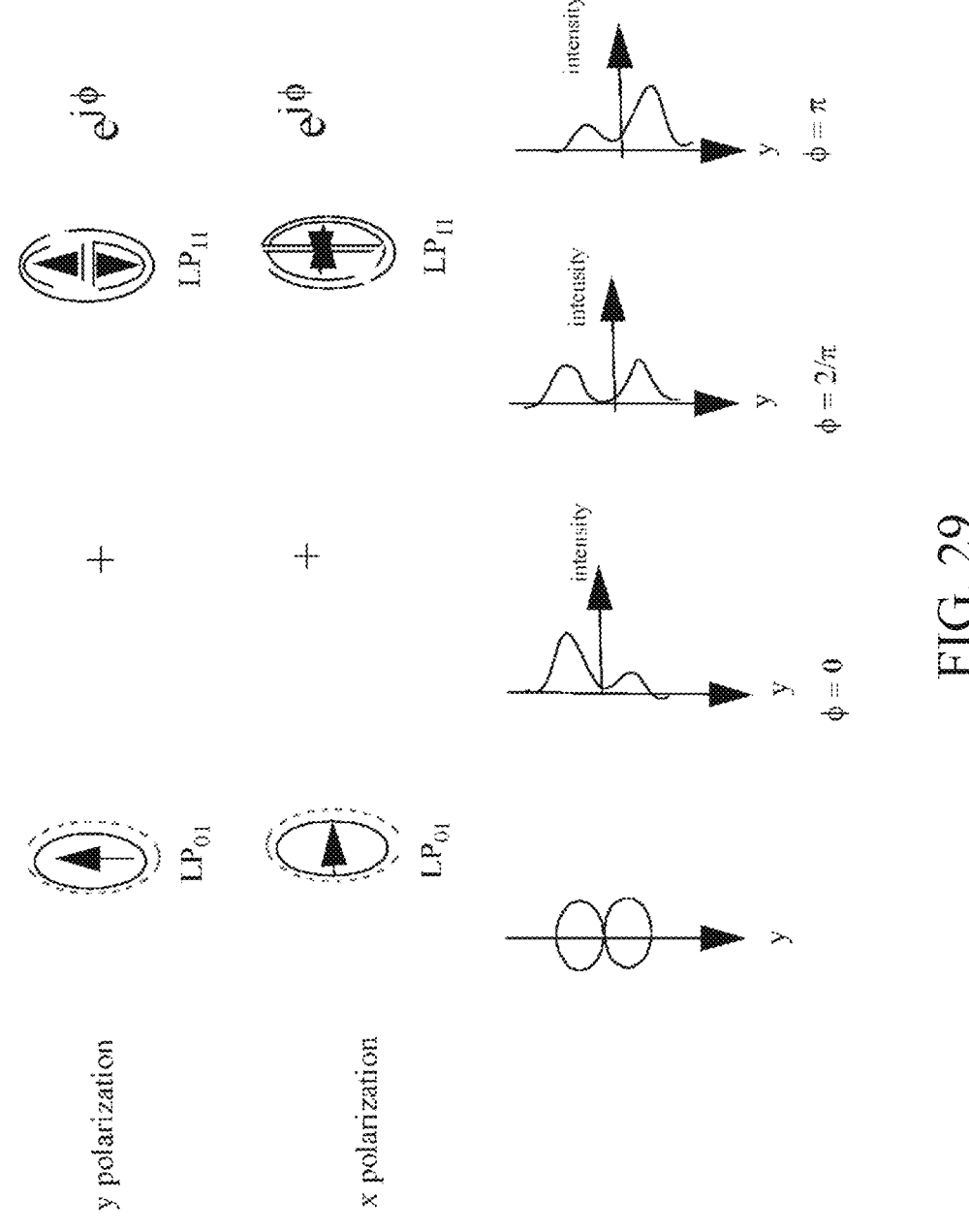
FIG. 29 shows superposition of two modes $LP_{01}$ and $LP_{11}$ of an elliptical core fiber with a phase difference $\phi$.

The operation of the sensor can be described with references to FIG. 29. When the $LP_{01}$ mode and the $LP_{11}$ mode are excited equally in an elliptical-core fiber, the output radiation pattern will be a superposition of the contributions from the two modes and will be a function of the phase difference between them. The evolution of the two-lobed output pattern for different values of the phase difference $\phi$, is shown in FIG. 29, where ovals represent the bright intensity regions of the far-field pattern. For a change in the phase difference $\phi$ due to a deformation in the fiber, there will be a corresponding oscillation in the intensity pattern.

As described earlier, in a specific region of the optical spectrum, an elliptical core two-mode fiber propagates the fundamental mode, $LP_{01}$, and only one lobe orientation of the second order mode, $$LP_{11}^{even}.$$

The interference between the two modes is sensitive to changes in stress or temperature around the fiber. When the sensor is subjected to stress, the optical property of the fiber is affected by two changes: 1. Changes in the propagation constant and 2. Change in the actual length of the fiber. The sensing fiber used in the experiment is an elliptical core polarization maintaining fiber manufactured by 3M Corporation. The fiber is a single-mode fiber at the wavelength of 820 nm and a two-mode fiber at 780 nm (See Appendix D). When both modes are excited, the elliptical core two-mode fiber sensor behaves like a two-arm interferometer and its power transfer characteristics can be simplified from the derivation in Appendix F to $$I_{out} = CI_{in}(1 + \cos\phi) \text{ and} \tag{29}$$

$$\Delta\phi = \Delta\beta l = \frac{2\pi}{\Lambda_{x,y}} l \tag{30}$$

In the above equations, $I_{out}$ denotes the output intensity of the sensor, $I_{in}$ denotes the input intensity of the sensor, $\Delta\phi$ is the accumulated phase difference between the light travelling along the two modes, $\Delta\beta = \beta_{01} - \beta_{11}$ is the difference between the propagation constants of the two modes, l the length of the fiber, $\Lambda_{x,y}$ denotes the fiber beat length between the two modes in either eigenpolarization mode, and C is a constant related to the loss of the sensor. The concept of the sensor is based on monitoring $\Delta\phi$, the phase change of the sensor, from which the corresponding changes in l or $\Delta\beta$ can be determined.

When longitudinal stress is applied to the sensor, the dominant effect on the sensor is the change in the length of the fiber. The phase change of the sensor output power can be expressed as:

$$\delta(\Delta\phi) = \delta(\Delta\beta)l + \Delta\beta\delta l \sim \frac{2\pi}{\Lambda_{x,y}} \Delta l \tag{31}$$

In the case of the elliptical core sensor, the fiber bonded to the surface of a cantilever using epoxy could induce a non-uniform lateral stress in the fiber. However, due to the stress-reducing acrylate polymer coating the lateral stress is reduced and the fiber is assumed to undergo only longitudinal strain. This is even more applicable if a softer adhesive is applied to the bonding.

The sensor is calibrated by measuring the beat length of the fiber. The beat length along the fast axis of the sensing fiber is measured for the above equation if the difference in the effective indices of the two modes becomes unknown (i.e., due to the curing procedure). One approach is to perform a visual inspection of the beat length along the fiber. However, it is difficult to perform a visual inspection of a beat length, $\Lambda_{x,y}$ which is less than 1 mm. Usually $\Lambda_{x,y}$ is determined from the intensity curve when a strain a few times larger than the period of the beat length is applied to the fiber. However, based on the experimental results, the $\Lambda_{x,y}$ values are 65 μm and 80 μm respectively for either a circularly polarized input or for a polarizer launch angle of 45°.

Insensitivity to Twist and Lateral Strain

For the case of fiber twist, no differential phase shift between the two spatial modes was observed for the 3M elliptical core fiber with a layer of 40 μm thick acrylate buffer. For other perturbations such as lateral strain, the fiber exhibits a very low sensitivity in modal behavior. These insensitivities provide the possibility of building various interferometric sensors using highly elliptical core two-mode fibers which are stable against twisting and squeezing. Other problems such as the curing procedure have been observed to cause some initial drifts in the fiber's axes. The drifts, however, discontinued after the epoxy solidified (~one week).

Stress Analysis of an Aluminum Cantilever Structure Under Static Displacement

Figure 30:
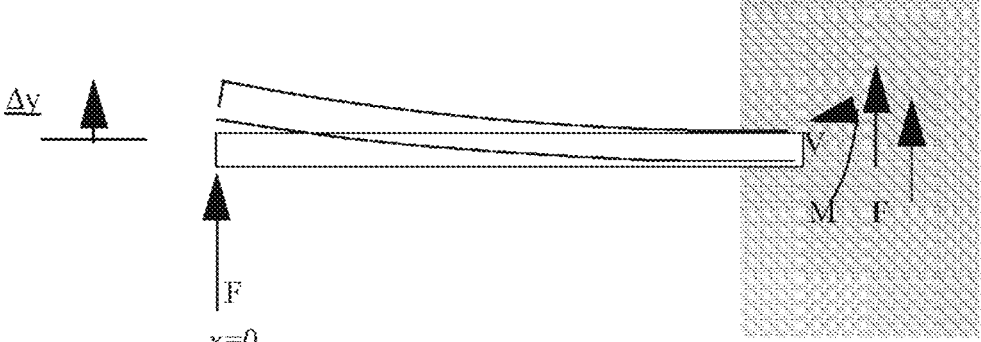
FIG. 30 is a model of the curve section of the supported aluminum beam as a uniform cantilever beam.

The axial stress on the fiber is derived from the deflection of the aluminum beam using the regular beam analysis. The beam analysis for a uniform cantilever beam with a one dimensional force applied on the free end (see FIG. 30) can be derived, where the deflection along the x axis $\Delta y(x)$ is:

$$Dy(x) = \frac{F}{6EI} \times (2l^3 - 3l^2x + x^3) \tag{32}$$

where F is applied force, E is Young's modulus ($E_{Al}=6.9\times 10^{10}$), I=bh/12 the moment of inertia (b and h are the width and thickness of the beam), and l is the length of the aluminum beam.

Figure 31:
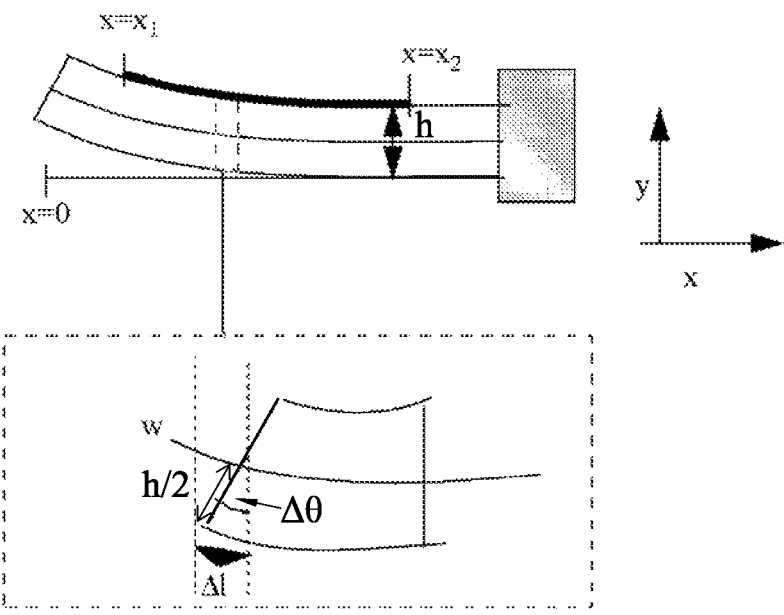
FIG. 31 shows a small cross-sectional view of elongation $\Delta l$ due to bending.

The elongation on the fiber is derived from the deflection of the attached beam. Looking at the small cross section of the beam (see FIG. 31), one can see that the elongation $\Delta l$ of the cantilever due to the deflection expressed in terms of its deflection angle $\Delta\theta$ is $$\Delta l = \frac{h}{2}\tan\theta \propto \frac{h}{2}\Delta\theta \tag{33}$$

Therefore, the total elongation on the fiber due to the bending of the cantilever beam is $$\Delta l_{fiber} = \int_{x_1}^{x_2} \frac{h}{2}\varepsilon_x dx = \frac{h}{2}\Delta\theta\big|_{x_1}^{x_2} \qquad (34)$$

Substituting the deflection angle equation from the beam analysis into the above yields the elongation on the fiber as, $$\Delta l_{fiber} = \left(\frac{h}{2EI}\right)\left(F\frac{\langle x\rangle^2}{2} - F\frac{\langle x-l\rangle^2}{2} - Fl\langle x-l\rangle - \frac{Fl^2}{2}\right)\Big|_{x_1}^{x_2} \qquad (35)$$

Table 3 shows the results of the experiment performed on three different fibers. In each case, the applied force and its fiber elongation due to a bending displacement is calculated based on the above equations.

TABLE 3

| fiber | $\Delta y$ (m) | $x_1$, $x_{2\ (m)}$ | $\Delta l_{fiber\ (m)}$ | F (N) |
|---|---|---|---|---|
| Fibercore (Bow-Tie, | 12.12e−3 | 0.2288, | −1.4978e−4 | 64.2335 |
| HB-600)-polarimetric | 10e−3 | 0.0532 | −1.2358e−4 | 52.998 |
| sensor | 5e−3 | | −6.179e−5 | 26.499 |
| Newport (SM, F-SF)- | 10e−3 | 0.2256, | −1.3624e−4 | 52.998 |
| polarimetric sensor | 5e−3 | 0.0320 | −6.812e−5 | |
| *3M (Elliptical, FS- | 7e−3 | 0.1979, | −5.667e−5 | 37.0986 |
| PM-4611-HT)- | −10e−3 | 0.0829 | 8.0962e−5 | −52.998 |
| bimodal interference | −8e−3 | | 6.4770e−5 | −42.3984 |
| sensor | −5e−3 | | 4.0481e−5 | −26.4990 |
| | −3e−3 | | 2.4289e−5 | −15.8994 |
| | −1e−3 | | 8.0962e−6 | −5.2998 |

To verify the basic theoretical results, the axial strain sensing is investigated using a Hi-Bi elliptical core fiber (3M FS-PM-4611-HT) with single-mode cut-off wavelength at $\lambda c=820$ nm. At the He—Ne wavelength $\lambda=632.8$ nm of the source, $LP_{01}$, $LP_{11}$ modes are propagating and thus creating the desired bimodal fiber-optic sensor. The experimental setup for this bimodal fiber strain sensor is obtained. The light source is provided by a 5 mW linearly polarized He—Ne laser. Polarization of the input to the fiber sensor is achieved by passing light through a ¼ wave plate and a rotational linear polarizer. The output polarization is determined by a rotational analyzer. The whole pattern, half pattern or spatially filter pattern detection schemes can be arranged by moving the detector in alignment with the fiber axis, off axis, or by adding a spatial filter in front of the detector. Here only the first two techniques are utilized. The mechanical strain is provided by the bending of the supporting aluminum cantilever beam to which the fiber sensor is bonded. The corresponding elongation of the fiber due to the beam deflection can be calculated.

Fifth Embodiment

Fabry-Perot Interferometer (FFPI) Sensor

According the recent studies, fiber-optic interferometers have been successfully employed as sensitive sensors for temperature, mechanical vibration, acoustic wave, AC voltage and AC and DC magnetic fields measurement. The reports show that the sensitivity of the temperature interferometer is expected to reach $10^{-8\circ}$ C., while the limit of the magnetic field will approach $10^{-9}$ Tesla·m, and the pressure sensing will reach $10^{-2}$ Pa. However, these earlier reports on these interferometric sensors have basically been limited to the measurement of simple mechanical or electrical properties. Little has been done with this technique for its potential sensor application on the chemical properties such as pH level, index of refraction or fluid properties such as mass density and viscosity. The primary goal for this proposal is to explore one of these areas, namely the measurement of fluid viscosity for its potential application in the automobile and chemical industries as well as for environment studies.

The basic mechanism of the fiber-optic interferometer sensor exploits the measurement of induced change in the optical path length or polarization properties of the fiber. The results of the measurements caused by the induced changes are seen by the variation in the interference pattern created by the incident beam that bounces inside the optical fiber cavity. Among the classical interferometers used for the fiber sensors, Mach-Zehnder and Fabry-Perot are most successful. It is commonly known that the Mach-Zehnder fiber interferometer consists of an interference created by a separate signal and reference optical paths. On the other hand, the interference of Fabry-Perot Interferometer (FPI) is created by multiple passes through a single fiber. Because a single fiber is used and fewer components are required for the optical setup, the FPI provides a greater potential for practical applications as a commercial sensor. This viscosity sensor is based on the Fabry-Perot configuration which will likely provide the sensitivity and portability for the viscosity measurement.

The Fabry-Perot viscosity sensor has not been seriously studied for viscosity measurement. However, this technique is based on the same fluid model and a similar concept as presented in the forward light scattering viscosity sensor. In brief, the concept is to derive the fluid viscosity from the frictional damping of fluid acting on the surface3 of the immersed vibrating probe (fiber). This frictional damping, which becomes the dominant factor in the fluid damping under a small fiber's vibration, is primary a function of viscosity. Based on this viscous fluid damping model, a viscous imposed frequency response of the fiber's vibration is generated. As a result, the fluid viscosity can be deduced based on an equivalent damping coefficient or the maximum displacement derived from the frequency response. Unlike the forward scattering method where a displacement of the pipette is measured based on the intensity variation created by the displacing scattering patter, the Fabry-Perot Interferometer system is designed to pick up the viscous imposed vibration of the fiber through the transmitted interference intensity of the Fabry-Perot fiber cavity.

Measuring Fluid Viscosity from Fiber's Maximum Vibration Amplitude $x_{max}$

In theory, the fiber and its surrounding fluid are modeled as a linear, single degree of freedom system with viscous damping. The equation of the fiber-fluid interaction is described by $mx+(C_S+C_f)x+kx=f(t)$, where f(t) is the excitation force from the piezoelectric driver, x is the fiber's displacement, k is the stiffness of the fiber, m is the mass of the fiber and the entrained mass of the surrounding fluid, and $C_S$ and $C_f$ are the damping coefficients contributed by the supporting structure and surrounding fluid. Because the structural damping is relatively small compared to the fluid damping, it is often ignored in the damping calculation. However, if needed the structural damping can easily be determined experimentally. To get a simple relation between the viscosity and the fiber's maximum displacement, the system must be calibrated so that it is operated under the laminar flow condition. Based on this condition, the fluid damping coefficient is simplified to $C_f=12\mu$, where fluid damping is primarily a function of its viscosity $\mu$. Based on the solution for the fluid damping coefficient, and the equation of the motion $mx+(C_S+C_f)x+kx=f(t)$, the peak vibration amplitude $x_{max}$ of the fiber evaluates to $$x_{max} = \frac{f(t)}{(C_s + 12\mu)\omega_o} \qquad (36)$$

This equation suggests that for a constant driving force $f(t)$, the viscosity m can be deduced from the peak displacement of the fiber, measured experimentally, if $C_S$ is known or $C_S<<12\mu$.

A set of experiment and simulation results taken from the forward light scattering fiber sensor, show an example of how the fiber's peak vibration amplitude could be used in measuring the fluid viscosity. Based on the results, the fiber's peak amplitude of vibration is linearly dependent of the inverse of the fluid viscosity. The samples used for the viscosity measurement are distilled water, and 5%, 10%, 20%, 30% and 40% Sucrose solution. The corresponding viscosity is 1 to 6.15 cP.

Measuring Viscous Imposed Vibration Using Fiber-Optic Fabry-Perot Interferometer (FFPI)

Based on the above equation, fluid viscosity is deduced from the maximum displacement of the frequency response of the vibrating fiber. Since the mode shape of the vibrating fiber is sinusoidal due to the two fixed ends, the elongation result of bending caused by the vibrating fiber, based on the maximum displacement $x_{max}$ evaluates to $$\Delta l = \frac{2l \times K\left(\frac{x_{max}^2 \pi^2}{l^2}\right)}{\pi} - l \qquad (37)$$

where $K(m)$ is the complete elliptic integral of the first kind, and 1 is the length of the fiber.

To measure the elongation $\Delta l$, an equivalent light-intensity modulation stemmed is observed from an optical beam propagation in the fiber. The technique in measurement this intensity modulation is Fabry-Perot interferometry. In this case, a length change induces a variation in the interference pattern created by the incident beam that bounces inside the optical fiber cavity. The resulting transmitted interference intensity $I_t$ observed at the transmitted end, appears as, $$I_t = \frac{T_1 T_2}{1 + R_1 R_2 - 2\sqrt{R_1 R_2} \cos\Delta\phi} \qquad (38)$$

where the interference intensity is shown to be dependent of the vibration imposed phase change $\Delta\theta$, in which $R_1$, $R_2$, $T_1$, $T_2$ are the reflectivity and transmittivity of the mirrors evaporated at the fiber ends.

The phase variation $\Delta\phi$, resulting from the vibration of the fiber, is seen in the form of $$\Delta\phi = \frac{4\pi}{\lambda}(n\Delta l + l\Delta n)\cos\theta \qquad (39)$$

where the first term $(n\Delta l)$ corresponds to the change in fiber's length $\Delta l$, and the second term $(l\Delta n)$ to the photoelastic effect $\Delta n$. The fiber-optic probe was designed to maximize the longitudinal strain by bonding the two fiber ends to a fixed holder. As a result, the dominant effect on the vibration induced phased variation is primarily the change in the length of the fiber.

Results

Figure 32:
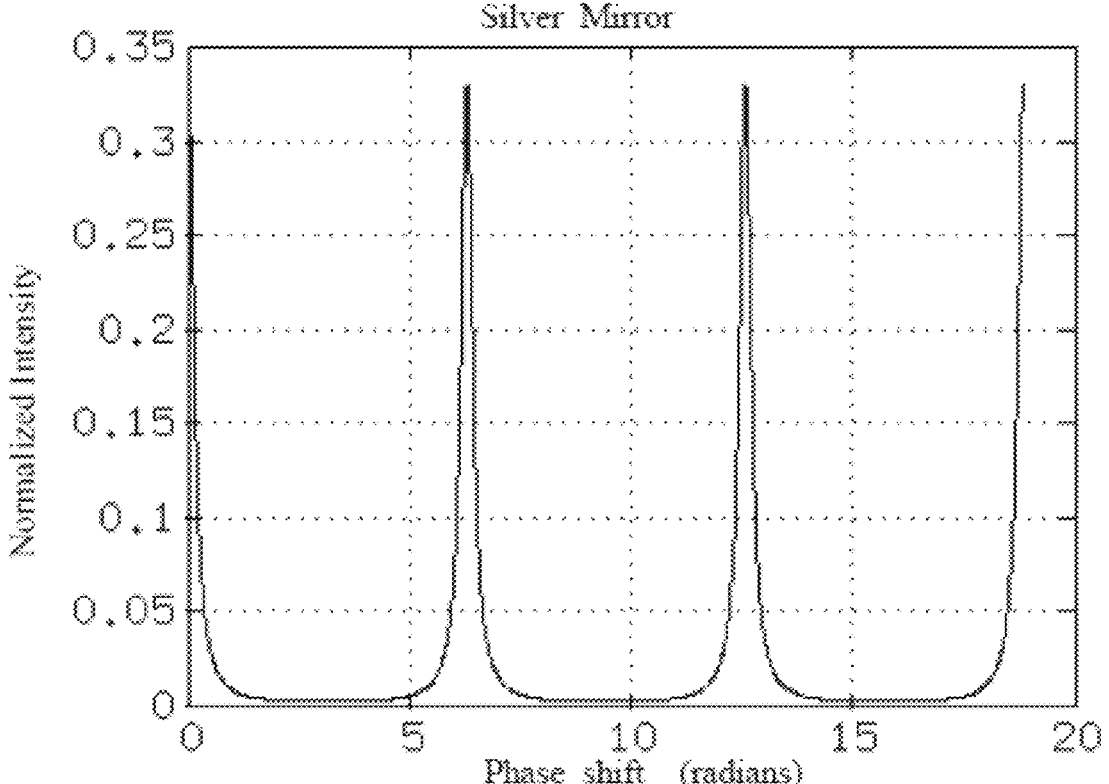
FIG. 32 shows interference intensity with a refractive index 1.467 fiber and a pair of mirrors with reflectivity of 86% (silver evaporated).
Figure 33:
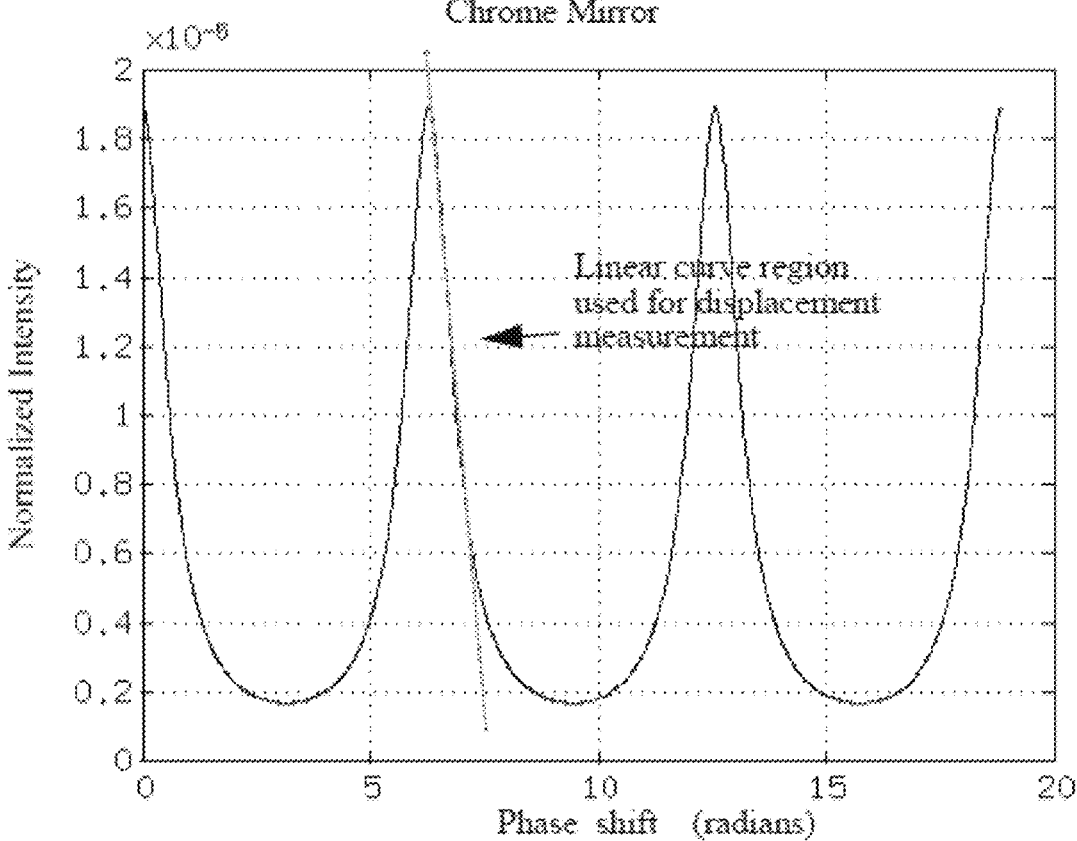
FIG. 33 shows a reduction in the overall magnitude and the finesse from the 86% case.

An example of calculated interference intensity with a refractive index of 1.467 fiber and a pair of mirrors with reflectivity of 86% (silver evaporated) is shown in FIG. 32. High reflectivity is chosen for the two mirrors for high finesse and high contrast. Each interference interval corresponds to a phase shift of $2\pi$ and an equivalent length change of 0.216 μm. The initial design, however, has chrome mirrors with reflectivity of 65%. The result shows a reduction in the overall magnitude and the finesse from the 86% case (see FIG. 33).

Figure 34:
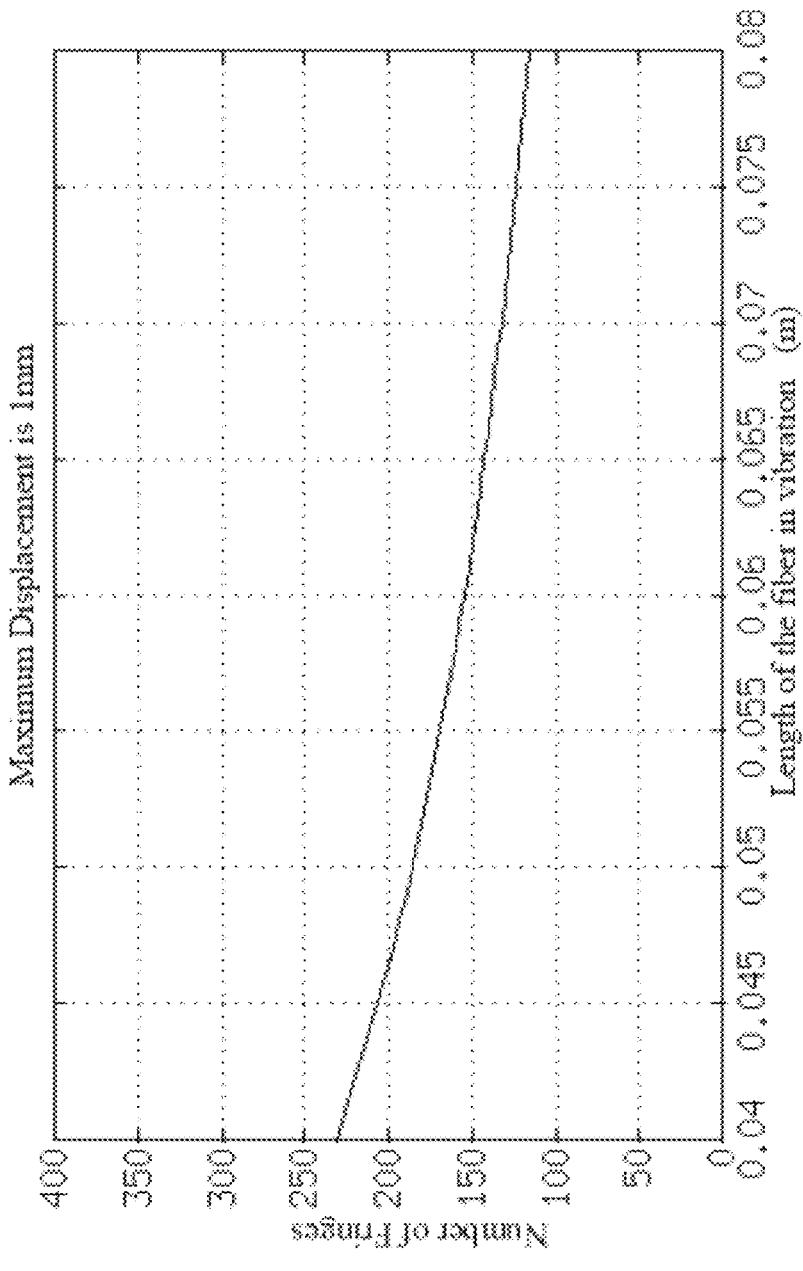
FIG. 34 shows different lengths of the fiber in vibration (the maximum displacement is 1 mm).

For a specific length of the fiber immersed in the fluid, there is a corresponding number of interference peaks. An example of this calculation is shown in FIG. 34 where the maximum amplitude of the vibration is 1 mm. With the fiber length of the current set-up equal to 73.4 cm (6 cm under vibration), there are approximately 160 interference peaks. However, this vibration is about 3 orders of magnitude greater than the magnitude allowed for the direct calculation of the viscosity from the fiber's vibration amplitude as described earlier in theory. Due to this vibration restriction, the displacement measurement from the discrete peak signals is impossible. Therefore, the present technique measures the vibration based on the intensity of the interference curve (see FIG. 33). For this reason, the resolution of the vibration amplitude critically depends on the finesse of the reflective mirrors evaporated at the ends of the fiber.

Figure 35:
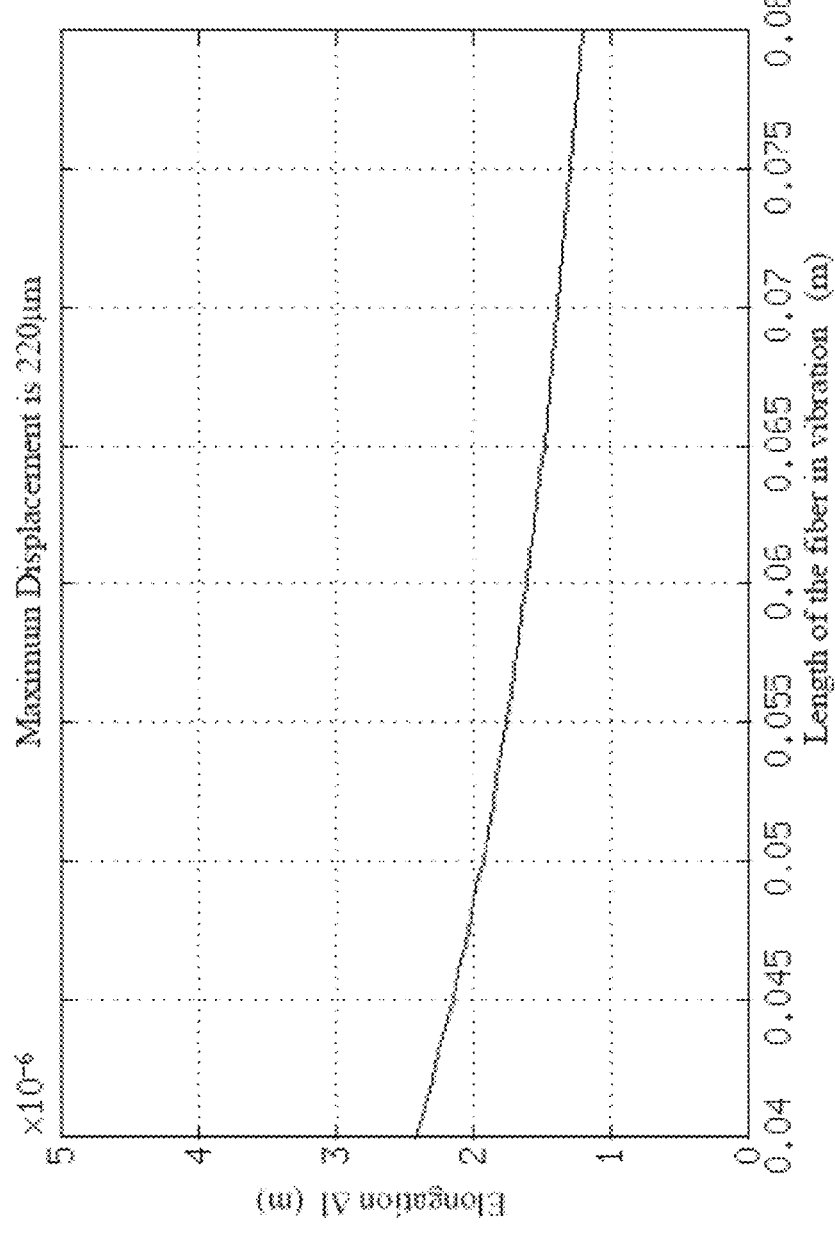
FIG. 35 shows different lengths of the fiber in vibration (the maximum displacement is 220 μm).
Figure 36:
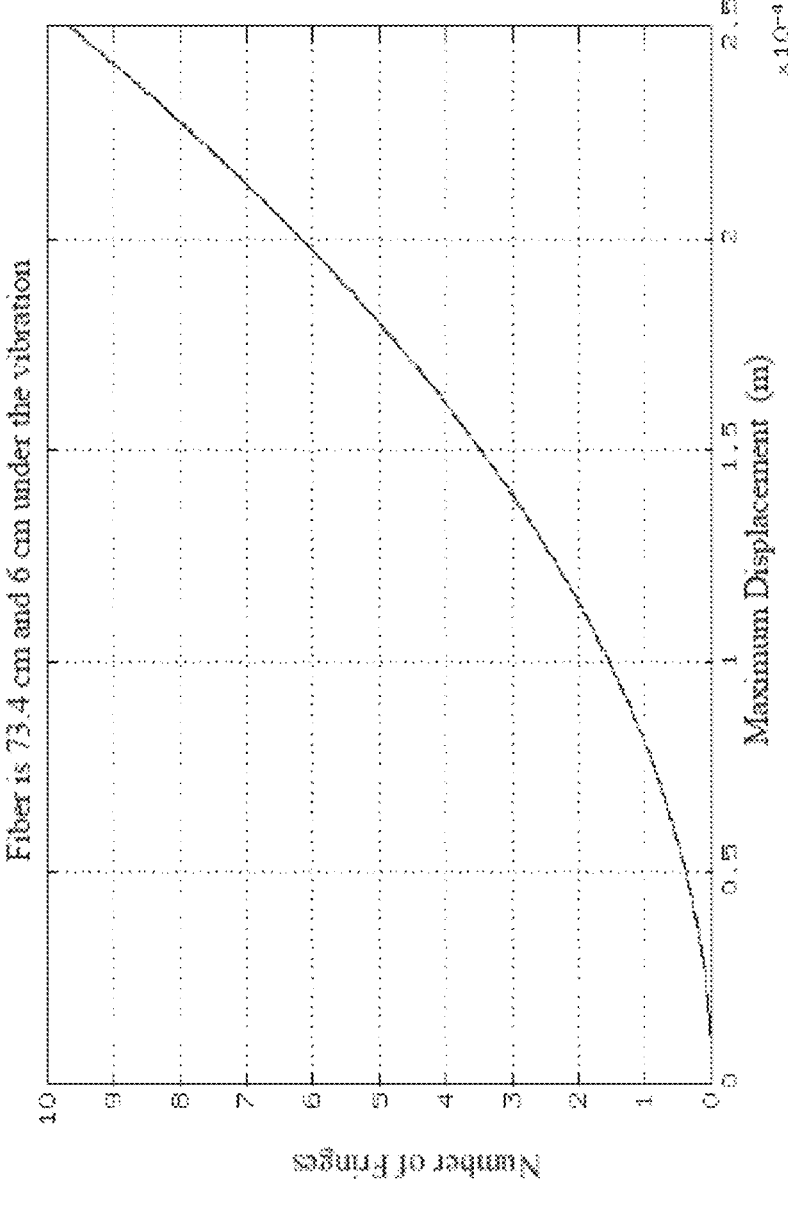
FIG. 36 shows different maximum displacements (fiber is 73.4 cm 6 cm under vibration).
Figure 37:
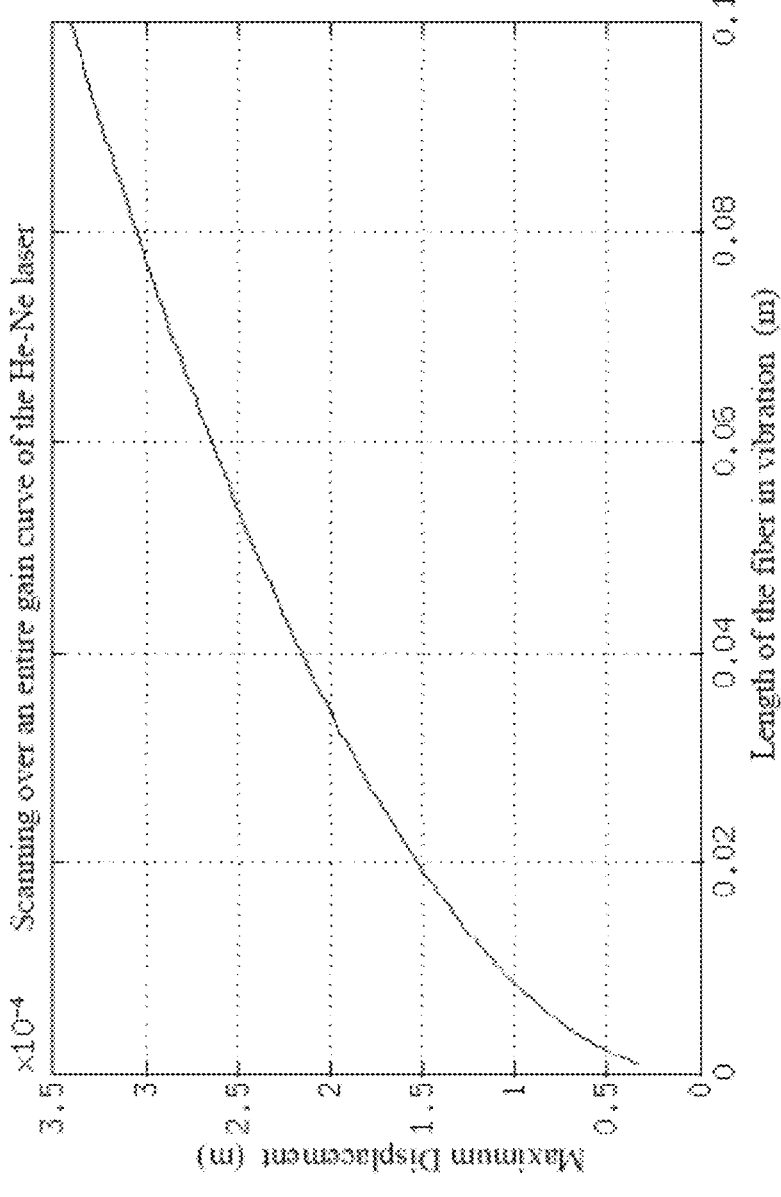
FIG. 37 shows that the vibration amplitude for the elongation is 260 μm at the center of the 6 cm sensor region.

In this case, the fiber is 73.4 cm long with both ends covered with approximately 600 nm thick of chrome mirrors. The chrome mirrors are evaporated using an electron beam evaporator. The initial calculation indicates this thickness will give a reflectivity of ~65% and a transmission of 0.2%. A report submitted by Weston C. Roth, however, states that a ~60% and ~3% were observed as the actual reflectivity and transmission for the thickness. Based on the primarily experimental results, 7 significant peaks are observed as the maximum numbers of visible signals riding on top of the carrier frequency. Using the results obtained from the forward scattering method, it can be found that the amplitude of vibration at the center of the fiber is about 220 μm. According to the calculation, the corresponding length change should be about 1.6 μm (see FIG. 35). Based on the simulation, the number of interference fingers should be ~7.2 (see FIG. 36). This result comes in close agreement with the experimental results. Since the FFPI is a scanning Fabry-Perot interferometer, the transmission intensity from the fiber is modulated by the He—Ne laser gain curve. According to the calculation, scanning over a single side lobe of the 80 cam long H—Ne laser gain curve requires a length change of 1.5 nm and scanning over an entire gain curve of the He—Ne laser requires about 2.324 μm elongation. The required vibration amplitude for this elongation is 260 μm at the center of the 6 cm sensor region (as shown in FIG. 37). This is the reason that a fluctuation is expected in the amplitude of the peaks displayed by the 220 μm vibration—a result of scanning over the side lobes of the cavity. When the maximum vibration amplitude drops down to 154 μm, i.e., 80% of original 220 μm vibration, 3 amplitude modulated interference fingers are observed. This result also fits well with the simulation result 3.6 fingers (see FIG. 36).

Proposed Design

Based on the initial analysis, two potential problems have been identified in the prior art design. The problems remain to be solved are: 1) the vibration amplitude limit for the direct measurement of viscosity, and 2) the laser's mode coupling with the cavity's interference intensity. The following modifications are mainly to deal with the above two problems.

Figure 38:
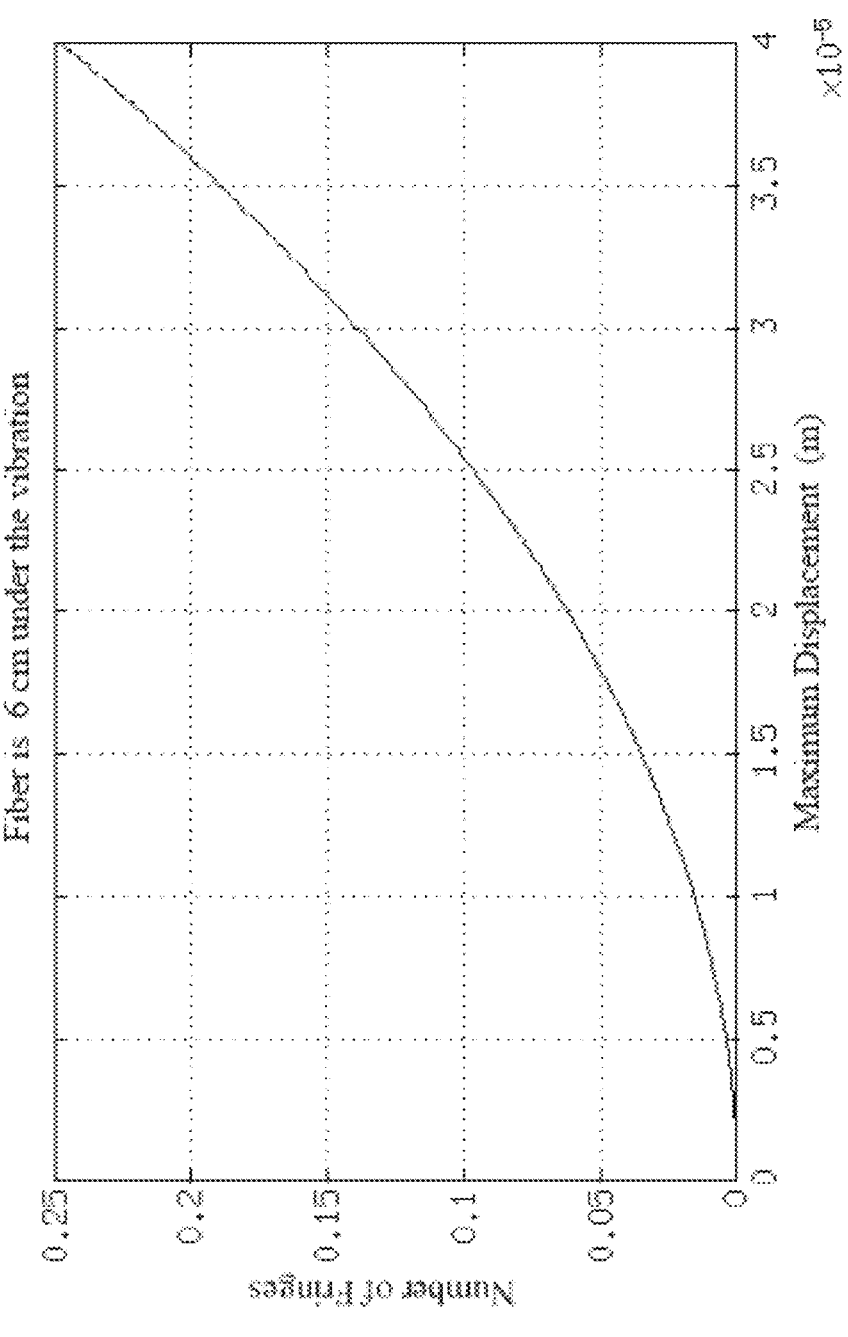
FIG. 38 is the maximum displacement and number of fringes relationship (fiber is 6 cm under vibration).
Figure 39:
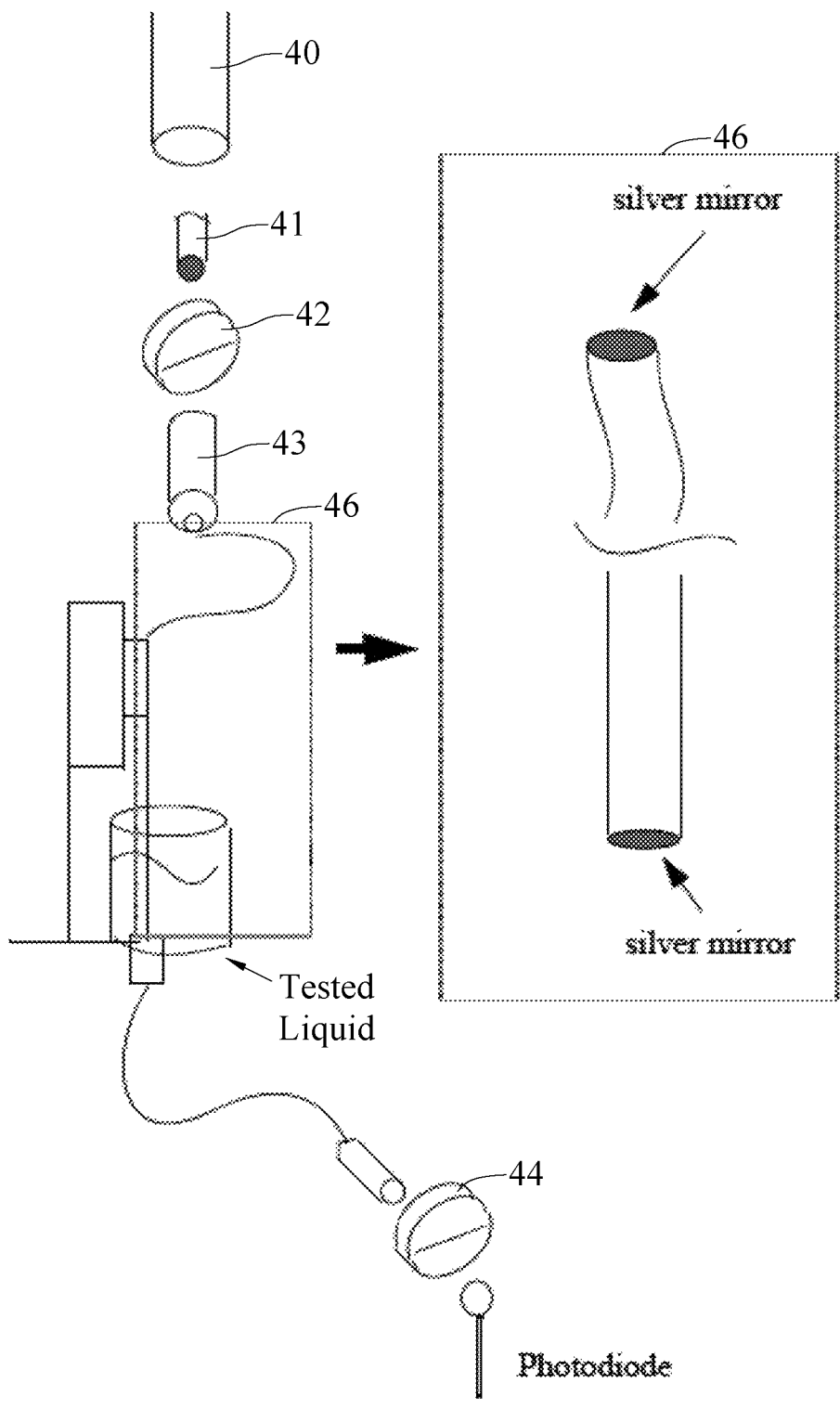
FIG. 39 is a schematic diagram of a Fabry-Perot interferometer sensor setup in accordance with an embodiment of the present disclosure.
Figure 40:
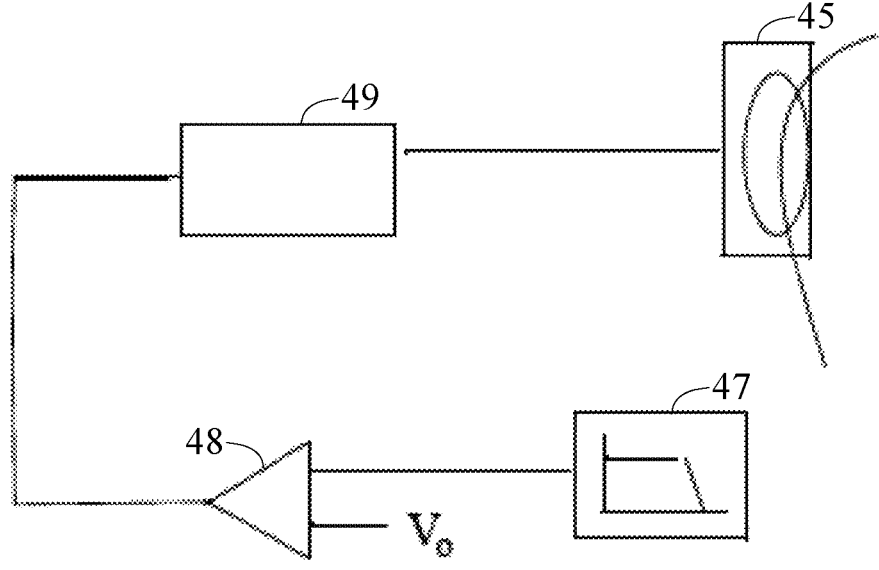
FIG. 40 is a schematic diagram of the Fabry-Perot interferometer sensor setup including a low-pass filter, a differential amplifier and a power amplifier in accordance with an embodiment of the present disclosure.

Resolving Problem in Scanning Over the Laser's Gain Curve and Stabilizing the Reference of the Output Signal FIG. 39 shows an experimental setup. The light source 40 is a 35 mW Spectra-Physics Stabilite model 124B He—Ne (λ=632.8 nm) laser. The light from laser first goes through an etalon or color filter 41, where the central peak is extracted. The light then passes through a 10× microscope objective 43 and is injected into fiber-optic Fabry-Perot interferometer 46. In order to avoid undesirable optical coupling between the FFPI and the laser, a polarizer 42, positioned at the fiber's principle axis (slow or fast), is placed at a slight angle relative to the surface of the objective. To avoid the interference caused by the orthogonal mode propagation, another polarizer 44 is placed at the output will be 6 cm long with end reflectance of ~86% (silver evaporation). The vibration of the fiber is driven by a piezoelectric transducer 45 mounted near the end of the interferometer. Based on the linear displacement and transmission intensity relationship (see FIG. 38), the maximum vibration amplitude should be approximately 10 μm. The minimum detectable vibration will not be determined by the noise level in the system, but it is predicted that a minimum of 0.01 μm is possible. High finesse, result from the pair of high reflectance silver mirrors is the key in providing the high sensitivity to the displacement measurement. The output of FFPI is fed through a low-pass filter 47 and compared, in a differential amplifier 48 with a voltage $V_o$ corresponding to the point to which operating point should be stabilized (see FIG. 40). The differential signal then fed through a power amplifier 49 where a DC bias is applied to the piezoelectric transducer 45 for correction.

Measuring Vibration Amplitude from a Discrete Output Signal

Another technique to detect the fiber's displacement is using two FFPI's in series (see FIG. 41). The advantage of this technique will be that white light or an LED is used as the input light source instead of a laser. Using appropriate optics to couple the light into the first Fabry-Perot interferometer, the light transmitted through the FFPI will create a comb-like evenly spaced spectrum at the output. This light is then coupled into the second FFPI where the fluid viscosity will be sensed. With different vibrations induced by different fluid viscosities, the second interferometer measures its displacement by counting the number of comb-like fringe at the transmission intensity. One of the requirements is that the length of the first FFPI has to be at least 100 times longer than the second FFPI for the system to function properly, and special attention must be taken on the set-up to insure the stability of the comb spectrum and the overall mechanical vibration. FIG. 41 is a schematic diagram of the Fabry-Perot interferometer sensor setup including two FFPIs in series.

Materials Consideration

To improve the sensitivity of the viscosity measurement, certain modifications can be made to improve the vibration-induced phase factor in the intensity equation. The value of Δφ could be quite different for various multicomponent glasses, since Young's modulus E can vary from 5 to 9×10^{10} N/m^{2} Poisson's ratio ranges from 0.17 to 0.32, and the strain-optic coefficients (pure fused silica to doped silica) can be in the 0.1-0.3 range. It is the concern to select a suitable fiber for the optimal phase shift. Currently, a commercially available high birefringence fiber (Bow-tie fiber from York Technology) is used for its polarization-maintaining property and its single mode propagation (at 630 nm). Recent reports have shown that this fiber can be successfully deployed as a FFPI. However, it is the desire to search for other possible fibers which might provide a better strain sensing. One of the problems concerning the fiber-optic interferometer strain sensor is its sensitivity to temperature. A recent report suggests a way to reduce the temperature sensitivity of polarization-maintaining fibers. According to the report, a double-clad elliptical fiber with built-in stresses was designed as a temperature insensitive PM fiber. This was achieved by suitably selecting doping materials for core, inner cladding and outer to produce different thermal expansion coefficient.

CONCLUSION

So far the method for a viscosity measurement has been discussed in detail using an optical fiber Fabry-Perot cavity. Initial results have shown that a potentially highly sensitive and compact fluid viscosity sensor is possible. Several new designs and materials have also been discussed as a method of improving the initial design. The viscosity sensor will be made into a portable device where measurements can be made by a portable computer to a compact data acquisition system with build-in signal processor. With this design in mind, this sensor will be beneficial to many industries where viscosity has been routinely measured using less sensitive and more cumbersome equipment.

The usefulness of this device will be extended beyond the viscosity parameter. Currently, the equations are formulated successfully for detecting the temperature, flow rate, mass density, pressure and flow type of a fluid. Thus, a multifunctional FFPI sensor for studying fluid is possible in the course of the experiments.

The usefulness of this device will be extended beyond the current parameter. So far the equations are formulated successfully for detecting the temperature, flow rate, mass density, pressure and flow type of a fluid. If they all prove successfully experimentally, a multi-sensor for studying a fluid flow is possible. By then this optical fiber Fabry-Perot sensor will be replacing not one but many sensors that needed to measure each individual property. Currently, biomedical applications such as physical analysis of proteins-proteins interactions in detecting hazardous chemicals or virus have been presented. This can be done by apply the fiber sensor with appropriate enzyme for a particular absorption to take place. This is a sensor for many applications with relatively simple design. It is believed that the sensor will be an important device in the future in many areas of study. Here just a few applications are presented.

MEOM Configuration

Figure 44B:
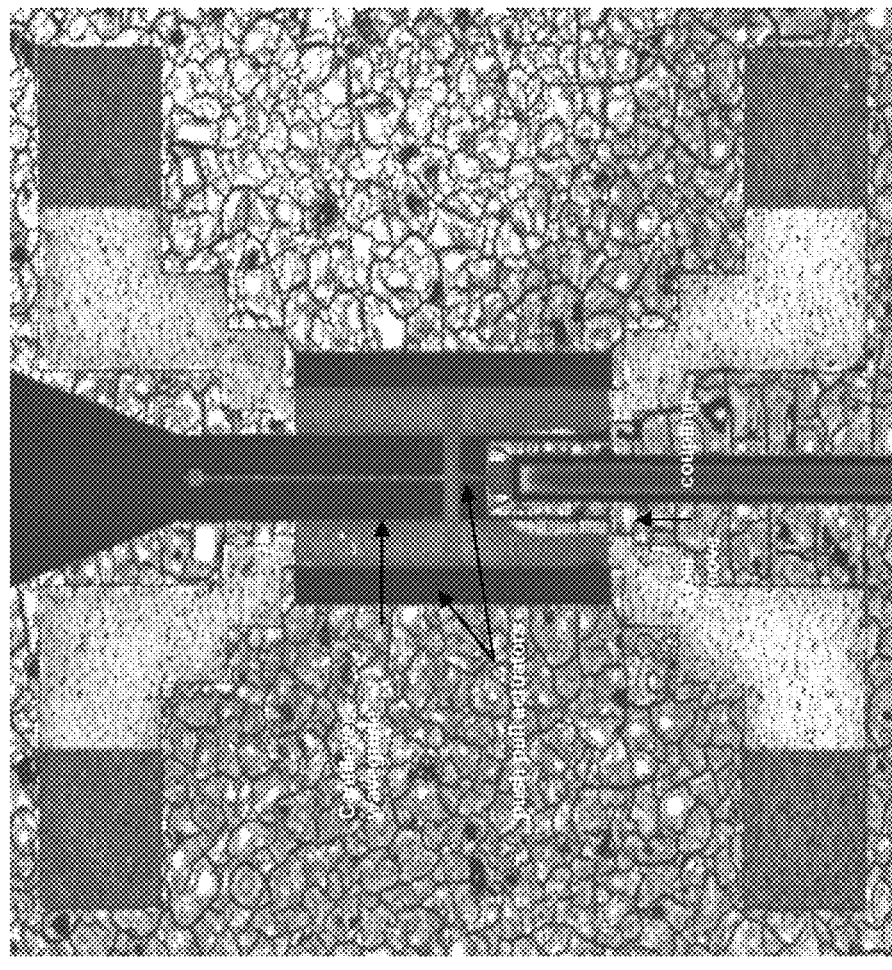
FIG. 44B is an optical micrograph of an integrated optical system where a mechanical vibration of the vibrating probe is provided by the integrated push pull actuator and the light source is provided by the fiber coupled at the end of the micro-fabricated optical waveguide system.
Figure 44B:
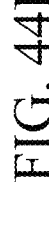
Figure 44A:
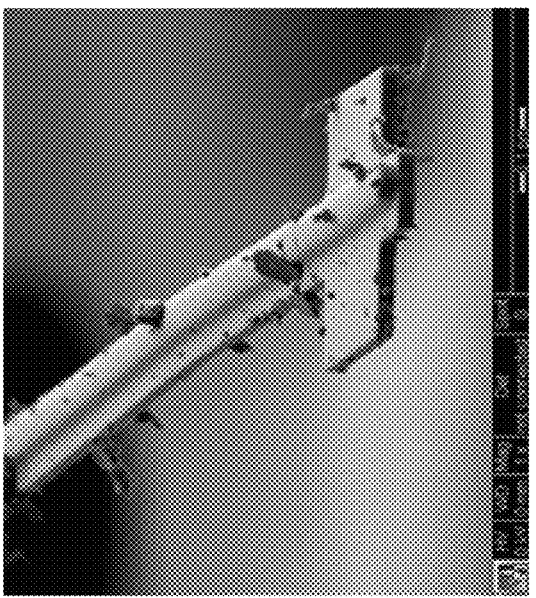
FIG. 44A is an optical micrograph of a sensor tip of an integrated optical waveguide sensor for viscosity and mass flow measurement.

In the present disclosure, the viscosity and flow rate sensors scale down to MEMS devices such as the MEMS scanner shown in FIGS. 44A and 44B. This configuration will allow the sensor to be manufactured using a typical CMOS process so that driving and detection electronic circuits as well as other filtering and signal processing electronics can be all integrated into one chip.

Biomedical Applications

Figure 42:
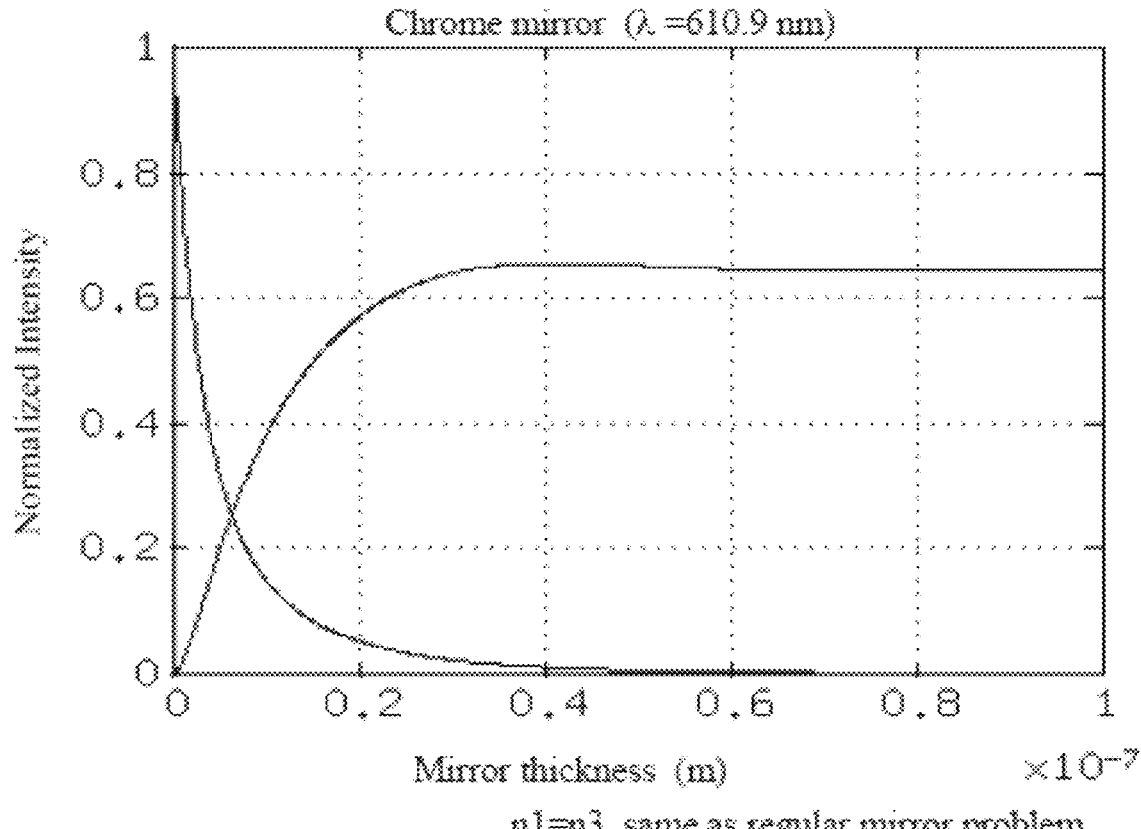
FIG. 42 is the mirror thickness and normalized intensity relationship (n1=n3).
Figure 43:
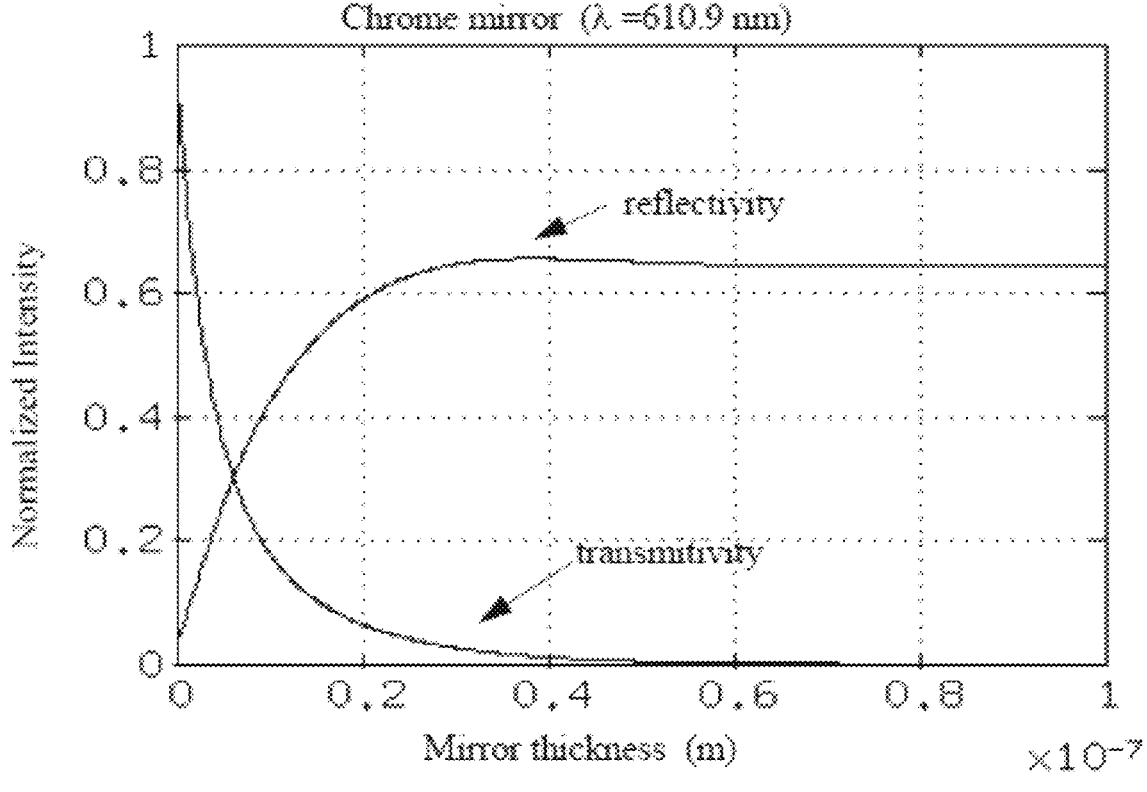
FIG. 43 is the mirror thickness and normalized intensity relationship (n1=1.467, n2=mirror, and n3=1.0).
Figure 45:
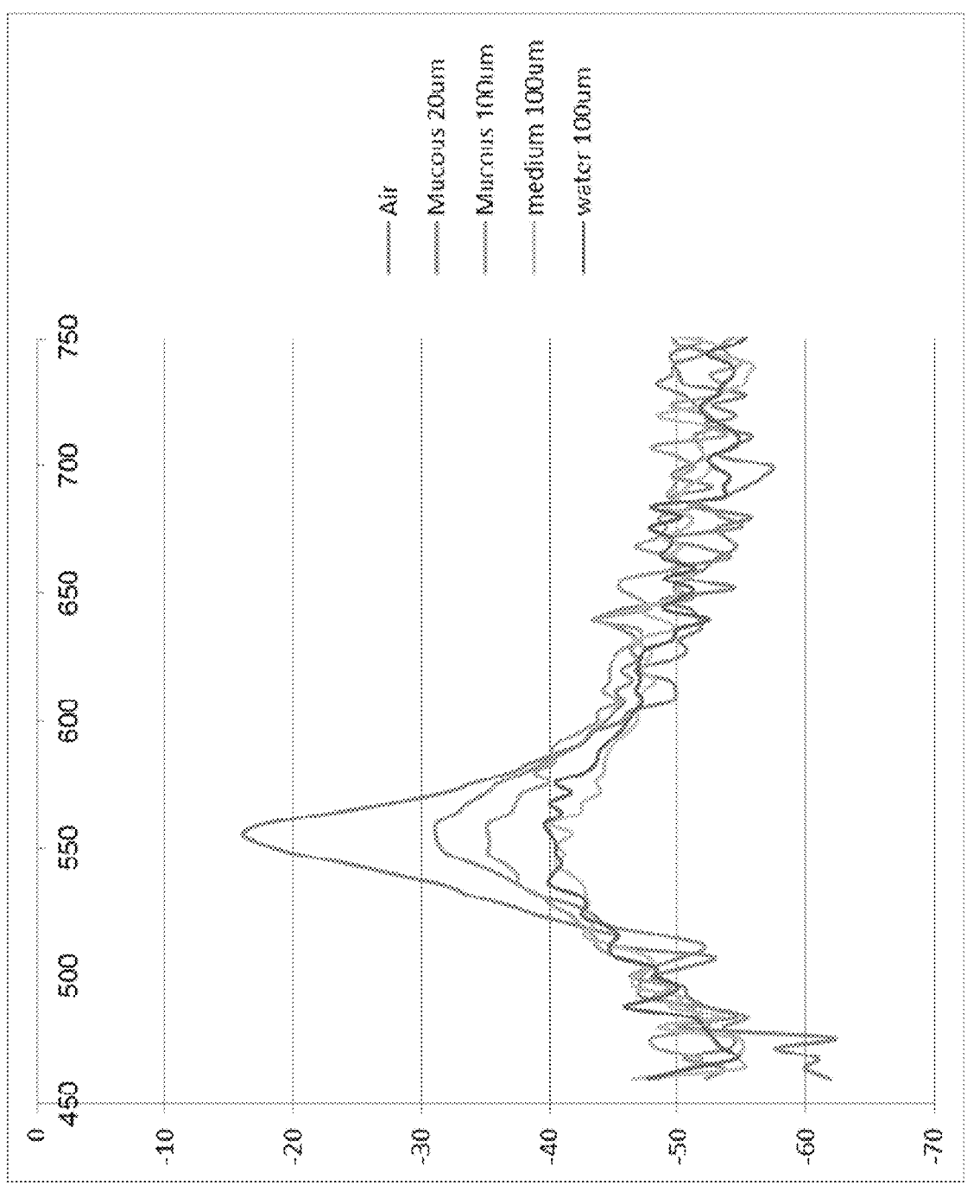
FIG. 45 shows damped frequency response using intensity modulation sensor to measure mucus secret from cells at different amount compare to air and water measurement.

The sensor can be used to detect epithelial cancers based on viscosity change in the mucus secrete from epithelial cells. FIG. 42 is the mirror thickness and normalized intensity relationship (n1=n3). FIG. 43 is the mirror thickness and normalized intensity relationship (n1=1.467, n2=mirror, and n3=1.0). FIG. 45 shows damped frequency response using intensity modulation sensor to measure mucus secret from cells at different amount compare to air and water measurement.

Blood Sugar Level Sensing Based on Viscosity Induced Damping Change

Figure 46:
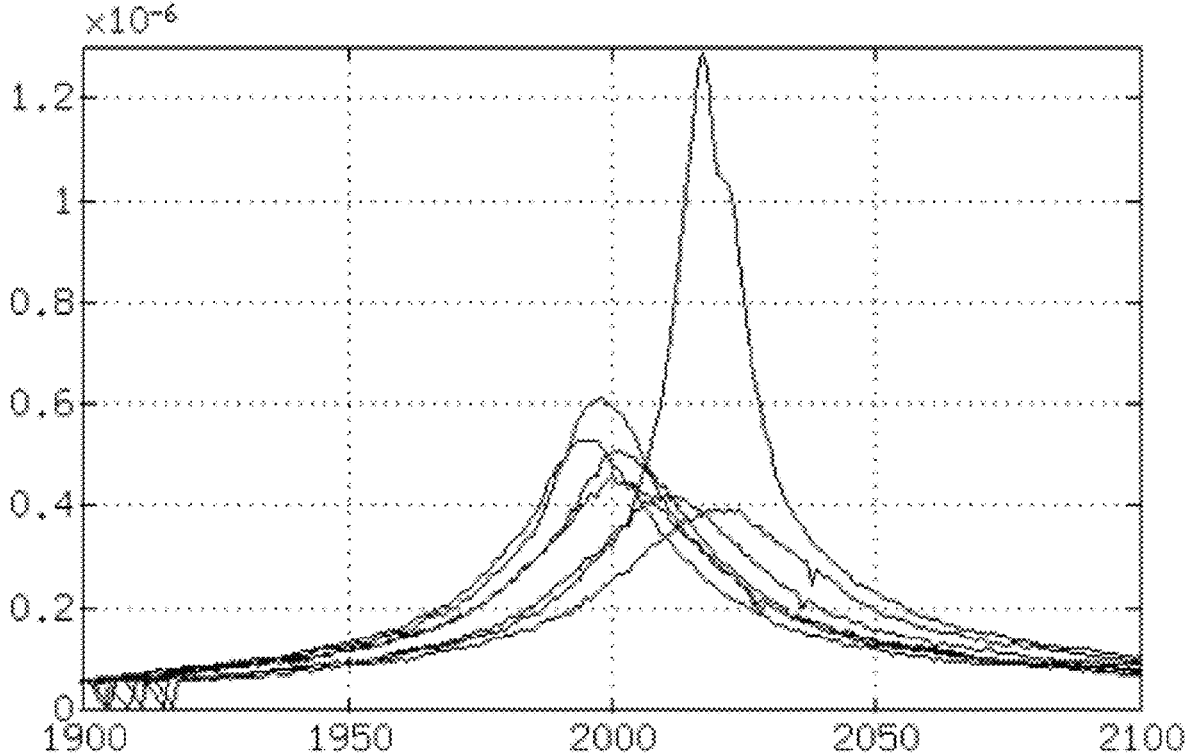
FIG. 46 shows glucose solution concentration measurement (0 to 25% concentration).

FIG. 46 shows the glucose solution concentration measurement (0 to 25% concentration). Peak response is in air.

INDUSTRIAL APPLICATIONS

Figure 47:
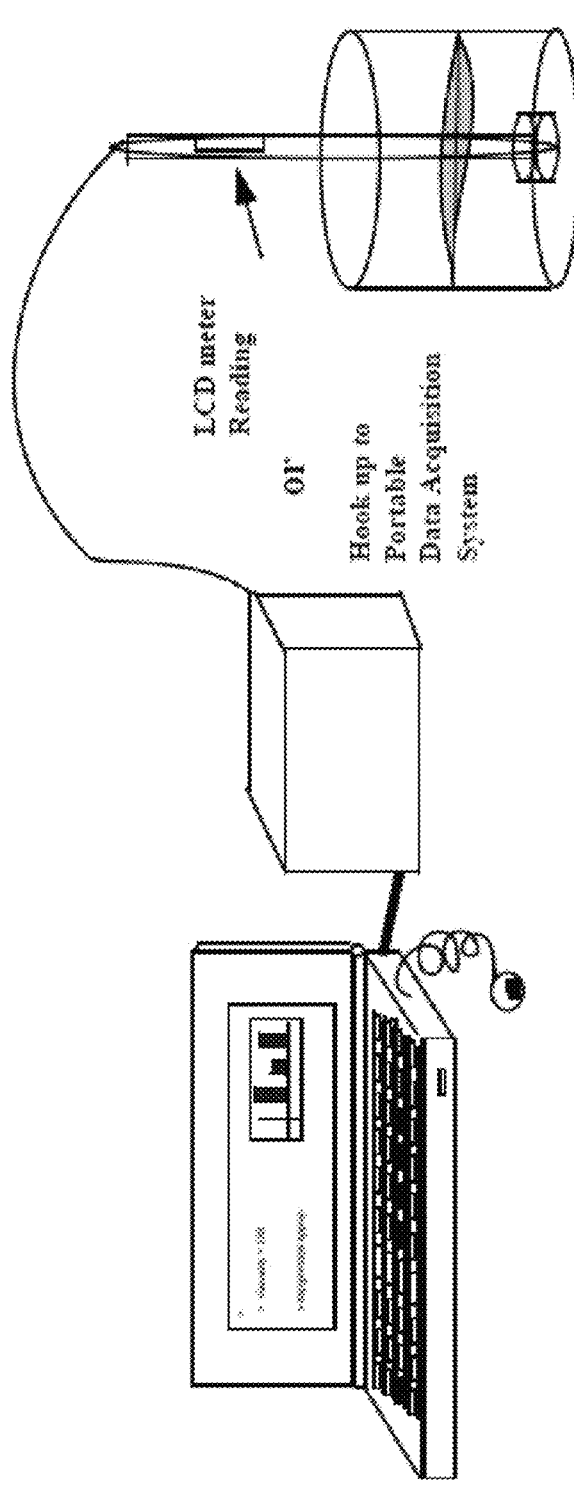
FIG. 47 is a schematic diagram of a pocket-sized viscometer or fluid sensor setup.

Several optical techniques can be implemented in an optical fiber or easily scale down to integrated Micro-opto-electro-mechanical systems (MOEMS). Various optical approaches that are in fiber optic configuration are described in the following sections. FIG. 47 shows a schematic diagram of a pocket-sized viscometer or fluid sensor setup. However, the same technologies can be adapted to the integrated optical waveguide system using the same mechanical theory and optical method.

Figure 48:
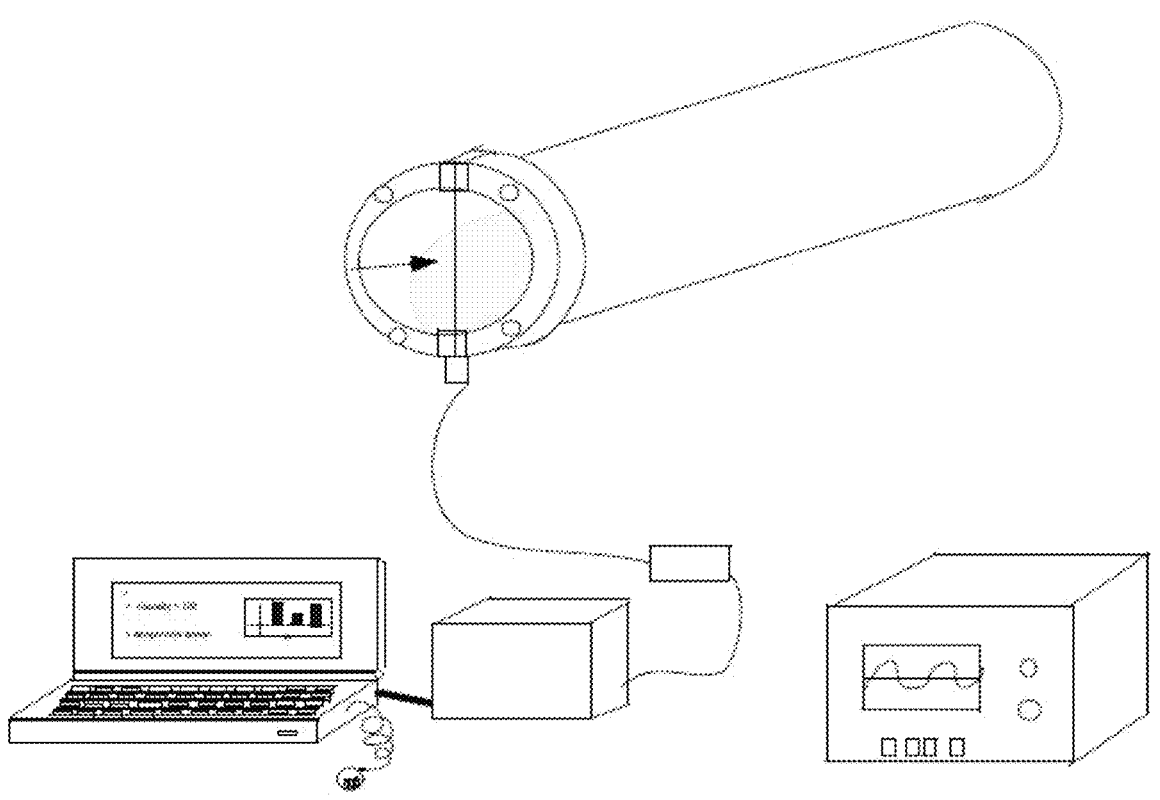
FIG. 48 is a schematic diagram of a portal data acquisition system.

FIG. 48 is a schematic diagram of a portal data acquisition system. Portable sensor to bring with a field setting for onsite measurement. In a line sensor configuration where fiber can be embedded into structure to monitor in real time viscosity, mass flow, mass density, pressure etc.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for measuring viscosity and mass flow, the method comprising steps of:
    immersing one end of an optical fiber or an optical waveguide into fluid;
    emitting a light beam by a light source;
    injecting the light beam into the optical fiber through a microscope objective;
    placing a polarizer positioned at a principle axis at an angle relative to a surface of the microscope objective;
    driving the optical fiber by a piezoelectric transducer mounted at another end of the optical fiber;
    receiving the light beam by the optical fiber or the optical waveguide; and
    measuring the viscosity and the mass flow of the fluid based on an effect of a fluid induced linear or nonlinear dynamic motion of an optical sensor,
    wherein the light source is a coherent light source, and the coherent light source is a gas laser or a laser diode.

2. The method of claim 1 further comprising the steps of:
    tapering the one end of the optical fiber or a microfabricated cantilever waveguide; and
    coating a surface of the one end of the optical fiber with a deposited highly reflective thin film e.g. gold, silver, chrome as a mirror, wherein the deposited highly reflective thin film is a gold thin film, a silver thin film or a chrome thin film, wherein the light source is a polarized or unpolarized diode laser.

3. The method of claim 1 wherein said step of emitting the light beam by the light source comprises the steps of:
    launching the light source into an input end of a polarization maintaining optical fiber through the polarizer and lens;
    rotating a plane of polarization of the light beam at 45° or 135° with respect to principal axes of the optical fiber of a fiber coupler; and
    exciting two orthogonal eigen axes equally.

4. The method of claim 1 wherein said step of measuring the viscosity and the mass flow of the fluid comprises the steps of:
    connecting an output from a fiber coupler to a photodetector;
    providing a reflection of a signal to the photodetector by a surface of the one end of the optical fiber; and
    measuring the displacement of the optical fiber based on an interference intensity variation created by a strain-induced birefringence effect between two excited orthogonal polarization modes in the optical fiber.

5. The method of claim 1 wherein the viscosity of the fluid is deduced from frequency response of the optical fiber, a frequency excitation is accomplished by setting the optical fiber in periodic motion with the piezoelectric transducer attached to the non-immersed end of the probe, each frequency excitation of the optical fiber is generated by a sinusoidal input sweep at constant amplitude driven by the piezoelectric transducer.

6. The method of claim 5 wherein the viscosity of the fluid is estimated by using bandwidth and a peak response of a mechanical response of the optical fiber, a damping coefficient of the fluid is calculated based on the bandwidth and first resonant frequency.

7. The method of claim 1 wherein the viscosity of the fluid is deduced based on maximum amplitude of a spectrum.

8. The method of claim 1 further comprising the steps of:
    coating the one end of the optical fiber with silver epoxy or sputtered highly reflective metal or dielectric thin film; and
    reflecting the light beam when the light beam reaches a bottom of the one end of the optical fiber,
    wherein the gas laser is a He—Ne laser, and the optical fiber is a birefringent fiber or a PM fiber.

9. The method of claim 8 wherein said step of emitting the light beam by the light source comprises the step of:
    coupling the light beam from the light source into the optical sensor by an input end of a 2×1 fiber coupler, wherein the polarization of the light source is at 45° or 135° with respect to principal axes of the optical fiber of the fiber coupler; and
    exciting two orthogonal eigen axes equally, wherein the polarizer is placed at an output end of the fiber coupler at rotated 180° relatively to an input polarization.

10. The method of claim 8 wherein said step of measuring the viscosity and the mass flow of the fluid comprises the steps of:
    anchoring another end of the optical fiber to the piezoelectric transducer;
    estimating light intensity by a light-to-voltage optical sensor;
    analyzing an output voltage by a dynamic signal analyzer which converts time domain data to frequency domain by performing a Fast Fourier Transform (FFT).

11. The method of claim 8 wherein another end of the optical fiber is attached to one end of a piezoelectric strip, another end of the piezoelectric strip is fixed by a mechanical clamp, and an input voltage for the piezoelectric strip is provided by a function generator that provides a sinusoidal output.

12. The method of claim 8 wherein the one end of the optical fiber is actuated at near resonant frequency in air and then a vertical stage is used to raise the fluid, and after a surface of the fluid touches the one end of the optical fiber, vibration amplitude of the one end of the optical fiber can be controlled by the vertical stage.

13. The method of claim 1 further comprising the step of:
exciting two modes $LP_{01}$ and $LP_{11}$ in the optical fiber,
wherein the light source is provided by a linearly polarized coherent light source, the linearly polarized coherent light source is a gas laser or a laser diode, and the optical fiber is an elliptical core two-mode fiber.

14. The method of claim 13 wherein said step of exciting the two modes $LP_{01}$ and $LP_{11}$ in the optical fiber comprises the steps of:
providing polarization to the optical fiber by passing the light beam through a ¼ wave plate and the polarizer; and
determining an output polarization by a rotational analyzer.

15. The method of claim 13 wherein the elliptical core two-mode fiber operates on differential phase modulation between the two modes $LP_{01}$ and $LP_{11}$.

16. The method of claim 13 wherein said step of measuring the viscosity and the mass flow of the fluid comprises the steps of:
arranging a whole pattern detection scheme, a half pattern detection scheme, or a spatially filter pattern detection scheme by moving a detector in alignment with a fiber axis, off axis, or by adding a spatial filter in front of the detector;
providing strain by bending of a supporting aluminum cantilever beam to which the optical fiber is bonded or the optical fiber is standalone as a probe; and
calculating a corresponding elongation of the optical fiber due to a beam deflection or a fiber bend.

17. The method of claim 1 further comprising the steps of:
placing another polarizer at the one end of the optical fiber oriented at a same polarization direction as the polarizer,
wherein the optical fiber in a fiber-optic Fabry-Perot interferometer.

18. The method of claim 17 wherein said step of measuring the viscosity and the mass flow of the fluid comprises the steps of:
feeding output intensity of the optical fiber through a low-pass fiber;
comparing the output intensity in a differential amplifier with a voltage corresponding to a point to which an operating point is stabilized; and
feeding a differential signal through a power amplifier where a DC bias is applied to the piezoelectric transducer for correction.

19. The method of claim 17 wherein maximum vibration amplitude is obtained based on a linear displacement and transmission intensity relationship, and minimum vibration amplitude is determined by a noise level.

20. The method of claim 17 wherein the optical fiber and another optical fiber are used in series to detect the displacement of the optical fiber.

21. The method of claim 1 further comprising the steps of:
providing a micro-fabricated cantilever waveguide or optical fiber cantilever; and coating a distal end of the micro-fabricated cantilever waveguide with a deposited gold thin film as a mirror,
wherein the light source is either a polarized diode laser or an unpolarized diode laser or a light emitting diode.

22. The method of claim 21 wherein said step of emitting the light beam by the light source comprises the step of:
coupling the light beam from the light source into the optical fiber by a coupler.

23. The method of claim 21 wherein said step of measuring the viscosity and the mass flow of the fluid comprises the steps of:
estimating light intensity by a MOEMS sensor;
analyzing an output voltage by a dynamic signal analyzer which converts time domain data to frequency domain by performing a Fast Fourier Transform (FFT).

24. The method of claim 23 wherein the MOEMS sensor is integrated with MEMS actuators and combines with driving circuits and detection circuits on a same chip.

25. The method of claim 1 wherein said step of measuring the viscosity and the mass flow of the fluid comprises the steps of:
estimating light intensity attenuation by fluid modulated vibrating induced bending;
analyzing an output voltage by a dynamic signal analyzer which converts time domain data to frequency domain by performing a Fast Fourier Transform (FFT).

26. The method of claim 1 wherein said step of measuring the viscosity and the mass flow of the fluid comprises the steps of:
estimating light intensity by a forward scattering sensor;
analyzing an output voltage by a dynamic signal analyzer which converts time domain data to frequency domain by performing a Fast Fourier Transform (FFT).

27. The method of claim 1 further comprising the step of:
scaling down a viscosity and flow rate sensor to a MEMS device; and
manufacturing the viscosity and flow rate sensor using a semiconductor process.

28. The method of claim 27 wherein the MEMS device is integrated with driving and detection circuits as well as filtering and signal processing electronics on a single chip.

29. The method of claim 1 wherein the step of measuring the viscosity and the mass flow of the fluid based on the effect of the nonlinear dynamic motion of the optical sensor comprises exciting superharmonic or higher order harmonic resonances in the optical sensor.

30. The method of claim 29 wherein by exciting the optical sensor to the superharmonic resonance, input and output frequencies become completely separated such that unwanted ambient vibration from interfering with an output frequency is prevented by a nonlinear technique.

31. The method of claim 29 wherein the superharmonic resonance is more sensitive to damping when the damping is relatively small.

32. The method of claim 1 wherein the step of measuring the viscosity and the mass flow of the fluid based on the effect of the nonlinear dynamic motion of the optical sensor comprises exciting subharmonic resonances in the optical sensor.

33. The method of claim 1 wherein the step of measuring the viscosity and the mass flow of the fluid based on the effect of the nonlinear dynamic motion of the optical sensor comprises applying a series of sinusoidal steady-state input waveforms to the piezoelectric transducer to improve consistency of an output's hysteresis jump such that is occurs at a same frequency every time.

34. The method of claim 33 wherein if an input is chirped, the hysteresis jump is very likely to occur at a higher frequency.

\* \* \* \* \*